United States Patent
Corneil et al.

(10) Patent No.: US 11,028,957 B2
(45) Date of Patent: Jun. 8, 2021

(54) METHOD OF INSTALLING LINER ASSEMBLY FOR PIPELINE REPAIR OR REINFORCEMENT, AND LINER ASSEMBLY AND STEAM GENERATOR FOR SAME

(71) Applicant: Aquam Corporation, Ajax (CA)

(72) Inventors: Paul Corneil, Ajax (CA); Grant Duxbury, Ajax (CA); Cameron Manners, Ajax (CA)

(73) Assignee: Nu Flow Technologies 2000 Inc., Ajax (CA)

( * ) Notice: Subject to any disclaimer, the term of this patent is extended or adjusted under 35 U.S.C. 154(b) by 19 days.

(21) Appl. No.: 16/420,577

(22) Filed: May 23, 2019

(65) Prior Publication Data
US 2019/0360628 A1    Nov. 28, 2019

Related U.S. Application Data

(60) Provisional application No. 62/675,750, filed on May 23, 2018, provisional application No. 62/678,527, (Continued)

(51) Int. Cl.
*F16L 55/165* (2006.01)
*F16L 55/18* (2006.01)
(Continued)

(52) U.S. Cl.
CPC ...... *F16L 55/1654* (2013.01); *B29C 63/0004* (2013.01); *B29C 63/28* (2013.01);
(Continued)

(58) Field of Classification Search
CPC . F16L 55/165; F16L 55/1652; F16L 55/1654; F16L 55/1656; F16L 55/18;
(Continued)

(56) References Cited

U.S. PATENT DOCUMENTS 4,361,451 A * 11/1982 Renaud ............... B29C 63/28
                                                156/64
4,366,012 A    12/1982 Wood
(Continued)

FOREIGN PATENT DOCUMENTS

EP    0553558 B1    6/1996
JP    2013-006405 A    1/2013

OTHER PUBLICATIONS

International Search Report and Written Opinion dated Aug. 2, 2019 for International Application No. PCT.CA2019/050701, 20 pages.

*Primary Examiner* — Philip C Tucker
*Assistant Examiner* — Brian R Slawski

(57) ABSTRACT

A method of installing a liner assembly for pipeline repair or reinforcement includes: pulling a prepared liner assembly into position in the pipeline, the liner assembly including an outer tubular liner and an inner inflatable bladder positioned longitudinally within the tubular liner, the tubular liner being wetted with a curable compound; introducing fluid into the inflatable bladder so that the inflatable bladder expands to bring the tubular liner into firm contact with an interior surface of the pipeline; flowing the fluid continuously through the bladder and discharging the fluid into the pipeline, while maintaining the liner assembly in an inflated condition for a time period sufficient for the tubular liner to cure; and deflating the inflatable bladder and retrieving at least a portion of the liner assembly from the pipeline.

12 Claims, 44 Drawing Sheets

Related U.S. Application Data filed on May 31, 2018, provisional application No. 62/808,210, filed on Feb. 20, 2019.

(51) Int. Cl.

| | |
|---|---|
| *F16L 11/12* | (2006.01) |
| *B29C 73/12* | (2006.01) |
| *B29C 63/28* | (2006.01) |
| *B29C 63/34* | (2006.01) |
| *B29C 63/00* | (2006.01) |
| *F22B 1/28* | (2006.01) |
| *B29L 23/00* | (2006.01) |
| *B29C 65/00* | (2006.01) |
| *B29C 49/26* | (2006.01) |
| *B29C 73/10* | (2006.01) |
| *E03F 3/06* | (2006.01) |
| *B29C 65/48* | (2006.01) |
| *B29C 35/04* | (2006.01) |

(52) U.S. Cl.
CPC ............ *B29C 63/341* (2013.01); *B29C 73/12* (2013.01); *F16L 11/12* (2013.01); *F16L 55/1656* (2013.01); *F16L 55/18* (2013.01); *F22B 1/285* (2013.01); *B29C 35/049* (2013.01); *B29C 49/26* (2013.01); *B29C 63/0069* (2013.01); *B29C 63/34* (2013.01); *B29C 65/4835* (2013.01); *B29C 66/301* (2013.01); *B29C 66/52* (2013.01); *B29C 66/612* (2013.01); *B29C 73/10* (2013.01); *B29L 2023/22* (2013.01); *E03F 2003/065* (2013.01)

(58) Field of Classification Search
CPC .......... F16L 11/12; B29C 63/26; B29C 63/28; B29C 63/34; B29C 63/341; B29C 63/36; B29C 63/0004; B29C 63/0069; B29C 35/02; B29C 35/04; B29C 35/049; B29C 49/26; B29C 73/00; B29C 73/04; B29C 73/10; B29C 73/12; B29C 65/00; B29C 65/48; B29C 65/483; B29C 65/4835; B29C 66/50; B29C 66/51; B29C 66/52; B29C 66/61; B29C 66/612; B29C 66/301; E03F 2003/065; F22B 1/285; F22B 37/10; B29L 2023/22

USPC ....... 156/60, 64, 71, 94, 156, 285, 287, 293, 156/294, 296, 307.1, 307.3, 311; 138/97, 138/98; 405/184.1, 184.2

See application file for complete search history.

(56) References Cited

U.S. PATENT DOCUMENTS

| | | | |
|---|---|---|---|
| 4,965,036 A | 10/1990 | Miyazaki et al. | |
| 5,049,003 A | 9/1991 | Barton | |
| 5,736,166 A * | 4/1998 | Polivka | B29C 63/36 138/97 |
| 6,691,741 B2 | 2/2004 | Manners | |
| 7,018,691 B2 | 3/2006 | McNeil | |
| 2003/0209823 A1* | 11/2003 | Waring | F16L 55/18 264/36.17 |
| 2004/0247810 A1* | 12/2004 | McNeil | F16L 55/1656 428/36.9 |
| 2006/0090804 A1* | 5/2006 | Driver | F16L 55/1651 138/98 |
| 2007/0031194 A1* | 2/2007 | Driver | F16L 55/1651 405/184.2 |
| 2016/0186911 A1 | 6/2016 | Manners et al. | |

* cited by examiner

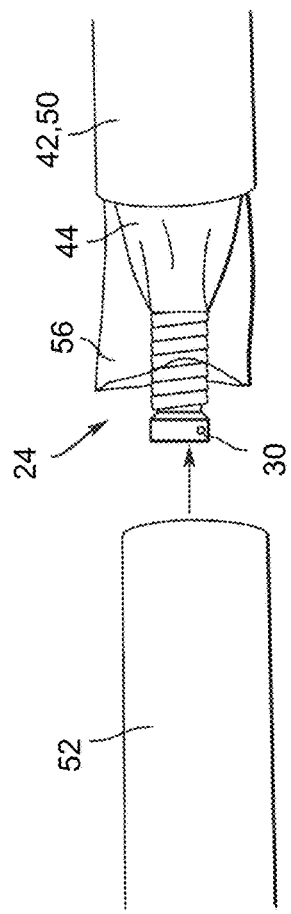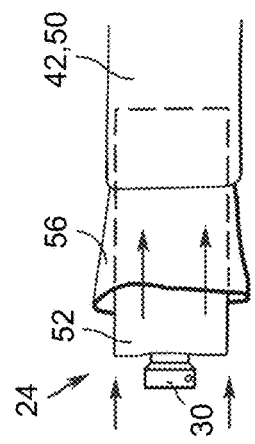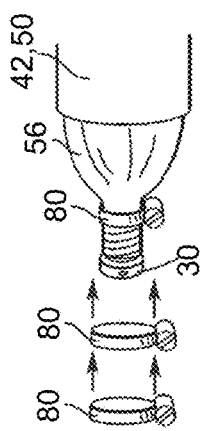

Figure 11x

METHOD OF INSTALLING LINER ASSEMBLY FOR PIPELINE REPAIR OR REINFORCEMENT, AND LINER ASSEMBLY AND STEAM GENERATOR FOR SAME

CROSS-REFERENCE TO RELATED APPLICATIONS

This application claims the benefit of U.S. Provisional Application No. 62/675,750 filed on May 23, 2018, U.S. Provisional Application No. 62/678,527 filed on May 31, 2018, and U.S. Provisional Application No. 62/808,210 filed on Feb. 20, 2019, the contents of which are incorporated herein by reference in their entireties.

FIELD

The subject application generally relates to pipeline repair and/or reinforcement and in particular, to a method of installing a liner assembly for pipeline repair or reinforcement, and to a liner assembly and a steam generator for use with the same.

BACKGROUND

Liners are commonly used to repair and/or reinforce ruptured or weak areas in pipeline networks such as sewer systems and the like. Conventional approaches for installing a liner into a pipeline typically involve excavation to expose the pipeline. However, as will be appreciated, excavation methods are expensive, time consuming and disruptive.

To avoid the problems associated with excavation, "cure-in-place" pipeline repair technology has been developed to allow pipelines to be repaired or reinforced without requiring disruptive excavation. During "cure-in-place" pipeline repair or reinforcement, a resin impregnated liner is delivered to the pipeline section to be repaired or reinforced, is brought into contact with the interior surface of the pipeline section and is maintained in place at that location until the curing process is complete.

Several approaches for positioning "cure-in-place" liners within a pipeline are used in the industry. For example, the liner can be pushed along the pipeline to a desired location using a series of push-rods. As will be appreciated, transitional areas along the pipeline such as bends and fittings create significant delivery problems, as the push-rods may be unable to effectively move beyond these transitional areas.

Alternatively, and more commonly used in the industry, the liner may be pulled along the pipeline to a desired location using a winch and cable. For example, U.S. Pat. No. 6,691,741 to Manners discloses an installation assembly for installing a liner in a pipeline comprising an inner bladder having an installation end and a retrieval end. An outer bladder surrounds the inner bladder. The ends of the inner and outer bladders are coupled together adjacent the installation end. The inner bladder is coupled to an air source at the retrieval end and the outer bladder adjacent the retrieval end is free. Following installation and curing of the liner, the bladder assembly is retrieved by pulling on the retrieval end of the inner bladder, and upon retrieval, the outer bladder is inverted.

Inversion delivery, wherein a liner is unrolled through itself by applied pressure as it projects forwardly into a pipeline, has also been described. For example, U.S. Pat. No. 4,328,012 to Wood discloses a method of impregnating the inner absorbent layer of a long flexible tube with a curable resin. During the method, a mass of the resin is introduced into one end of the tube. A window is formed in the impermeable outer layer of the tube at a distance from the resin mass. A vacuum in the interior of the tube is drawn through the window and concurrently the resin mass is pushed toward the evacuated region by passing the tube between a pair of squeezing members. When the flowing resin reaches the vicinity of the window, the window is sealed. Another window is formed in the tube farther downstream of the previously formed window. A vacuum is drawn through the new window while the squeezing members force the resin to flow toward the newly evacuated region. The procedure is repeated until the resin has spread through the entire inner absorbent layer of the tube.

Improvements are generally desired. It is therefore at least an object to provide a novel method of installing a liner assembly for pipeline repair or reinforcement, and a novel liner assembly and a novel steam generator for use with same.

SUMMARY

In one aspect, there is provided a method of installing a liner assembly for pipeline repair or reinforcement, the method comprising: pulling a prepared liner assembly into position in the pipeline, the liner assembly including an outer tubular liner and an inner inflatable bladder positioned longitudinally within the tubular liner, the tubular liner being wetted with a curable compound; introducing fluid into the inflatable bladder so that the inflatable bladder expands to bring the tubular liner into firm contact with an interior surface of the pipeline; flowing the fluid continuously through the bladder and discharging the fluid into the pipeline, while maintaining the liner assembly in an inflated condition for a time period sufficient for the tubular liner to cure; and deflating the inflatable bladder and retrieving at least a portion of the liner assembly from the pipeline.

The fluid may comprise a mixture of steam and air. The method may further comprise heating the air prior to combining the air with the steam. The method may further comprise increasing a temperature of the inflatable bladder and the tubular liner by increasing a flow rate of fluid through the liner assembly in the inflated condition. Increasing the flow rate may comprise one or both of: increasing pressure of the fluid introduced into the inflatable bladder; and increasing a discharge rate of the fluid into the pipeline. Increasing the discharge rate of the fluid into the pipeline may comprise reducing a release pressure setting of a pressure relief valve connected to an end of the inflatable bladder.

The time period may comprise: a first time period during which a first fluid is flowed through the bladder, the first fluid being a steam-air mixture, and a second time period during which a second fluid is flowed through the bladder. The second fluid may be air at ambient temperature. The second fluid may comprise no steam or less steam than the first fluid. The hardness of the tubular liner may increase during the second time period. The temperatures of the inflatable bladder and the tubular liner may decrease during the second time period.

In another aspect, there is provided a liner assembly for a pipeline section, the liner assembly comprising: an outer tubular liner; an inner inflatable bladder positioned longitudinally within the tubular liner; an inflation block connected to a first end of the inflatable bladder, the inflation block having a nozzle for receiving a fluid comprising steam; and a pull block connected to a second end of the inflatable bladder, the pull block having a fluid discharge outlet.

The fluid may further comprise heated air. The heated air may be heated prior to being combined with the steam.

The fluid discharge outlet may be configured to discharge the fluid into the pipeline.

The fluid discharge outlet may be a pressure relief valve. The pressure relief valve may be an in-line pressure relief valve.

The pull block may be configured to be connected to a winch cable, a hose, or other means for pulling the liner assembly through the pipeline. The fluid discharge outlet may be an in-line pressure relief valve comprising one or more holes for connection to the winch cable, the hose, or the other means for pulling the liner assembly through the pipeline.

The inflatable bladder may have a longitudinal over-expansion inhibiting element therein. The longitudinal over-expansion inhibiting element may be a longitudinally extending strap.

The liner assembly may further comprise radial over-expansion inhibiting structure. The radial over-expansion inhibiting structure may comprise sleeves adjacent opposite ends of the liner assembly.

In another aspect, there is provided a steam generator for use with a liner assembly for pipeline repair or reinforcement, the steam generator comprising: a water heater configured to heat water to generate steam; a water feed conduit configured to convey water to the water heater; an air heater configured to generate heated air; an air supply conduit configured to convey pressurized air to the air heater; a heated air supply conduit configured to convey heated air from the air heater to the water heater to yield a steam-air mixture; and an output conduit configured to convey the steam-air mixture from the water heater.

The steam generator may further comprise a flow meter in fluid communication with the air supply conduit. The flow meter may be configured to output a signal indicating a flow rate of the pressurized air.

The steam generator may further comprise a regulator valve for adjusting a pressure of the pressurized air.

The steam generator may further comprise a temperature sensor or a temperature gauge in thermal communication with the output line.

The steam generator may be portable. The steam generator may be sized to be transported by a single individual.

The steam generator may be powered by AC electrical mains. The water heater may comprise one or more electrically-powered heating elements. The air heater may comprise one or more electrically-powered heating elements.

In another aspect, there is provided a method of installing a liner assembly for pipeline repair or reinforcement, the method comprising: pulling a prepared liner assembly into position in the pipeline, the liner assembly including an outer tubular liner and an inner inflatable bladder positioned longitudinally within the tubular liner, the tubular liner being wetted with a curable compound; introducing fluid into the inflatable bladder so that the inflatable bladder expands to bring the tubular liner into firm contact with an interior surface of the pipeline; flowing the fluid continuously through the bladder and discharging the fluid into the pipeline, while maintaining the liner assembly in an inflated condition; measuring a flow rate and a temperature of the fluid entering the bladder; calculating a time period sufficient for the tubular liner to cure based on: an amount of total heat required for curing, based on dimensional information of a liner, and the measured flow rate and the measured temperature of the fluid; and maintaining the liner assembly in an inflated condition for the time period sufficient for the tubular liner to cure.

The method may further comprise deflating the inflatable bladder and retrieving at least a portion of the liner assembly from the pipeline.

The measuring may further comprise measuring the flow rate and the temperature of the fluid using a temperature sensor and a flow rate meter, and wherein the calculating is carried out by processing structure in communication with the temperature sensor and the flow rate meter.

The method may further comprise: measuring a temperature of the fluid being discharged into the pipeline, wherein the calculating of the time period is further based on: a difference between the temperature of the fluid entering the bladder and the temperature of the fluid being discharged into the pipeline.

The curable compound may be an epoxy, and the calculating of the time period is further based on curing properties of the epoxy.

In another aspect, there is provided an automated steam generator system for use with a liner assembly for a pipeline section, the system comprising: a steam generator configured to flow a steam-air mixture continuously through a bladder of the liner assembly inflated within the pipeline, the bladder being positioned within a tubular liner wetted with a curable compound, the steam generator comprising: a temperature sensor measuring a temperature of the steam-air mixture entering the bladder, and a flow rate meter measuring a flow rate of the of the steam-air mixture entering the bladder; and a computing device in communication with the steam generator and comprising: processing structure, and memory in communication with the processing structure and storing computer-readable code comprising instructions which, when executed by the processing structure, cause the computing device to: calculate a time period sufficient for the tubular liner to cure based on: an amount of total heat required for curing, based on dimensional information of a liner, and the measured flow rate and the measured temperature of the fluid; and control the steam generator to flow the steam-air mixture through the bladder for the time period sufficient for the tubular liner to cure.

The system may further comprise an additional temperature sensor measuring a temperature of the fluid being discharged into the pipeline, and further comprising computer-readable code comprising instructions which, when executed by the processing structure, cause the computing device to: calculate the time period further based on a difference between the temperature of the fluid entering the bladder and the temperature of the fluid being discharged into the pipeline.

The curable compound may be an epoxy, and further comprising computer-readable code comprising instructions which, when executed by the processing structure, cause the computing device to: calculate the time period further based on curing properties of the epoxy.

BRIEF DESCRIPTION OF THE DRAWINGS

Embodiments will now be described more fully with reference to the accompanying drawings in which:

FIGS. 6a to 6c are side views showing installation of a retaining sleeve during assembly of the liner assembly of FIG. 1;

FIGS. 10b to 10f are perspective and end views of portions of the automated steam generator of FIG. 10a;

DETAILED DESCRIPTION OF EMBODIMENTS

The foregoing summary, as well as the following detailed description of certain examples will be better understood when read in conjunction with the appended drawings. As used herein, an element or feature introduced in the singular and preceded by the word "a" or "an" should be understood as not necessarily excluding the plural of the elements or features. Further, references to "one example" or "one embodiment" are not intended to be interpreted as excluding the existence of additional examples or embodiments that also incorporate the described elements or features. Moreover, unless explicitly stated to the contrary, examples or embodiments "comprising" or "having" or "including" an element or feature or a plurality of elements or features having a particular property may include additional elements or features not having that property. Also, it will be appreciated that the terms "comprises", "has", "includes" means "including by not limited to" and the terms "comprising", "having" and "including" have equivalent meanings.

As used herein, the term "and/or" can include any and all combinations of one or more of the associated listed elements or features.

It will be understood that when an element or feature is referred to as being "on", "attached" to, "connected" to, "coupled" with, "contacting", etc. another element or feature, that element or feature can be directly on, attached to, connected to, coupled with or contacting the other element or feature or intervening elements may also be present. In contrast, when an element or feature is referred to as being, for example, "directly on", "directly attached" to, "directly connected" to, "directly coupled" with or "directly contacting" another element of feature, there are no intervening elements or features present.

It will be understood that spatially relative terms, such as "under", "below", "lower", "over", "above", "upper", "front", "back" and the like, may be used herein for ease of description to describe the relationship of an element or feature to another element or feature as illustrated in the figures. The spatially relative terms can however, encompass different orientations in use or operation in addition to the orientation depicted in the figures.

Figure 1:
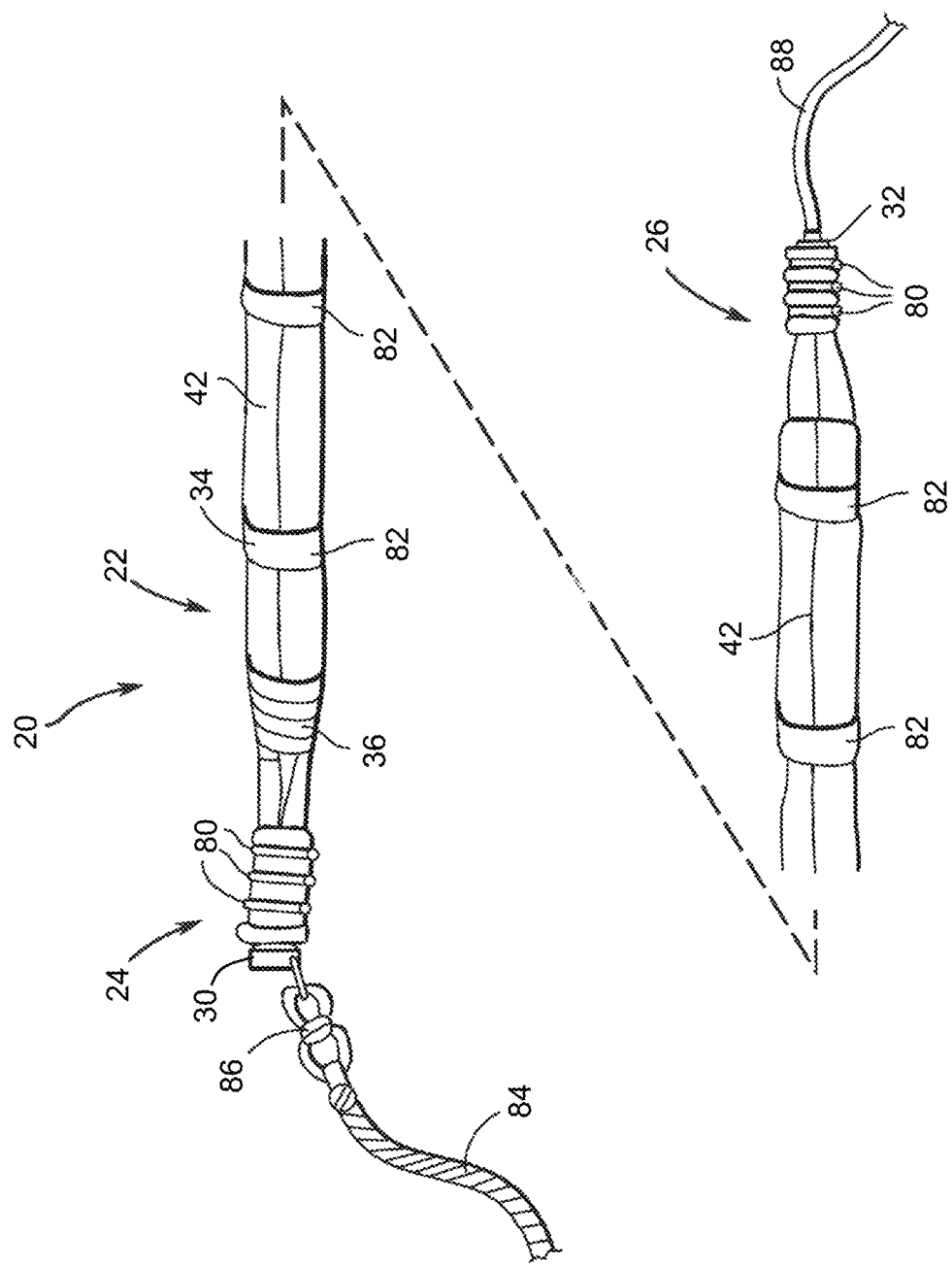
FIG. 1 is a side view of a liner assembly for pipeline repair or reinforcement.

Turning now to FIG. 1, a liner assembly is shown and is generally identified by reference numeral 20. Liner assembly 20 includes a liner segment 22, which has an installation end 24 at one end thereof and an inflation end 26 at the opposite end thereof. To facilitate positioning of the liner assembly 20 in a pipeline, the installation end 24 is fitted with a pull block in the form of an in-line pressure relief valve 30 that enables attachment of a suitable pull mechanism (i.e. a winch). The liner segment 22 is also fitted with an inflation block 32 at the inflation end 26, so as to allow the interior area of the liner segment 22 to be inflated. In the embodiment shown, the liner segment 22 is longitudinally folded over itself and bound at a plurality of spaced locations, in this example at twelve (12) to eighteen (18) inch intervals, using tape 34 or other suitable binding material. The liner assembly 20 further comprises tapered sections 36 formed proximate the installation end 24 and the inflation end 26. The longitudinal folded liner segment 22 and the tapered sections 36 of the liner assembly 20 allow the liner assembly 20 to be manipulated and moved to a desired location within the pipeline.

Figure 2:
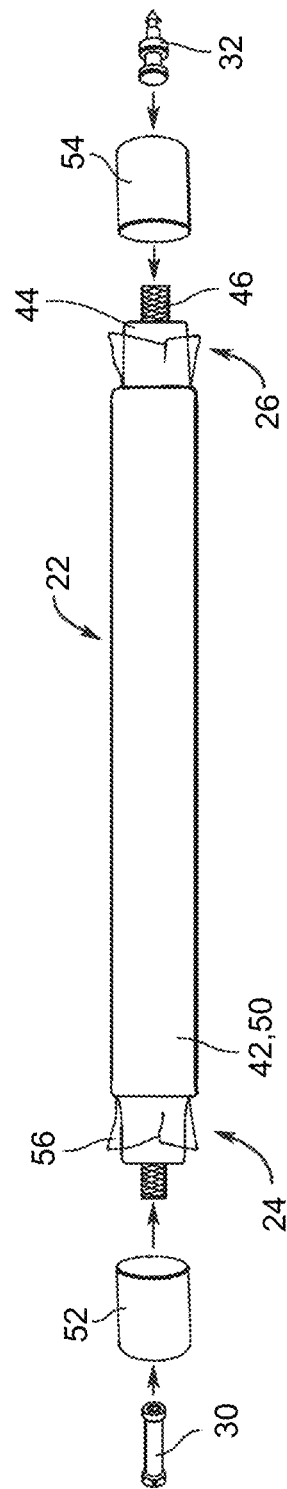
FIG. 2 is a partially exploded side view of a liner segment forming part of the liner assembly of FIG. 1.
Figure 3:
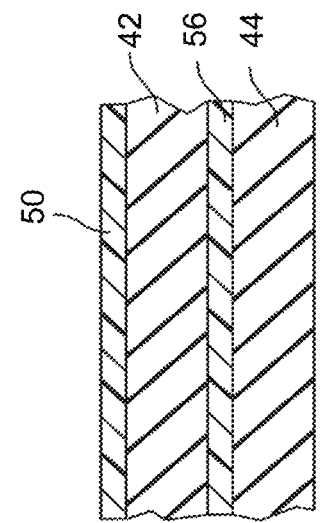
FIG. 3 is a sectional view of a portion of the liner segment of FIG. 2.
Figure 4C:
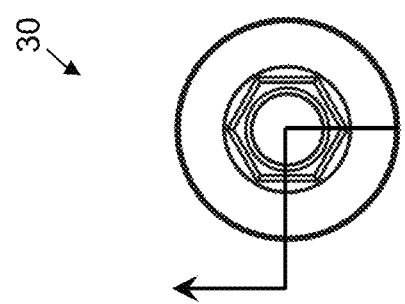
FIGS. 4a to 4c are perspective, side and top views, respectively, of a pressure relief valve forming part of the liner assembly of FIG. 1.
Figure 4B:
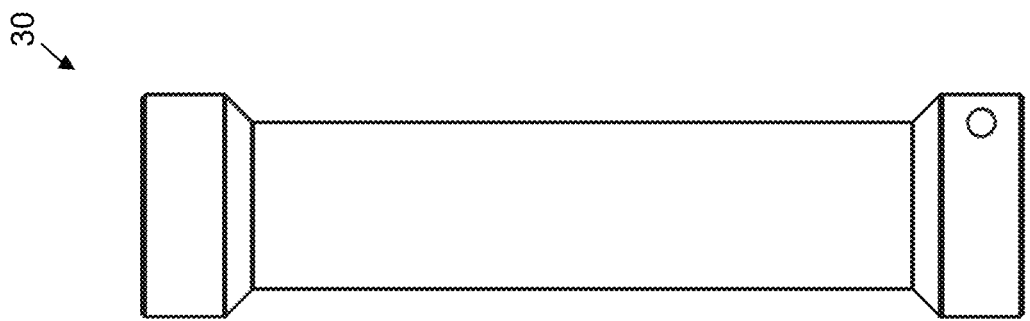
Figure 4A:
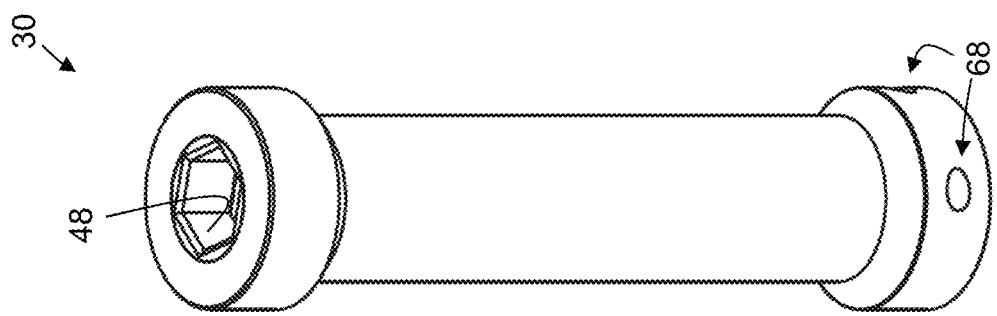
Figure 4E:
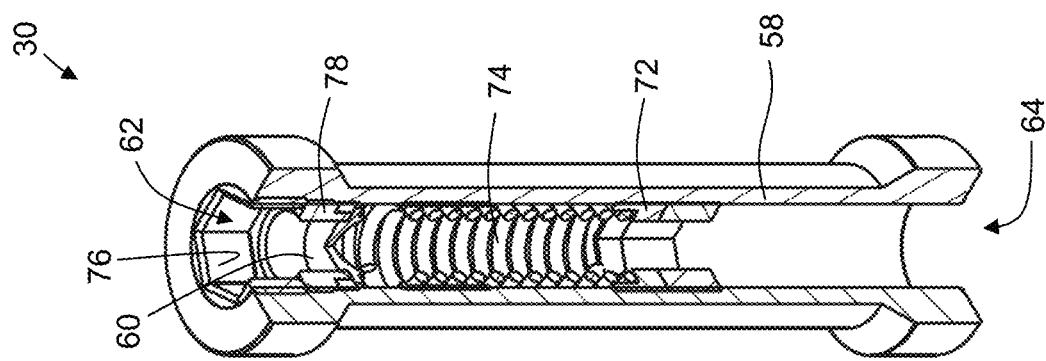
FIGS. 4d and 4e are sectional views of the pressure relief valve of FIG. 4c, taken along the indicated section line.
Figure 4D:
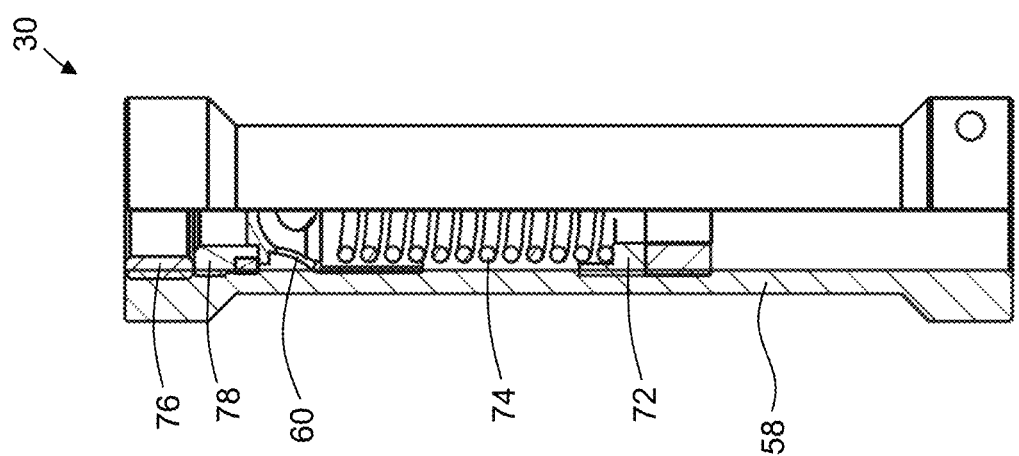

FIGS. 2 and 3 better illustrate the liner segment 22. Liner segment 22 is generally provided in stock manufactured lengths, and is preferably provided on a roll, with desired lengths being cut from stock. The liner segment 22 is generally dimensioned to suit pipelines ranging from 1½ inches up to 12", but those of skill in the art will appreciate that the liner segment 22 may be dimensioned to accommodate smaller or larger pipeline diameters. As can be seen, liner segment 22 is multi-layered, and comprises a tubular liner 42, an elongate malleable inflatable bladder 44 extending longitudinally through the tubular liner, and a longitudinal over-expansion inhibiting element in the form of a non-stretchable strap 46 positioned within and extending the length of the inflatable bladder 44. In this embodiment, the tubular liner 42 is fabricated of a felt material, the inflatable bladder 44 is fabricated of rubber, and the non-stretchable strap 46 is fabricated of woven nylon. The liner segment 22 further comprises a plastic sheathing 50 over the outer surface of the tubular liner 42. In this embodiment, the plastic sheathing 50 has a first longitudinal edge that is configured to overlap a second longitudinal edge, and the overlap is tack welded for fitting the plastic sheathing 50 to the outer surface of the tubular liner 42. Non-stretchable retaining sleeves 52 and 54 are positioned adjacent opposite ends of the liner segment 22 to inhibit radial over-expansion of the liner assembly 20. In this embodiment, the liner segment 22 also comprises a release plastic 56 positioned between the tubular liner 42 and the inflatable bladder 44.

The pressure relief valve 30 is shown in FIGS. 4a to 4e. The pressure relief valve 30 has a tubular body 58 defining a flow passage therethrough that is obstructed by a moveable seal 60. The body 58 has an inlet 62 and an outlet 64 at opposite ends thereof. Eyelet holes 68 are formed in the body 58 adjacent the outlet 64 to enable attachment of a winch cable, described below. In the interior of the body 58 is an annular base 72, on which is seated a coil spring 74 that provides an opposing force against inward movement of the seal 60. At the inlet 62, the body 58 accommodates an annular rotatable nut 76 abutting an annular sleeve 78 disposed against the seal 60. The rotatable nut 76 has screw threads (not shown) on an outer surface thereof that engage screw threads (not shown) formed on an inner surface of the body 58. As will be understood, the release pressure setting of the pressure relief valve 30 may increased by rotating the rotatable nut 76 in a first direction to move the annular sleeve 78 and seal 60 toward the spring 74, and may be decreased by rotating the rotatable nut 76 in a second direction to move the annular sleeve 78 and seal 60 away from the spring 74. In operation, when the pressure on the inlet side of the seal 60 exceeds the release pressure setting of the pressure relief valve 30, the seal 60 is forced open away from the sleeve 78 and against the opposing force of the spring 74, permitting flow through the flow passage of the body 58 for discharge at the outlet 64.

In use, to repair or reinforce a damaged section of pipeline, the required length of liner is first determined. In this embodiment, a video camera connected to a video camera line is inserted into and moved along the interior of the pipeline. The camera line is marked at positions corresponding to the ends of the damaged section of pipeline to be repaired or reinforced. To ensure that the liner segment 22 adequately covers the interior area of the pipeline to be repaired or reinforced, and to allow the liner segment 22 to be trimmed as needed and to have the appropriate installation gear fitted thereto, an extra length portion is added to each end of the liner segment. In this embodiment, the extra length portion is approximately equal to 10" (250 mm). A liner segment 22 having an appropriate length is then cut from stock.

The cut liner segment 22 is then prepared in accordance with FIG. 2. Thus, during preparation, portions of the tubular liner 42 and the plastic sheathing 50 proximate the ends 24 and 26 of the liner segment 22 are removed by cutting so as to expose the underlying inflatable bladder 44 and release plastic 56. For smaller diameter liners (up to 4"), about 6" of exposed inflatable bladder is sufficient. For larger diameter liners, about 9" of exposed inflatable bladder is sufficient. The tubular liner 42, plastic sheathing 50 and inflatable bladder 44 and the release plastic 56 are then trimmed to expose a length (i.e. 4") of strap 46 at each of the ends 24 and 26.

Figure 5B:
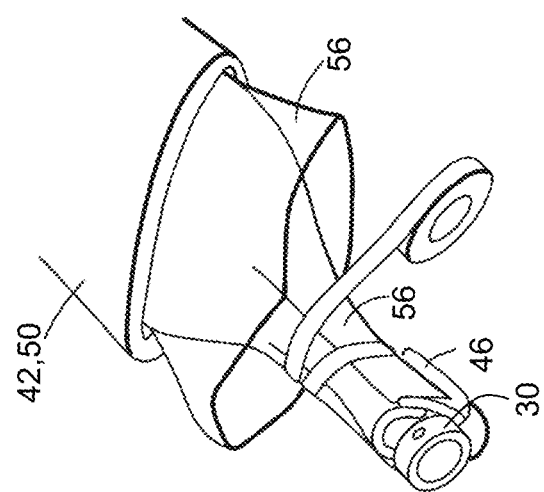
FIGS. 5a and 5b are perspective views showing installation of a pull block during assembly of the liner assembly of FIG. 1.
Figure 5A:
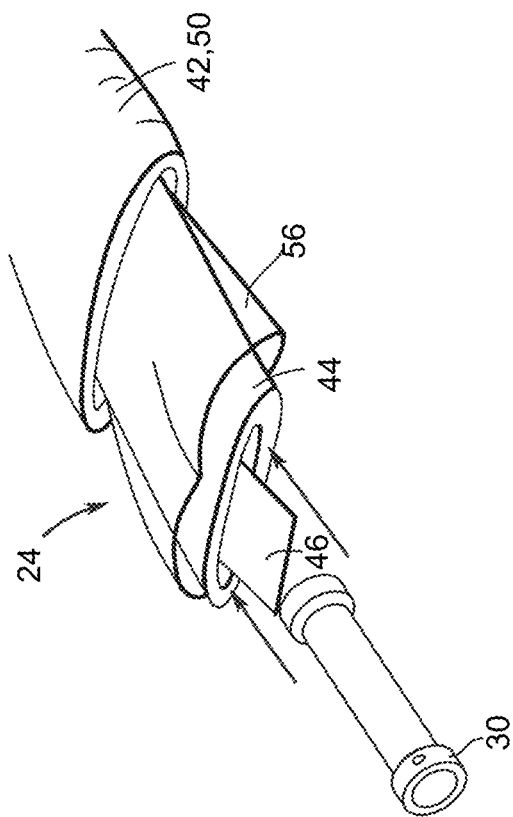

To prepare the trimmed liner segment 22 for installation, installation end 24 and inflation end 26 are sealed with suitable installation gear. As shown in FIG. 5a, at installation end 24, the pressure relief valve 30 is inserted into the inflatable bladder 44. The inflatable bladder 44 in the region surrounding the inserted pressure relief valve 30 is subsequently folded in or cinched (as shown in FIG. 5b) onto the pressure relief valve 30, ensuring a fit that is sufficiently tight for allowing inflation of the inflatable bladder 44 later in the procedure. During preparation of installation end 24, strap 46 is tightly incorporated either into the folds of the inflatable bladder 44, or into the taping used to securely maintain this arrangement at installation end 24, as shown in FIG. 5b. Inflation end 26 is similarly prepared (not shown), substituting inflation block 32 for the pressure relief valve 30 of the installation end 24. Similar to installation end 24, strap 46 is tightly incorporated into the folds or taping at inflation end 26.

The ends 24, 26 of the liner assembly 20 are further prepared by inserting, between the release plastic 56 and the inflatable bladder 44, proximate each end 24, 26, the retaining sleeves 52, 54, as shown in FIG. 6a (only end 24 and retaining sleeve 42 are shown). Each retaining sleeve 52, 54 is cut to a length that starts at the front edge of the installation gear (i.e. pressure relief valve 30 or inflation block 32) and extends into the liner at least 6", as shown in FIG. 6b. As shown in FIG. 6c, at each end 24, 26, the retaining sleeve 52, 54 and release plastic 56 is folded in, over the taped ends previously prepared, and securely taped. Each end 24, 26 is then further secured using suitable clamps 80 to ensure a tight fit around the blocks positioned therein. In the embodiment shown, clamps 80 are gear clamps.

With the liner assembly 20 sealed at both ends 24, 26 with the appropriate installation gear, the outer tubular liner 42 is impregnated with an appropriate resin (i.e. epoxy). The process of impregnating the outer tubular liner 42 is commonly referred to as "wetting". In this embodiment, the outer tubular liner 42 is wetted by delivering resin to the space between the outer tubular liner 42 and the release plastic 56 at one of the ends 24, 26. Rollers (not shown) are then used to move the resin along the length of the tubular liner 42, as is known in the art. To ensure complete wetting of the tubular liner 42, resin can be applied to both ends 24, 26.

After the tubular liner 42 has been wetted, the plastic sheathing 50 is scored to facilitate migration of the resin out of the tubular liner 42. Contact of the resin with the pipeline being repaired ensures that the liner being installed is fixed in place. The outside surface of the plastic sheathing 50 is then wiped to ensure a clean dry surface. Turning again to FIG. 1, the liner assembly 20 is then longitudinally folded and taped at approximately 12" to 18" intervals 82 to retain this folded arrangement.

To facilitate entry and/or movement of the liner assembly 20 in a pipeline, the leading edge of the tubular liner 42 is taped to form a tapered configuration 62. A winch cable 84 is attached to pressure relief valve 30 at installation end 24. In this embodiment, devises 86 are used to attach winch cable 84 to the pressure relief valve 30. An inflation line 88 is attached to inflation block 32 of inflation end 26.

Figure 7A:
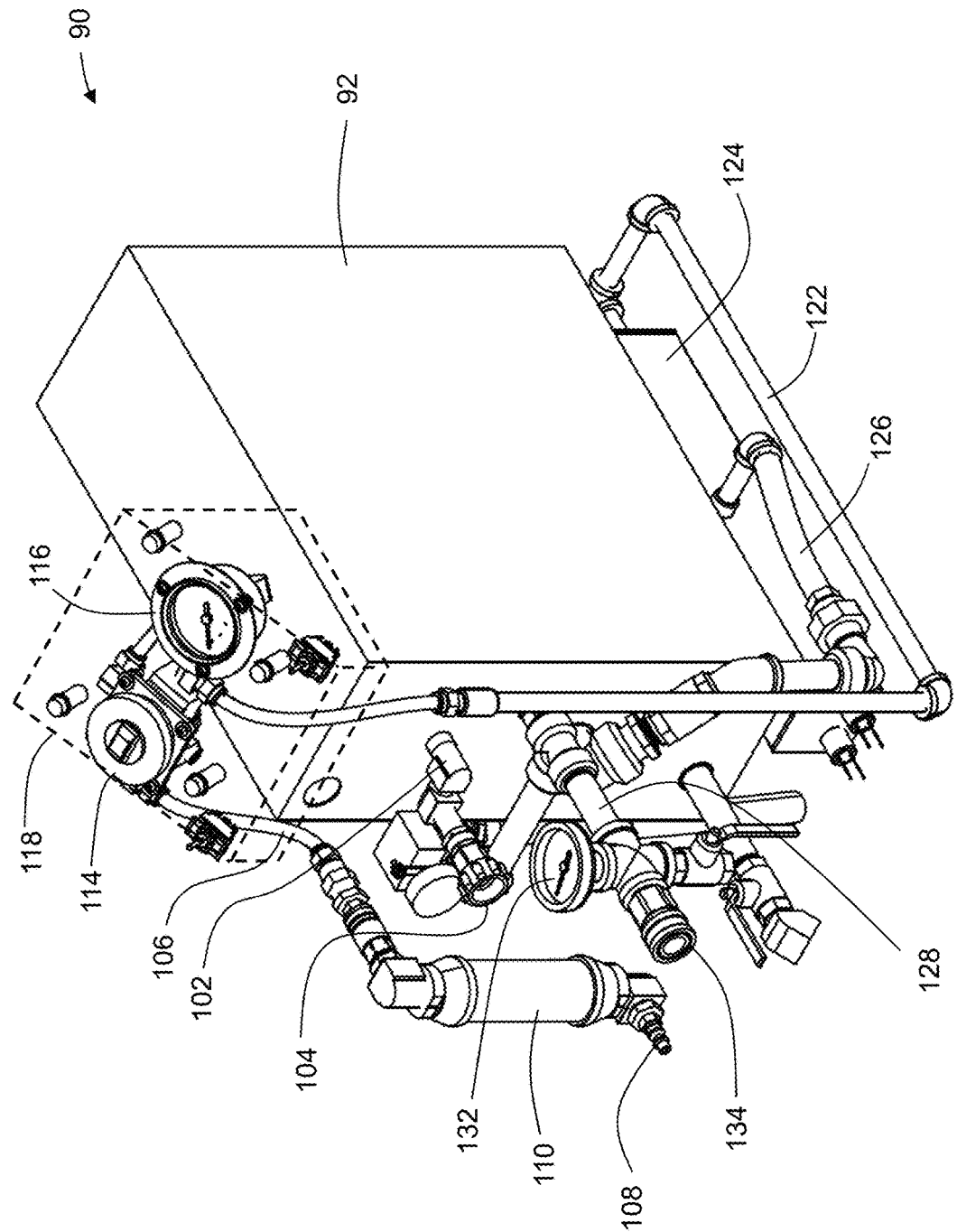
FIGS. 7a to 7c are perspective, front and side views, respectively, of a steam generator for use with the liner assembly of FIG. 1.
Figure 7C:
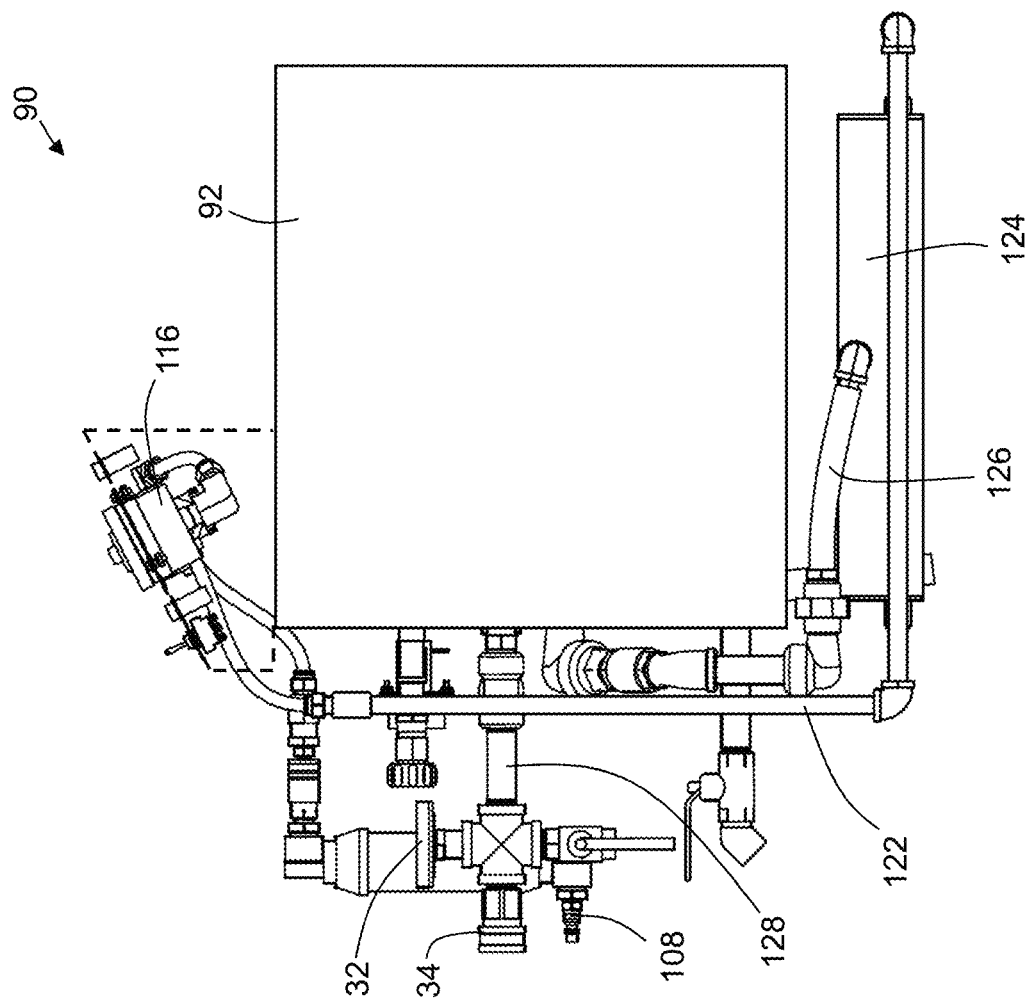
Figure 7B:
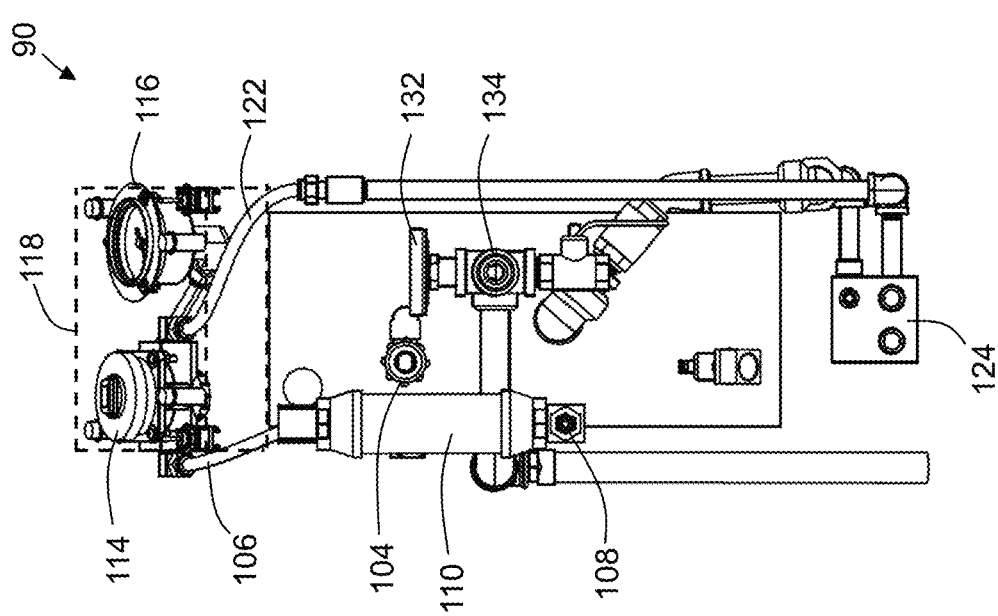

The liner assembly 20 is configured to be inflated by a steam generator, which is shown in FIGS. 7a to 7c and is generally indicated by reference numeral 90. Steam generator 90 is portable, and is sized to be transported on a push trolley to enable the steam generator 90 to be moved to and from a job site by a single worker. In the example shown, the steam generator 90 occupies a footprint of thirty-two (32) inches by twenty-four (24) inches, and has a height of eighteen (18) inches, and has a weight of about one-hundred (100) pounds.

Figure 7D:
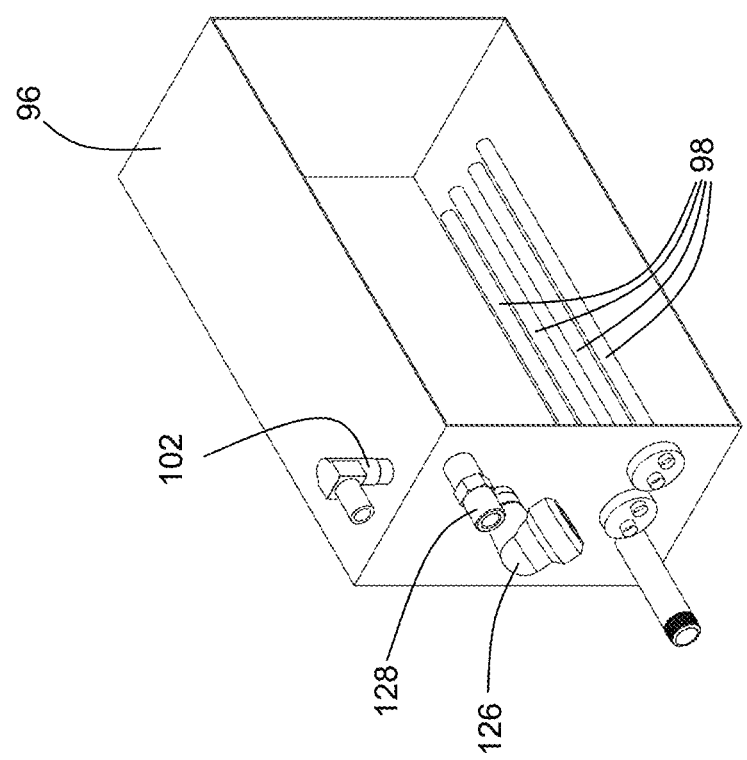
FIG. 7d is a perspective cutaway view of a water heater forming part of the steam generator of FIGS. 7a to 7c.

The steam generator 90 comprises a housing 92 that accommodates a box-shaped water heater 94, which is shown in cutaway view in FIG. 7d. The water heater 94 comprises a container 96 that houses a plurality of heating elements 98 positioned near the floor of the container 96. The heating elements 98 are configured to heat water to generate steam. A water feed conduit 102 is mounted on a side of the housing 92, and conveys water into the top of the container 96. The water feed conduit 102 includes a hose connector 104 that is configured to be connected to a source (not shown) of pressurized water. The steam generator 90 also comprises a pressurized air input conduit 106 having a port 108 that is configured to be connected to a source (not shown) of pressurized air, which in this embodiment is a portable air compressor. The pressurized air input conduit 106 has a flow meter 110 and a regulator valve 114 fitted thereto, with the flow meter 110 being configured to output a signal indicating a flow rate of the pressurized air. A pressure gauge 116 is connected to the regulator valve 114 for displaying air pressure downstream of the regulator valve 114. The regulator valve 114 and pressure gauge 116 are supported by a panel 118 mounted on the housing 92, the panel 118 being fabricated of metal sheet or the like. A first air conduit 122 conveys the pressurized air from the regulator valve 114 to an air heater 124, which comprises one or more internal heating elements (not shown) configured to pre-heat the air. A second air conduit 126 conveys the heated air from the air heater 124 into the water heater 94, where the heated air is combined with steam generated by the heating elements 98, which accumulates in the upper volume of the container 96 during operation, to yield a steam-air mixture. The steam-air mixture is conveyed out of the water heater 94 through an output conduit 128, which has a temperature gauge 132 mounted thereon for displaying the temperature of the outgoing steam-air mixture. The output conduit 128 has a connector 134 that is configured to be connected to the inflation line 88.

The steam generator 90 also comprises an electrical cable (not shown) and plug (not shown) that are configured to be connected to AC mains (not shown), for powering the heating elements 98 of the water heater 94 and the heating elements (not shown) of the air heater 124. The AC mains are any of one-hundred and twenty (120) V mains in North America, two-hundred and thirty (230) V mains in Europe, and the like.

Figure 8A:
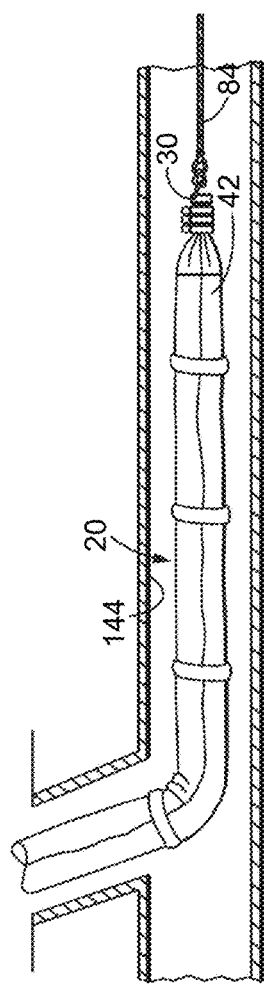
FIGS. 8a to 8c are side views, partly in section, showing installation of the liner assembly of FIG. 1 into a pipeline to be repaired or reinforced.
Figure 8B:
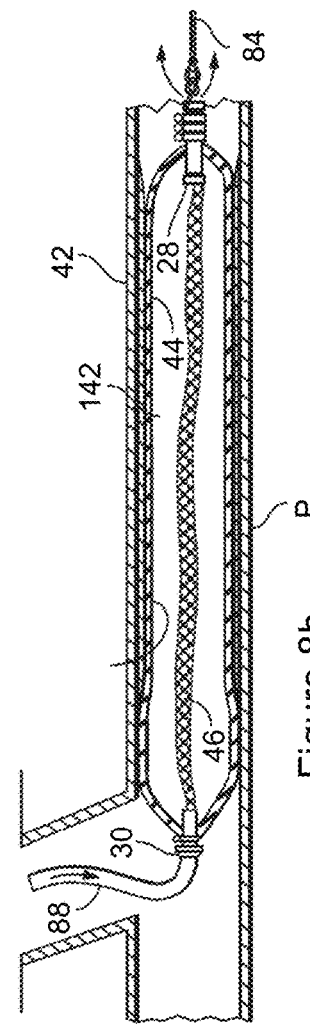
Figure 8C:
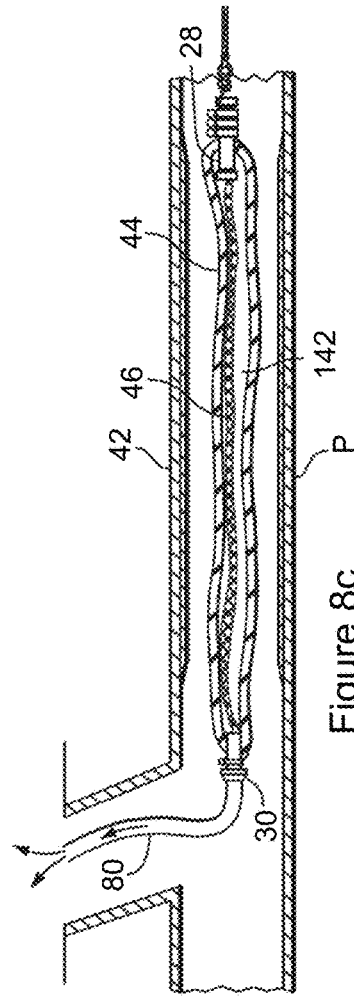

FIGS. 8a through 8c show installation of the liner assembly 20 in a section of pipeline P. During installation, the winch (not shown) is used to pull the liner assembly 20 into the pipeline P via a winch cable 84, as shown in FIG. 8a. The liner assembly 20 is positioned within the pipeline section to be repaired or reinforced. Once the liner assembly 20 is at the desired position, the air compressor and the steam generator 90 are operated to supply steam-air mixture through the inflation line 88 connected to inflation block 32. Steam-air mixture supplied through the inflation line 88 passes through inflation block 32 and enters internal reservoir 142 of the inflatable bladder 44. The inflatable bladder 44 is in turn inflated until the liner assembly 20 expands to the point where the tubular liner 42 firmly contacts the interior surface 144 of the pipeline, as shown in FIG. 8b. During inflation, the taped portions of the liner assembly 20 release, allowing the liner assembly, and surrounding plastic sheathing 50 to expand and contact the interior surface 144. Once inflated, the pressure in the internal reservoir 142 increases until the release pressure setting of the pressure relief valve 30 is reached, at which point the pressure relief valve 30 opens and excess pressure is released through the pressure relief valve 30 into the pipeline P, as shown in FIG. 8b. The liner assembly 20 is then maintained in this inflated condition, with continuous flow of steam-air mixture through the internal reservoir 142 and through the pressure relief valve 30, for a first time period sufficient to enable the wetted outer felt tubular liner 42 to cure. In this embodiment, the duration of the first time period is calculated using the measured temperature of the outgoing steam-air mixture, the ambient temperature at the job site, and the lengths of the inflation line 88 and the liner segment 22.

As will be understood, the temperature of the inflatable bladder 44 and the tubular liner 42 may be increased during operation by increasing the flow rate of steam-air mixture therethrough. This is achievable by one or both of increasing the pressure of the steam-air mixture introduced into the inflatable bladder 44 by adjusting the regulator valve 114 during use, and increasing the discharge rate of the steam-air mixture into the pipeline P by reducing the release pressure setting of the pressure relief valve 30 prior to positioning the liner assembly 20 within the pipeline P. The temperature of the inflatable bladder 44 and the tubular liner 42 may be decreased during operation in an opposite manner.

In this embodiment, at the end of the first time period, the water feed, the heating elements 98 of the water heater 94, and the heating elements of the air heater 124 are turned off, and unheated pressurized air (only) at generally ambient temperature is flowed continuously through the internal reservoir 142 and through the pressure relief valve 30 for a second time period sufficient to allow the liner assembly 20 to cool. It has been observed during testing that the cured tubular liner 42 hardens further during the second time period. In this embodiment, the second time period is between about twenty (20) minutes and about thirty (30) minutes.

Following curing of the tubular liner 42, the steam generator 90 is deactivated and the air-steam mixture within the internal reservoir 142 is released through the inflation block 32 and inflation line 88 (see FIG. 8c), allowing the inflatable bladder 44 to resume its natural flat state. Once evacuated, the inflatable bladder is then withdrawn from the pipeline P via winch cable 84, leaving the cured tubular liner 42 in position within the pipeline.

As will be appreciated, the continuous flow of the steam-air mixture through the internal reservoir 142 allows the tubular liner 42 to be maintained at an elevated temperature during curing, which advantageously increases the curing rate of the epoxy impregnating the tubular liner 42. As will be understood, increasing the curing rate reduces the time needed for the tubular liner 42 to cure, which in turn allows a greater number of liners to be installed in a single day by a single worker or crew, thereby increasing throughput and worker efficiency.

As will be appreciated, the continuous flow of the steam-air mixture through the internal reservoir 142 and the pressure relief valve 30 allows the temperature of the felt tubular liner 42 to be controlled regardless of the ambient conditions (i.e. temperature and humidity) at the job site. As will be understood, this advantageously provides consistency in curing conditions from job site to job site, which in turn simplifies the curing process and renders it less of an "art", and facilitates training of new workers. Further, and as will be understood, this advantageously provides consistency in curing conditions from worker to worker.

Additionally, and as will be appreciated, the continuous flow of the steam-air mixture through the internal reservoir 142 and the pressure relief valve 30 advantageously prevents condensation from accumulating inside of the bladder 44, which would otherwise impede heat transfer from the flowing steam-air mixture to the tubular liner 42.

As will be appreciated, the use of the pressure relief valve 30 allows the steam-air mixture to be discharged directly into the pipeline P. As will be understood, this advantageously eliminates the need to recirculate steam within the liner assembly during curing, which would otherwise require bulky pull blocks and/or bulky inflation blocks to accommodate the necessary additional tubing needed for recirculation. As will be understood, such bulky pull blocks and/or bulky inflation blocks would otherwise create difficulty during pulling of the liner assembly into the pipeline, and during withdrawal of the liner assembly from the pipeline.

As will be appreciated, the steam-air mixture used to cure the tubular liner 44 is relatively light in weight, which advantageously allows the liner assembly 20 to be used to repair or reinforce vertically-oriented sections of pipeline. In contrast, prior art liner assemblies that use hot water to cure prior art tubular liners are not suitable for use in vertically-oriented sections of pipeline, due to the weight of the column of hot water.

As will be appreciated, the air heater 124 of the steam generator 90 allows the air temperature to be controlled prior to combining with steam. As will be understood, this feature advantageously provides improved temperature control of the resulting steam-air mixture, as compared to prior art systems that use only steam to cure epoxy.

As will be appreciated, the air heater 124 of the steam generator 90 enables the steam-air mixture to be generated using less energy to heat the water to generate steam. As will be understood, this feature advantageously allows the size of the water heater 94 (and in turn the size of the steam generator 90) to be reduced, as compared to prior art steam generators that do not have an air heater for pre-heating air.

As will be appreciated, the small size of the steam generator 90 enables it to be electrically powered by plugging into AC mains. As will be understood, this advantageously allows the steam generator 90 to be operated indoors, in contrast with prior art gas- or diesel-powered steam generators for use with prior art pipeline repair systems.

As will be appreciated, the portability of the steam generator 90 allows the steam-air mixture to be generated near to the location of the pipeline to be repaired or reinforced, which advantageously eliminates the need for steam to otherwise be generated remotely and/or be conveyed to the location of the pipeline via separate tubing. As will be understood, the use of separate tubing for conveying such remotely-generated steam would otherwise be tedious, and would otherwise create a safety hazard for workers at the location of the pipeline.

Although in the embodiment described above, at the end of the first time period, the water feed and water heater are turned off, and pressurized air (only) is flowed continuously through the internal reservoir and through the pressure relief valve for a second time period, in other embodiments, there may alternatively be no second time period during which only pressurized air flow is flowed.

Although in the embodiment described above, the required length of liner is determined by inserting and moving a video camera connected to a video camera line along the interior of the pipeline, in other embodiments, the required length of liner may alternatively be determined using other methods.

Although in the embodiment described above, during preparation of installation end, the strap is tightly incorporated into the folds of the inflatable bladder or the taping used to securely maintain this arrangement, in other embodiments, the strap may alternatively be firmly attached to the pull block, with the inflatable bladder being folded in or cinched in a similar manner as that described above.

Although in the embodiment described above, the ends of the liner segment are sealed around the installation gear in two stages, namely by taping and by clamping, in other embodiments, each of the ends of the liner segment may alternatively be sealed around the installation gear in any manner so as to achieve substantially sealed ends.

Although in the embodiment described above, the tubular liner is fabricated of a felt material, in other embodiments, the tubular liner may alternatively be fabricated of another material.

Although in the embodiment described above, the non-stretchable strap is fabricated of woven nylon, in other embodiments, the non-stretchable strap may alternatively be fabricated of woven vinyl. In still other embodiments, the non-stretchable strap may alternatively be fabricated of any suitable durable, non-stretchable material.

Although in the embodiment described above, the retaining sleeves are fabricated of woven nylon, in other embodiments, the retaining sleeves may alternatively be fabricated of woven vinyl. In still other embodiments, the retaining sleeves may alternatively be fabricated of any suitable durable, non-stretchable material.

Although in the embodiment described above a strap is employed to inhibit longitudinal over-expansion of the liner assembly and sleeves are employed to inhibit radial over-expansion of the liner assembly, those of skill in the art will appreciate that alternative structure or elements may be employed to achieve this functionality.

Although the installation of the liner assembly has been shown with respect to a linear section of pipeline, the liner assembly may also be used to install a liner in a bent section of pipeline. The ability of the liner assembly to adapt to bends (i.e. 22°, 45°, 90°) is provided by the malleable nature of the inflatable bladder 44 used in the liner assembly. As the liner assembly is inflated in a transitional area, the bladder not only stretches to accommodate the air pressure contained therein, but conforms to the bend so as to ensure the resin-impregnated liner is urged into contact with all surfaces of the transitional area. The inflatable bladder achieves this by allowing variable stretching, i.e. stretching less at the inside edge while stretching more at the outside edge of the bend. Prior art systems that used woven nylon or vinyl bladder systems could not achieve this variable stretching, ultimately resulting in creases and/or folds being formed in the resin-impregnated and resultant cured liner. Additionally, and advantageously, the bonded portion of the inflatable bladder (or the first inflatable bladder) left in position within the pipeline has been found to effectively smoothen any crease and/or fold formed in the resultant cured liner. The reduction and/or elimination of these creases results in greater fluid flow in the repaired section and well as a reduction in the likelihood of debris retainment and possible obstruction.

Figure 9:
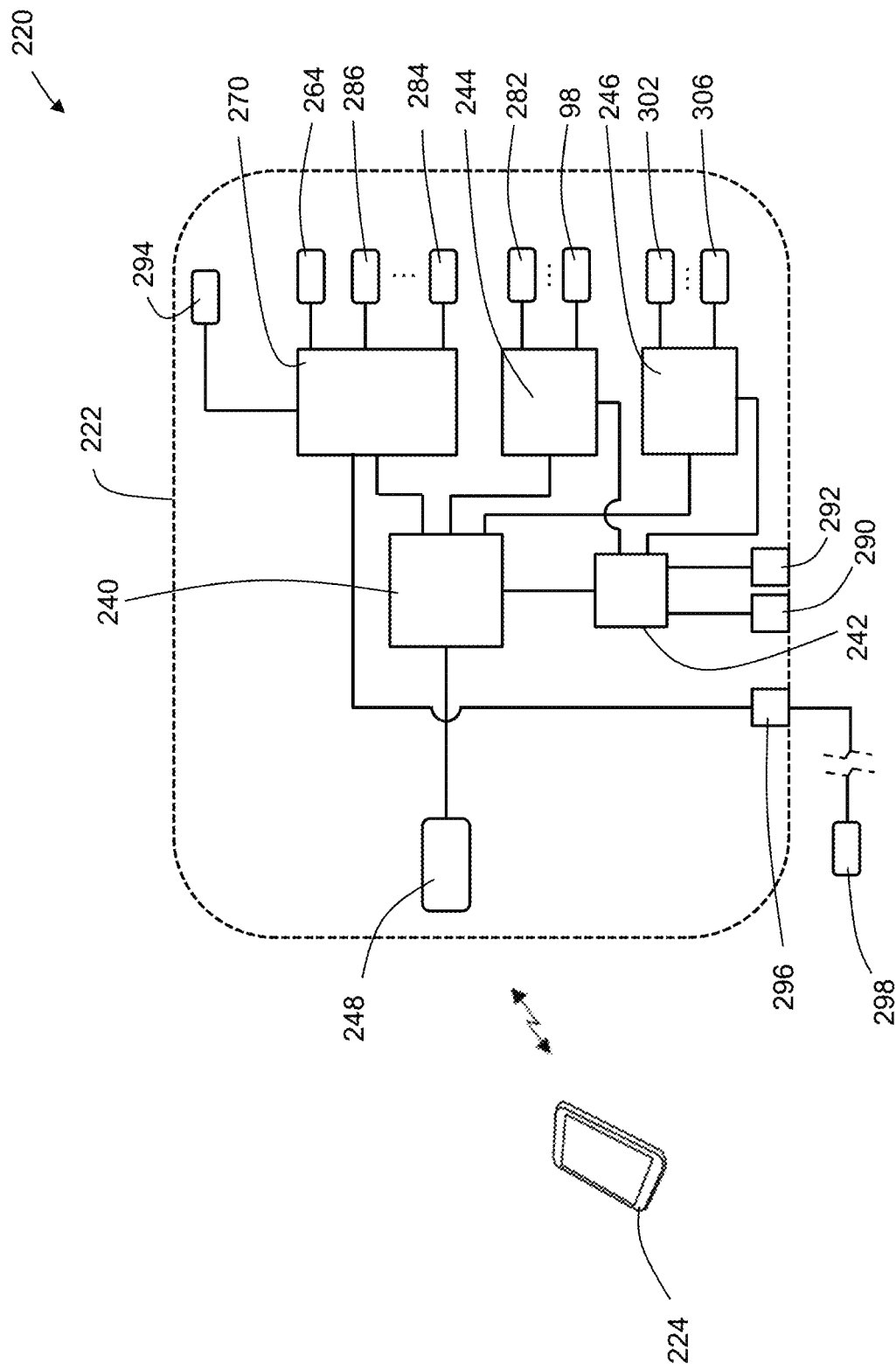
FIG. 9 is a schematic view of an automated steam generator system for use with the liner assembly of FIG. 1.
Figure 10A:
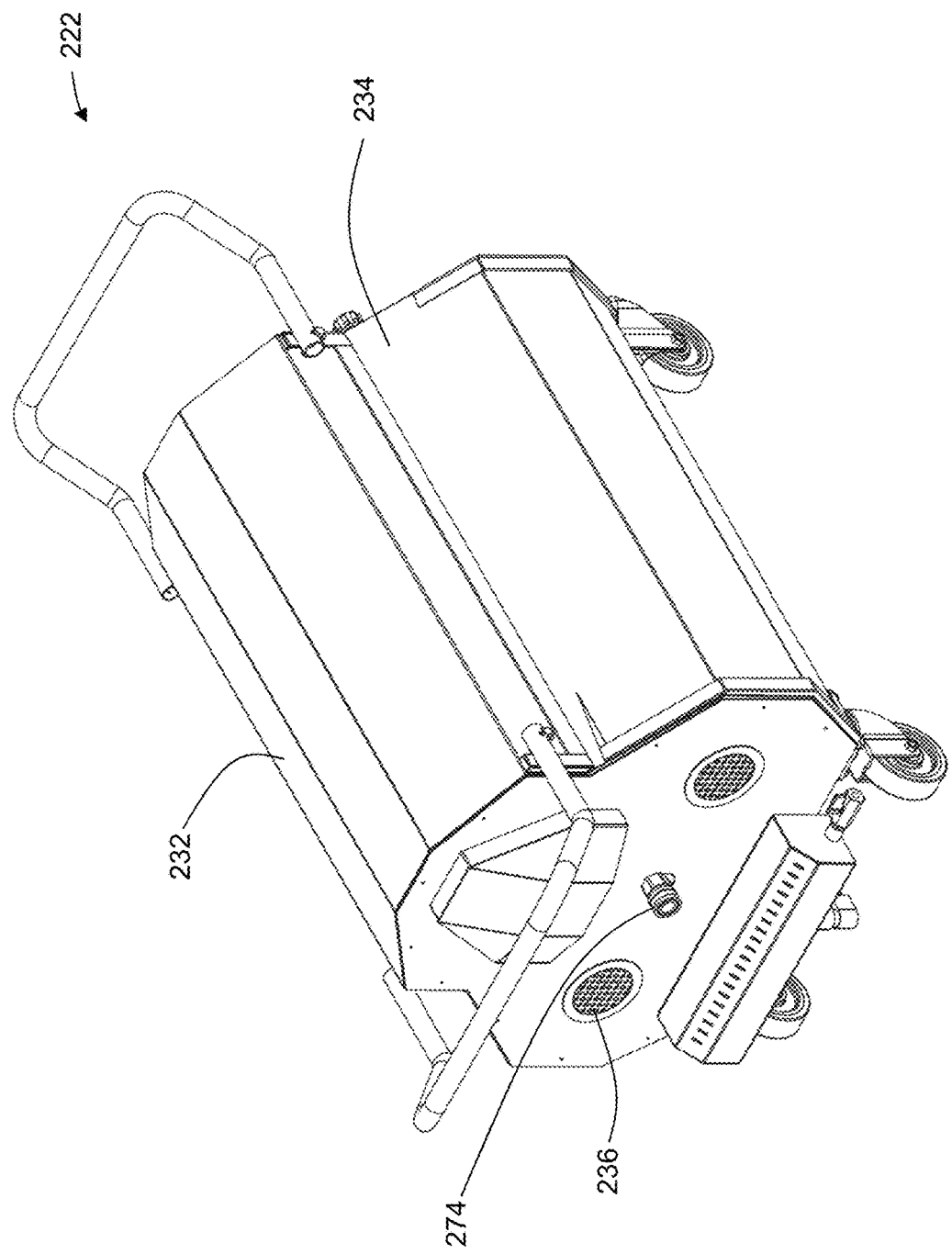
FIG. 10a is a perspective view of an automated steam generator forming part of the automated steam generator system of FIG. 9.
Figure 10B:
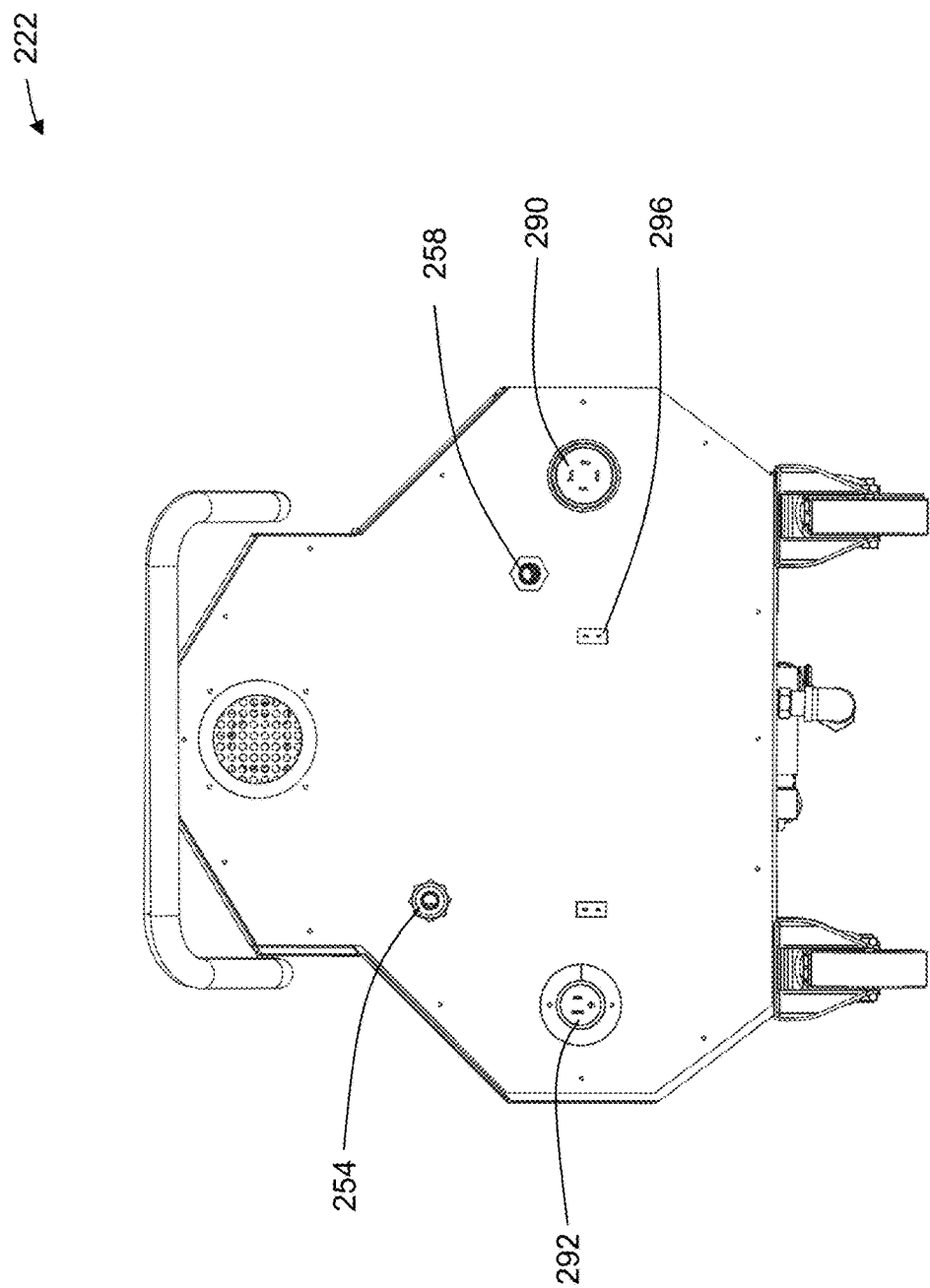
Figure 10C:
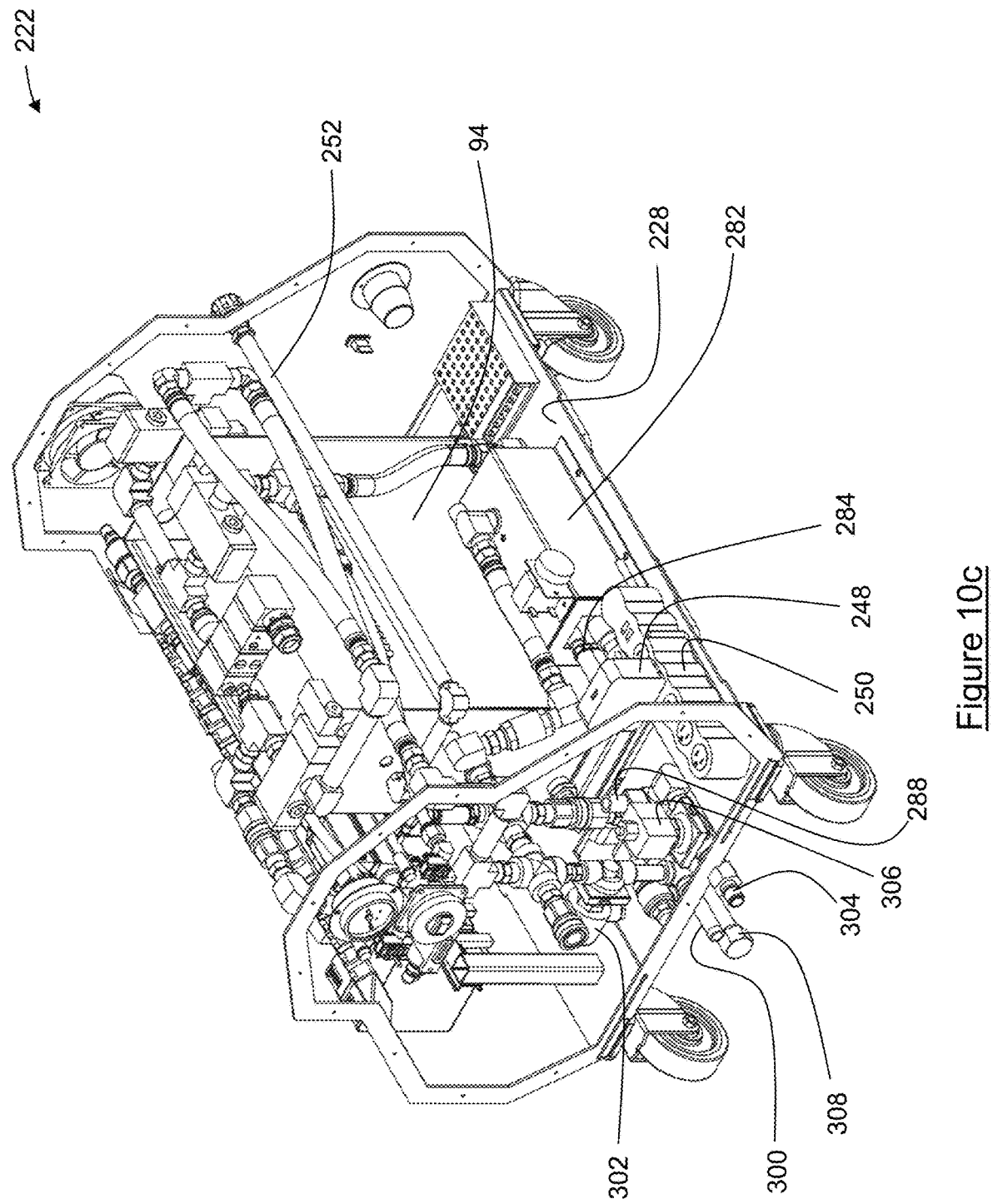
Figure 10D:
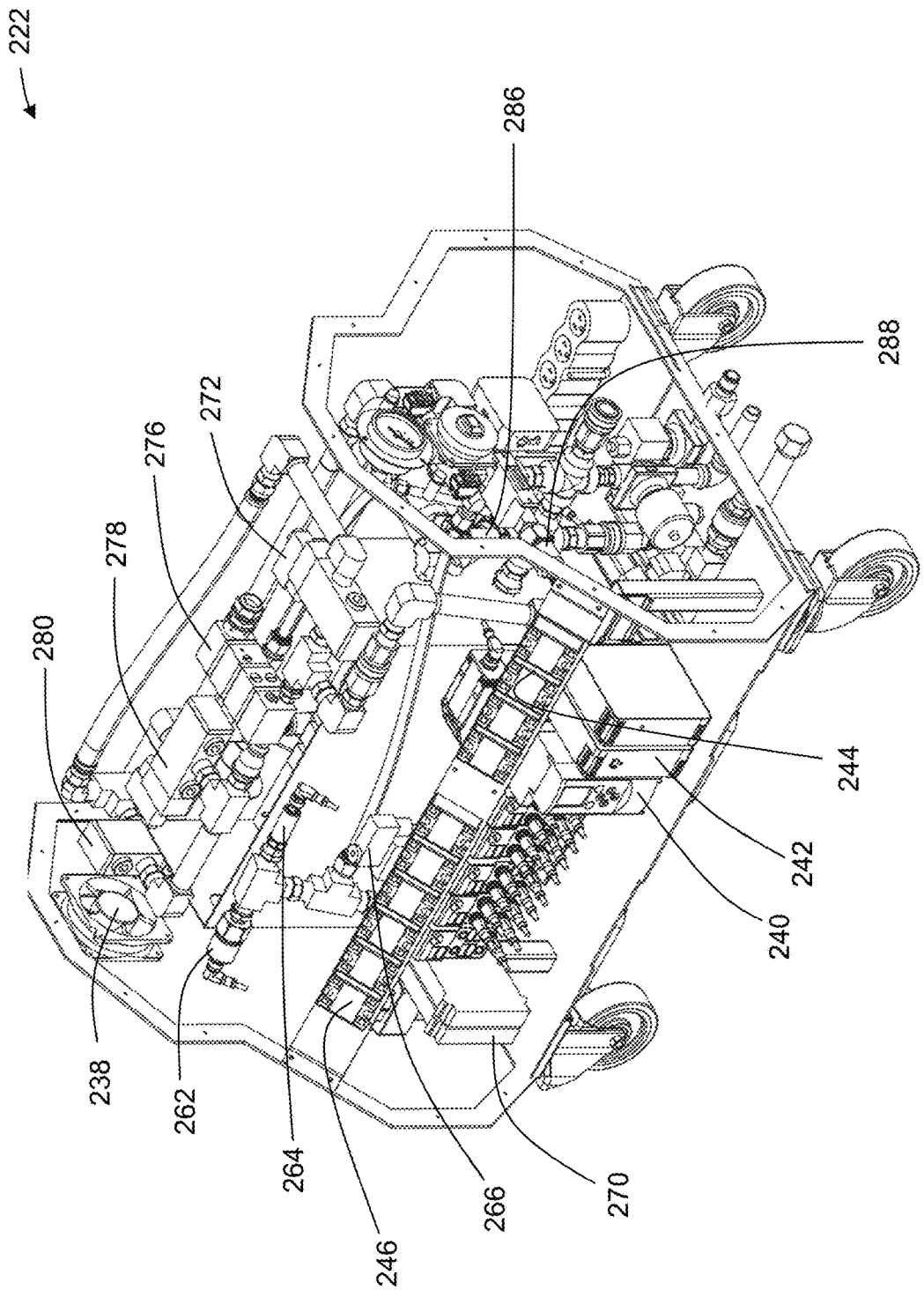
Figure 10E:
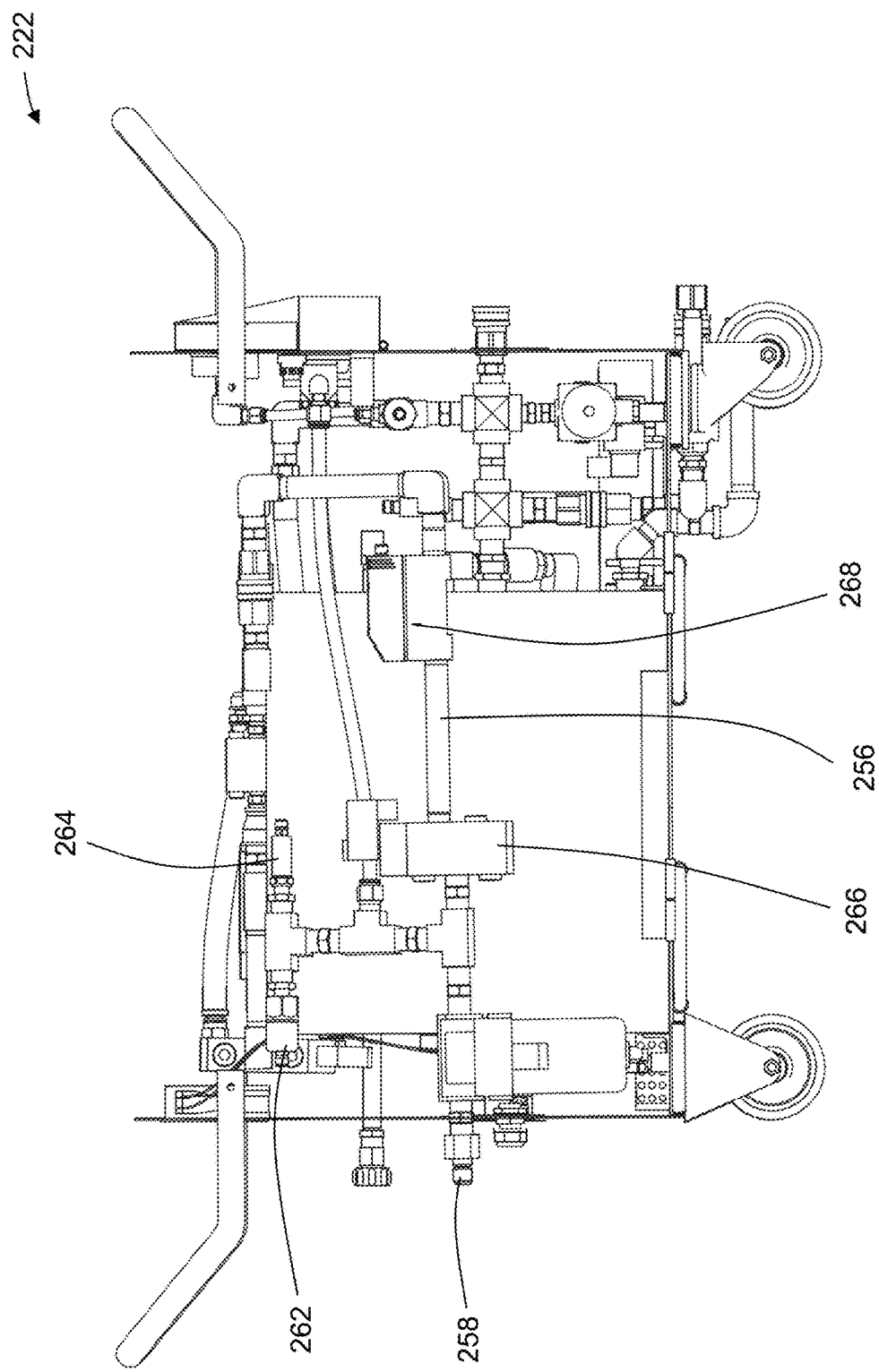
Figure 10F:
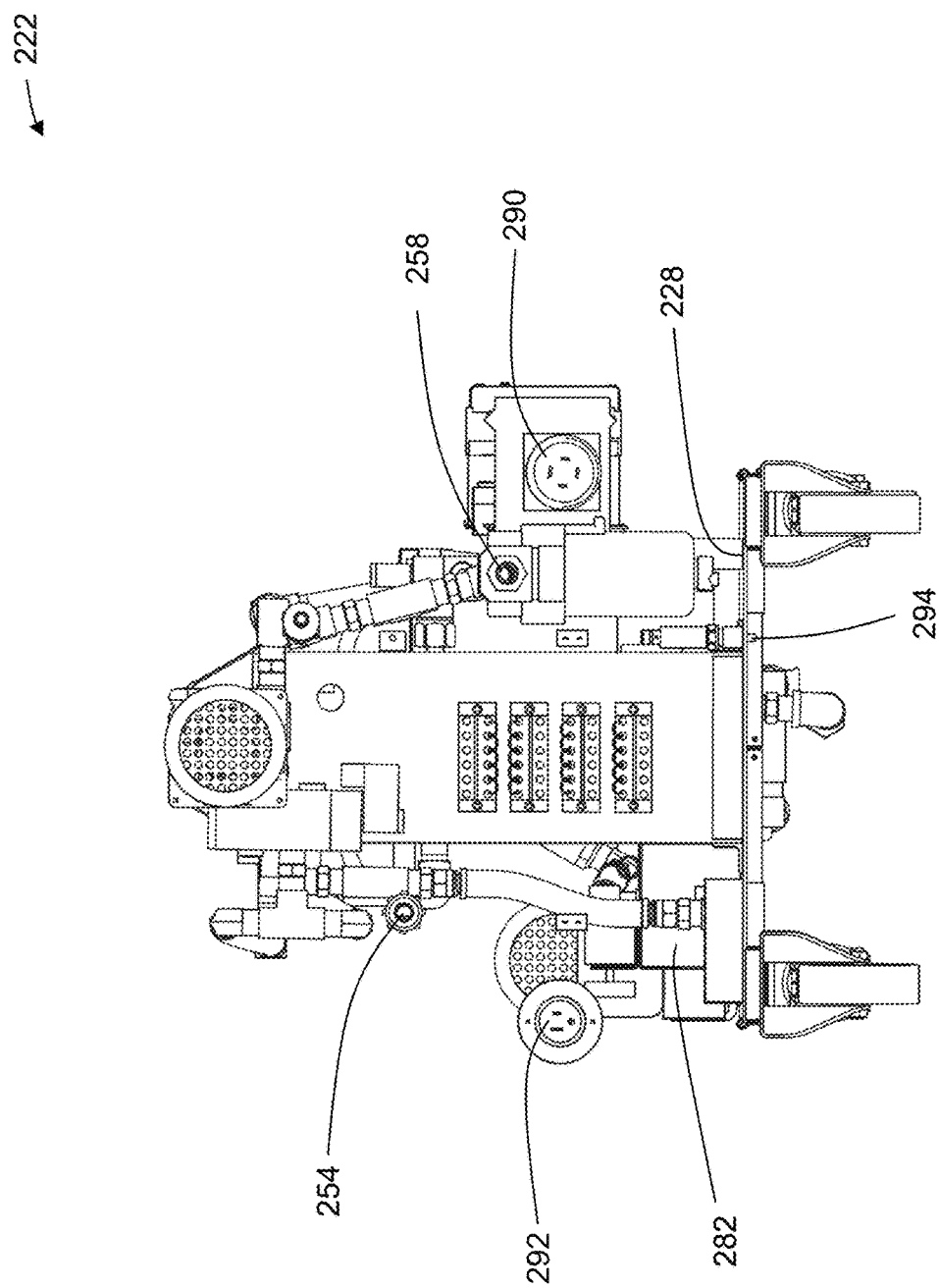

In other embodiments, the steam generator configured to inflate the liner assembly 20 may alternatively be differently configured. For example, FIG. 9 shows an automated steam generator system for use with the liner assembly 20, and which is generally indicated by reference numeral 220. Automated steam generator system 220 comprises a portable, automated steam generator 222, and a portable computing device 224 that is in wireless communication with the automated steam generator 222.

The portable computing device 224 is configured to communicate with and operate the automated steam generator 222 through an automation application running on the portable computing device 224. In the example shown, the portable computing device 224 is a tablet computer, such as for example an iPad manufactured by Apple Incorporated, of Cupertino, Calif., and the automation application is a "mobile app", however it will be understood that the portable computing device 224 may alternatively be another kind of computing device, such as for example a smartphone, a laptop personal computer, a notebook computer, a portable media player, and the like.

The portable computing device may alternatively be any suitable computing device comprising, for example, a processing unit or equivalent processing structure, system memory (volatile and/or non-volatile memory), other non-removable or removable memory (e.g. a hard disk drive, RAM, ROM, EEPROM, CD-ROM, DVD, flash memory, etc.) and a system bus coupling the various computing device components to the processing unit or the equivalent processing structure. The computing device may also comprise networking capabilities using Ethernet, WiFi, Bluetooth™ and/or other network formats, to enable access to shared or remote drives, one or more networked computers, or other networked devices.

The automation application may comprise program modules including routines, object components, data structures, and the like, and may be embodied as computer readable program code stored on a non-transitory computer readable medium. The computer readable medium is any data storage device that can store data. Examples of computer readable media include for example read-only memory, random-access memory, CD-ROMs, magnetic tape, USB keys, flash drives and optical data storage devices. The computer readable program code may also be distributed over a network including coupled computing devices so that the computer readable program code is stored and executed in a distributed fashion.

The automated steam generator 222 may be better seen in FIGS. 10*a* to 10*f*. In FIGS. 10*b* to 10*f*, electrical wiring has been omitted for ease of viewing. Automated steam generator 222 is portable and wheeled, and is sized so as to be moveable to and from a job site by a single worker. The automated steam generator 222 comprises a wheeled base 228 that supports a housing 232 comprising two (2) hinged doors 234, vents 236 and a fan 238. The housing 232 accommodates a programmable logic controller (PLC) 240, which is in wired communication with a two-hundred and forty (240) V and one-hundred and twenty (120) V combined power supply module 242, an AC relay bank 244, and a DC relay bank 246. The controller 240 is also in wired communication with a wireless router 248 that is configured for wireless communication with the portable computing device 224. The wireless router 248 may be, for example, a Wi-Fi router configured to communicate using the IEEE 802.11 standards, and in this embodiment the wireless router 248 is a T1-WR810N router manufactured by TP-Link Technologies Company Limited, of Shenzhen, China, and is plugged into an electrical power bar 250.

The automated steam generator 222 comprises the box-shaped water heater 94, which has been described above and with reference to FIG. 7*d*. The water heater 94 comprises the container 96 that houses the plurality of heating elements 98 positioned near the floor of the container 96. The heating elements are configured to heat water to generate steam. A water feed conduit 252 conveys water into the top of the container 96. The water feed conduit 252 includes a hose connector 254 that is configured to be connected to a source (not shown) of pressurized water. The automated steam generator 222 also comprises a pressurized air input conduit 256 having a port 258 that is configured to be connected to a source (not shown) of pressurized air, which in this embodiment is a portable air compressor. The pressurized air input conduit 256 has an incoming air pressure sensor 262, an incoming air temperature sensor 264, an incoming air solenoid valve 266 and an air flow meter 268 fitted thereto. The incoming air pressure sensor 262 and the air flow meter 268 are in wired communication with the controller 240, and are configured to output a signal indicating the incoming air pressure and incoming air flow rate, respectively, to the controller 240. The incoming air temperature sensor 264 is in wired communication with a thermocouple converter 270, which is configured to convert the signal output by the temperature sensor 264 into a signal between four (4) and twenty (20) mA, and to output this as a temperature signal to the controller 240, with which the thermocouple converter 270 is in wired communication. The incoming air solenoid valve 266 is operated by a relay in the DC relay bank 246.

The automated steam generator 222 further comprises a bypass solenoid valve 272 downstream from the air flow meter 268. When the bypass solenoid valve 272 is open, incoming air is diverted to an output conduit, which has a connector 274 that is configured to be connected to the inflation line 88. The bypass solenoid valve 272 is operated by a relay in the DC relay bank 246.

Downstream from the bypass solenoid valve 272, when the bypass solenoid valve 272 is closed, is a digital air regulator 276 that is in wired communication with the controller 240 and that is configured to regulate the pressure of the incoming air in accordance with a control signal from the controller 240. Downstream from the digital air regulator 276 are a hot regulated air solenoid valve 278 and a cold regulated air solenoid valve 280, which are configured to be operated oppositely and as a pair. When the hot regulated air solenoid valve 278 is closed and the cold regulated air solenoid valve 280 is open, regulated air downstream from the digital air regulator 276 is diverted to the output conduit and through the connector 274, which is configured to be connected to the inflation line 88. The hot regulated air solenoid valve 278 and the cold regulated air solenoid valve 280 are each operated by a relay in the DC relay bank 246.

When the hot regulated air solenoid valve 278 is open and the cold regulated air solenoid valve 280 is closed, regulated air downstream from the digital air regulator 276 is conveyed through a first air conduit into an air heater 282, which comprises one or more heating elements (not shown) configured to pre-heat the air. The air heater 282 is configured to be operated by a relay in the AC relay bank 244. Downstream from the air heater 282 is a second air conduit with a heated air temperature sensor 284 fitted thereto. The heated air temperature sensor 284 is in wired communication with the thermocouple converter 270, which is configured to output a corresponding temperature signal to the controller 240.

The second air conduit conveys the heated air from the air heater 282 into the water heater 94, where the heated air is combined with steam generated by the heating elements 98. The steam accumulates in the upper volume of the container 96 during operation, and when combined with the heated air from the air heater 282 yields a steam-air mixture. The steam-air mixture is conveyed out of the water heater 94 through the output conduit, which has an outgoing temperature sensor 286 fitted thereto for measuring the temperature of the outgoing air or steam-air mixture. The outgoing temperature sensor 286 is in wired communication with the thermocouple converter 270, which is configured to output a corresponding temperature signal to the controller 240. The output conduit also has an outgoing pressure sensor 288 fitted thereto. The outgoing pressure sensor 288 is in wired communication with the controller 240, and is configured to output a signal indicating the pressure of the outgoing air or steam-air mixture to the controller 240.

The automated steam generator 222 also comprises a two-hundred and forty (240) V electrical plug port 290 that is configured to be connected to a two-hundred and forty (240) V AC mains (not shown), and a one-hundred and ten (110) V plug port 292 that is configured to be connected to a one-hundred and ten (110) V AC mains, each for providing power to the power supply module 242.

The automated steam generator 222 further comprises an ambient temperature sensor 294 positioned slightly outside of the housing 232 and under the wheeled base 228. The ambient temperature sensor 294 is in wired communication with the thermocouple converter 270, which is configured to output a corresponding temperature signal to the controller 240. In this embodiment, the automated steam generator 222 also comprises a distal end temperature sensor port 296 that is configured to have connected thereto a distal end temperature sensor 298 positioned at the distal end of the liner assembly 20 adjacent the relief valve 30. In this embodiment, wiring of the distal end temperature sensor 298 is accommodated in the interior of the inflatable bladder 44. The distal end temperature sensor port 296 is in wired communication with the thermocouple converter 270, which is configured to output a corresponding temperature signal of the distal end temperature sensor 298 to the controller 240.

The automated steam generator 222 also comprises a dump line 300 in fluid communication with the output conduit and having a dump solenoid valve 302 fitted thereto, and a steam vent line 304 also in fluid communication with the output conduit, upstream from the connection point of the bypass line with the output conduit, and having a steam vent solenoid valve 306 fitted thereto. When either the bypass solenoid valve 272 or the cold regulated air solenoid valve 280 is open, the steam vent solenoid valve 306 is opened. As air flow bypasses the water heater 94, any steam generated within the water heater is allowed to vent through the steam vent line 304. The dump solenoid valve 302 and the steam vent solenoid valve 306 are each operated by a relay in the DC relay bank 246. The automated steam generator 222 further comprises a drain line 308 in fluid communication with the water heater 94, which provides an outlet for water to be drained from the water heater 94 after use.

Turning now to the automation application, the automation application installed on the portable computing device 224 is configured to present a graphical user interface on a display of the portable computing device 224. The graphical user interface comprises a variety of different pages. In the example shown, the portable computing device 224 is a tablet computer and the pages displayed by the graphical user interface are generally sized for display on a tablet computer display, however it will be understood that the automation application displays similar pages that may be differently sized, as appropriate, on other kinds of computing devices.

Figure 11A:
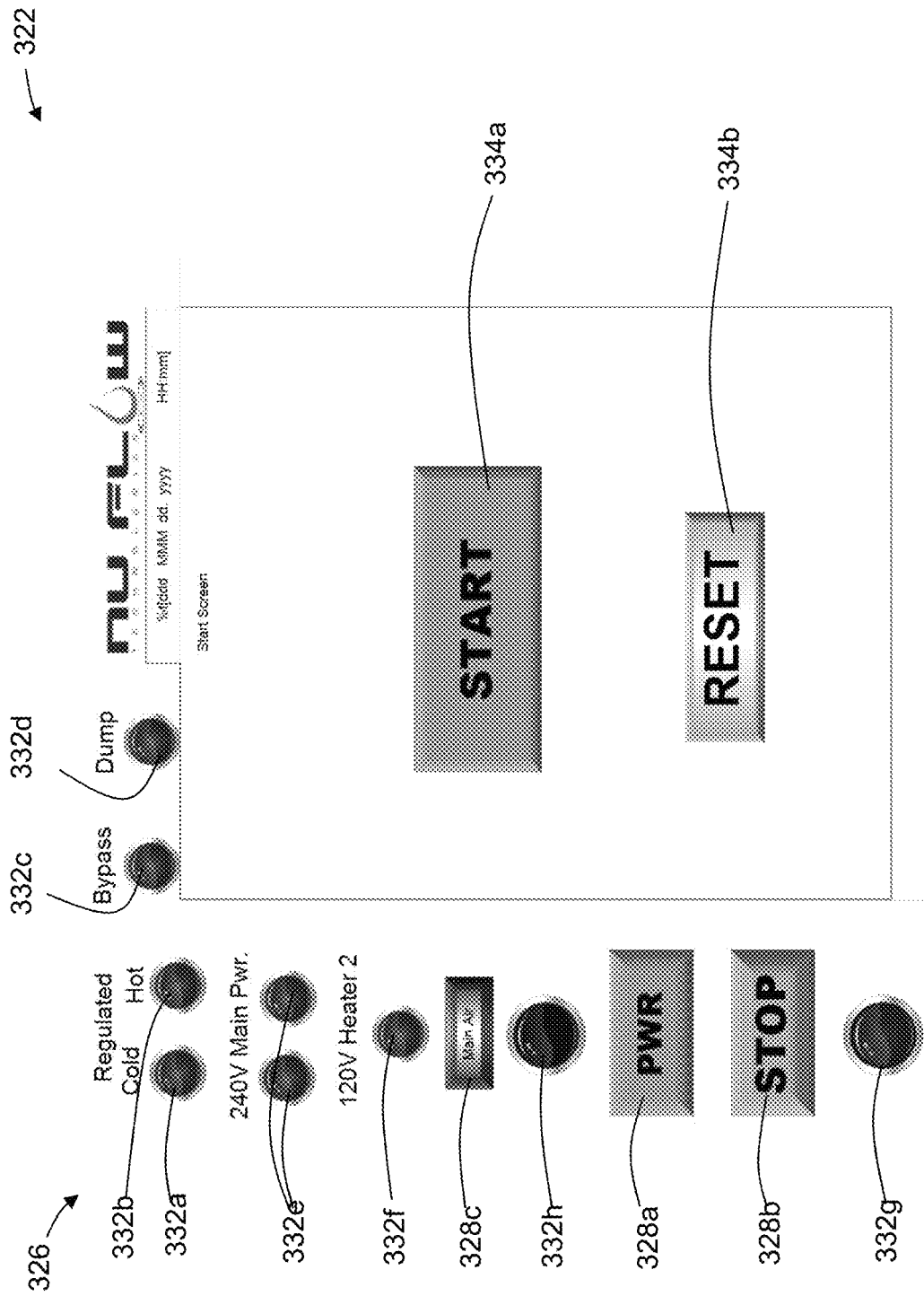
FIGS. 11a to 11z are pages presented by an automation application used by the automated steam generator system of FIG. 9.

When launched on the portable computing device 224, the automation application displays a start page on the display of the portable computing device 224. FIG. 11a shows the start page, which is generally referred to using reference numeral 322. The start page 322 comprises an outer controls area 326, in which virtual buttons for controlling the automated steam generator 222 and indicators showing statuses of components of the automated steam generator 222 are presented. The controls area 326 is presented on all pages displayed by the automation application. In the example shown, the controls area 326 comprises a power button 328a and a stop button 328b, each of which may be selected to turn the power supply module 242 on and off, respectively, and a main air button 328c that may be selected to open or close the incoming air solenoid valve 266. The controls area also comprises a plurality of virtual indicators, which in the example shown include: a regulated cold air indicator 332a, which is illuminated when the cold regulated air solenoid valve 280 is open; a regulated hot air indicator 332b, which is illuminated when the hot regulated air solenoid valve 278 is open; a bypass indicator 332c, which is illuminated when the bypass solenoid valve 272 is open; a dump indicator 332d, which is illuminated when the dump solenoid valve 302 is open; two (2) two-hundred and forty (240) V main power indicators 332e, which are illuminated when two-hundred and forty (240) V power is supplied to the power supply module 242; a one-hundred and twenty (120) V power indicator 332f, which is illuminated when one-hundred and twenty (120) V power is supplied to the power supply module 242; a main power indicator 332g; and a main air indicator 332h, which is illuminated when the incoming air solenoid valve 266 is open.

In addition to the controls area 326, the start page 322 comprises a start button 334a, which when selected causes the automation application to display a login page, and a reset button 334b, which when selected causes the controller 240 to remove previous data from memory and to reset the electrical system of the automated steam generator 222.

Figure 11B:
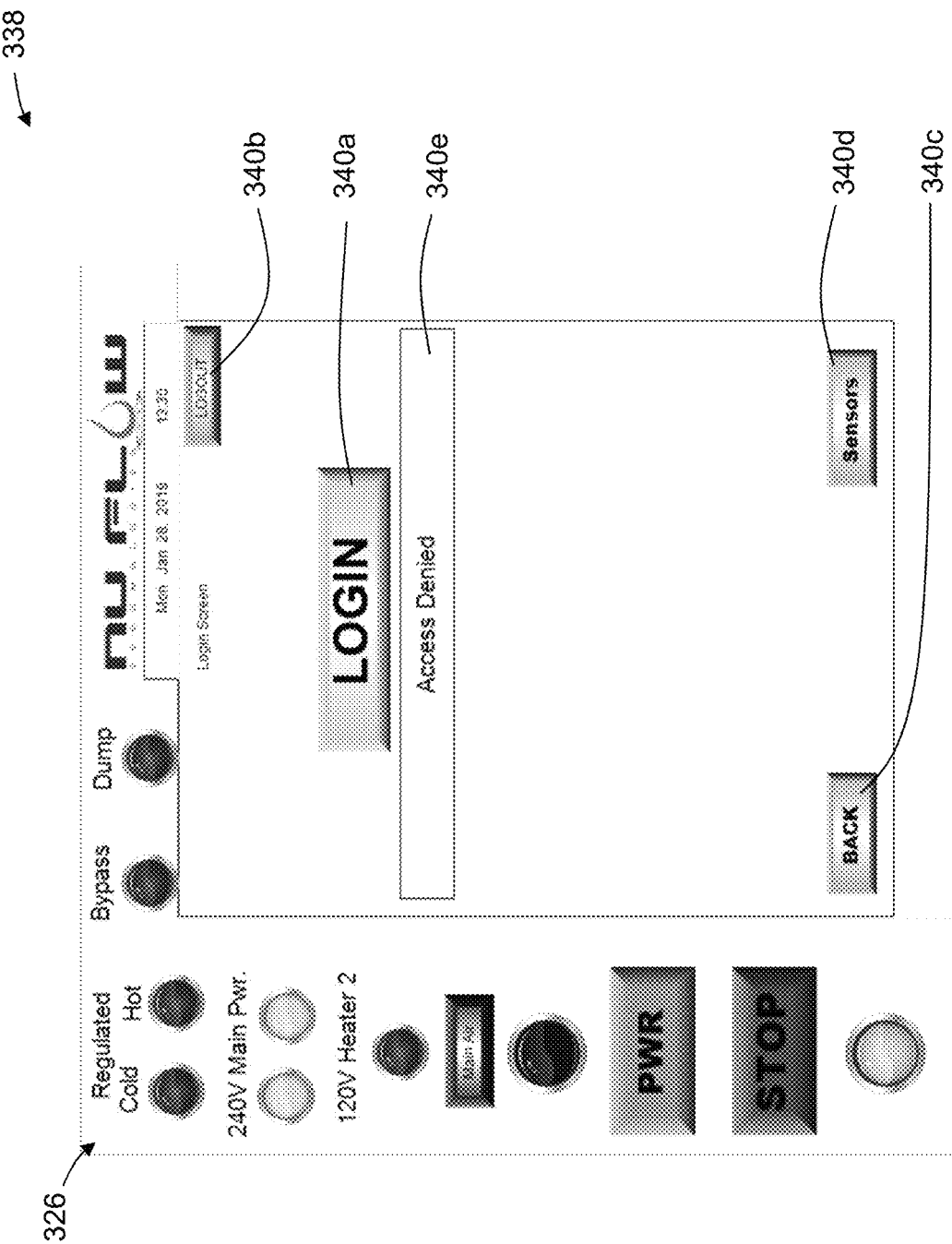

FIG. 11b shows the login page, which is generally indicated by reference numeral 338. In addition to the controls area 326, the login page 338 comprises: a login button 340a, which when selected opens a text entry field (not shown) into which an authorized username can be entered by a worker to login to the automation application; a logout button 340b which when selected causes the automation application to logout the user associated with the username; a back button 340c which when selected causes the automation application to display the previous page; and a sensors button 340d, which when selected causes the automation application to display a sensors page. The login page 338 also comprises a login status banner 340e, which indicates the permission status of the username that is currently logged in. In this embodiment, the available permission statuses are "authorized user", "authorized supervisor" and "factory". In the example shown, the login status banner 340e indicates "access denied", indicating that no authorized username is currently logged in to the automation application.

Figure 11C:
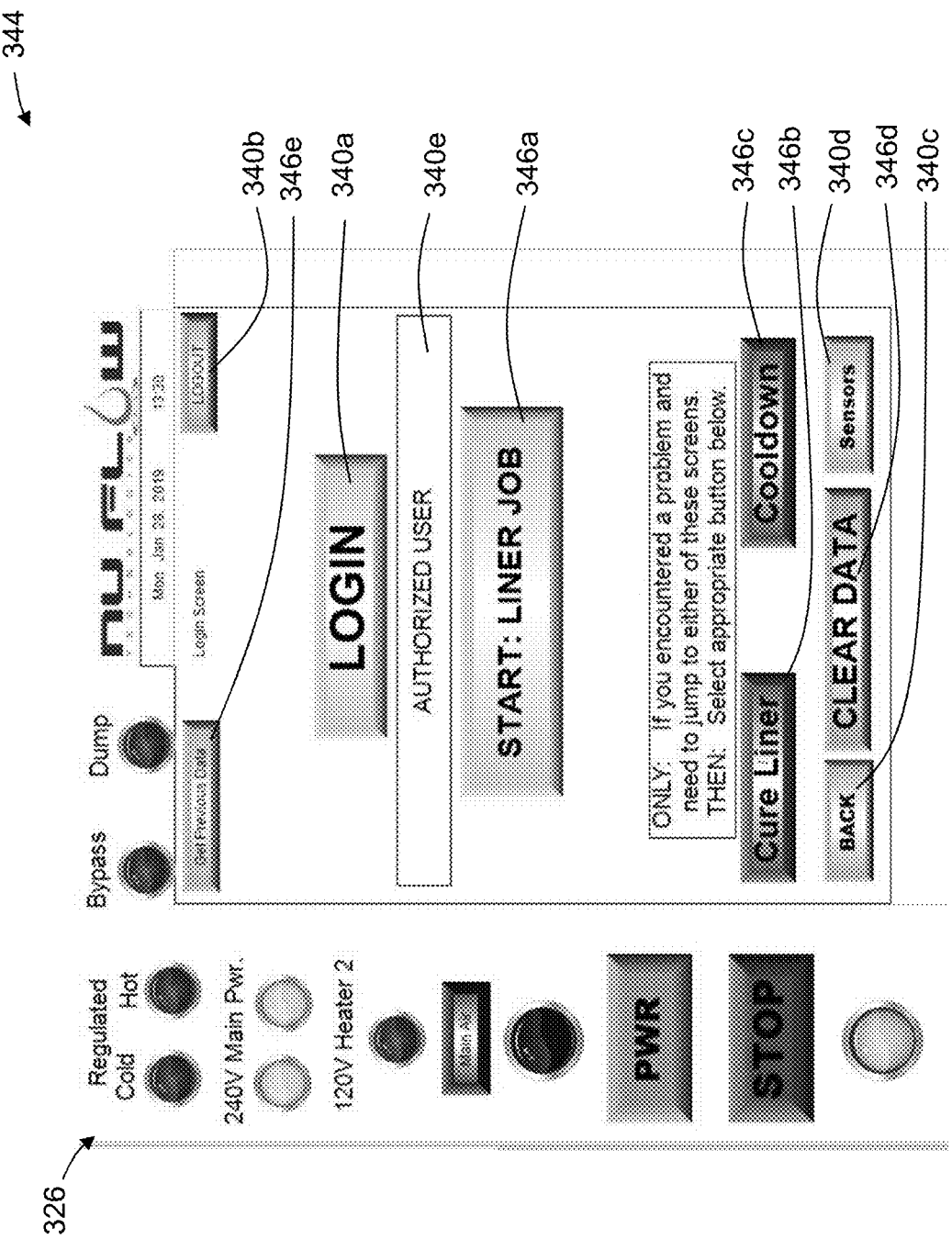

Entry of an authorized username causes the automation application to display an authorized login page, which is shown in FIG. 11c and is generally indicated by reference numeral 344. Authorized login page 344 is similar to the login page 338, but further comprises a start button 346a, which when selected causes the application to display an address entry page; a cure liner button 346b, which when selected causes the automation application to display a cure selection page; a cooldown button 346c, which when selected causes the automation application to run a cooldown sequence and to display a cooldown page; a clear data button 346d, which when selected causes the automation application to erase all address information and pipe information in memory; and a get previous data button 346e.

Figure 11D:
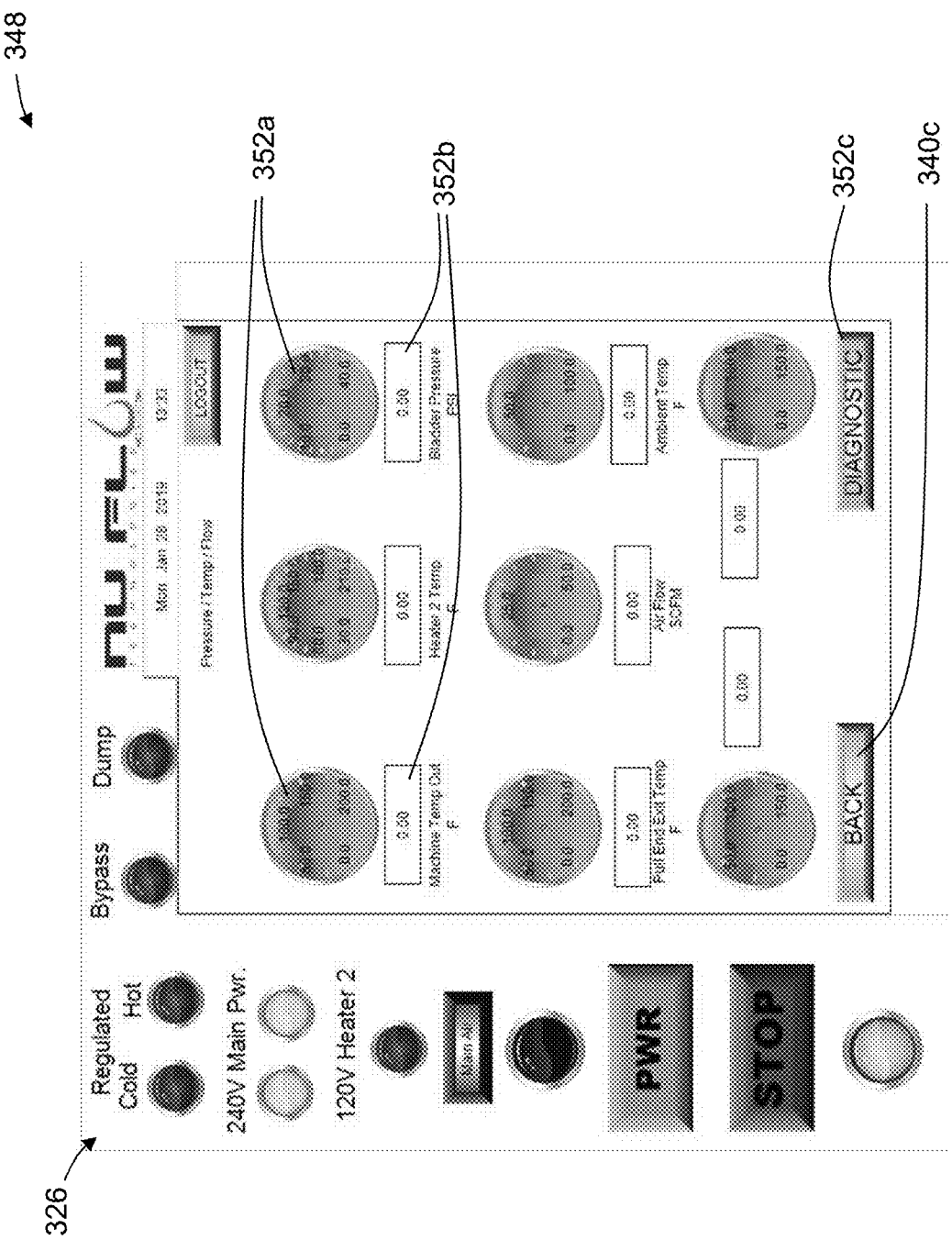

FIG. 11d shows the sensors page, which is generally indicated by reference numeral 348. The sensors page 348 displays a plurality of analog gauges 352a and numerical value fields 352b for the sensors of the automated steam generator 222. In the example shown, the sensors represented are: temperature of the outgoing flow, as measured by the outgoing temperature sensor 286 ("machine temp out"); the temperature downstream of the air heater, as measured by the heated air temperature sensor 284 ("heater 2 temp"); the pressure inside the malleable inflatable bladder 44, as measured by the outgoing pressure sensor 288 ("bladder pressure"); the temperature adjacent the relief valve 30, as measured by the distal end temperature sensor 298 ("pull end exit temp"); the air flow rate, as measured by the air flow meter 268 ("air flow"); and the ambient temperature, as measured by the ambient temperature sensor 294 ("ambient temp"). The sensors page 348 also comprises the back button 340c, and a diagnostics button 352c, which may be selected to cause the automation application to display a diagnostics page.

Figure 11E:
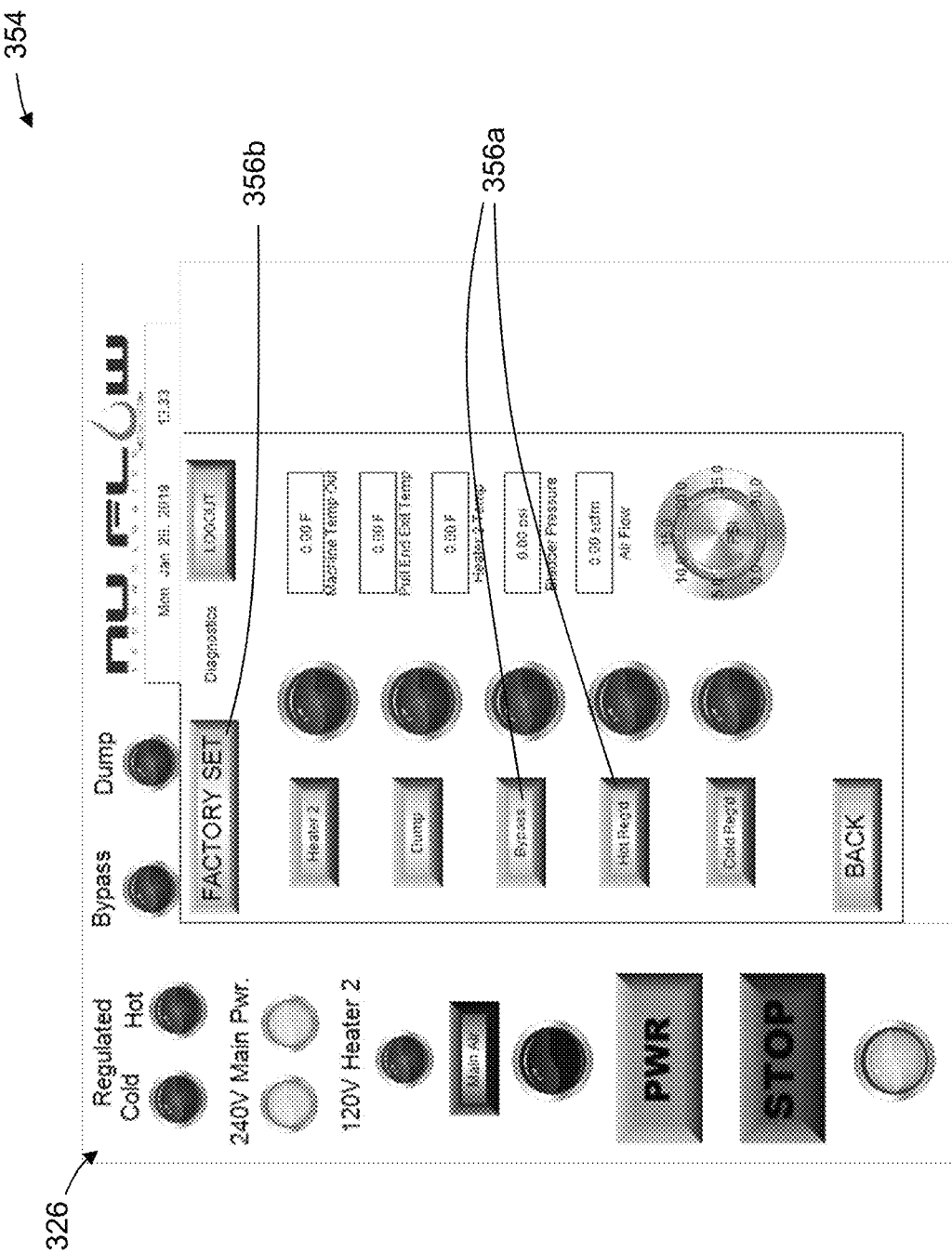

FIG. 11e shows the diagnostics page, which is generally indicated by reference numeral 354. The diagnostics page 354 comprises a plurality of virtual buttons 356a that when selected cause the automation application to control the automated steam generator 222 to activate and deactivate a specific solenoid valve and its associated relay, for testing purposes. In the example shown, the virtual buttons include buttons for activating and deactivating each of: air heater 282 ("heater 2"); the dump solenoid valve 302 ("dump"); the bypass solenoid valve 272 ("bypass"); the hot regulated air solenoid valve 278 ("hot reg' d"); and the cold regulated air solenoid valve 280 ("cold reg' d"). The diagnostics page also comprises a factory settings button 356b, which may be selected to display factory settings pages.

Figure 11F:
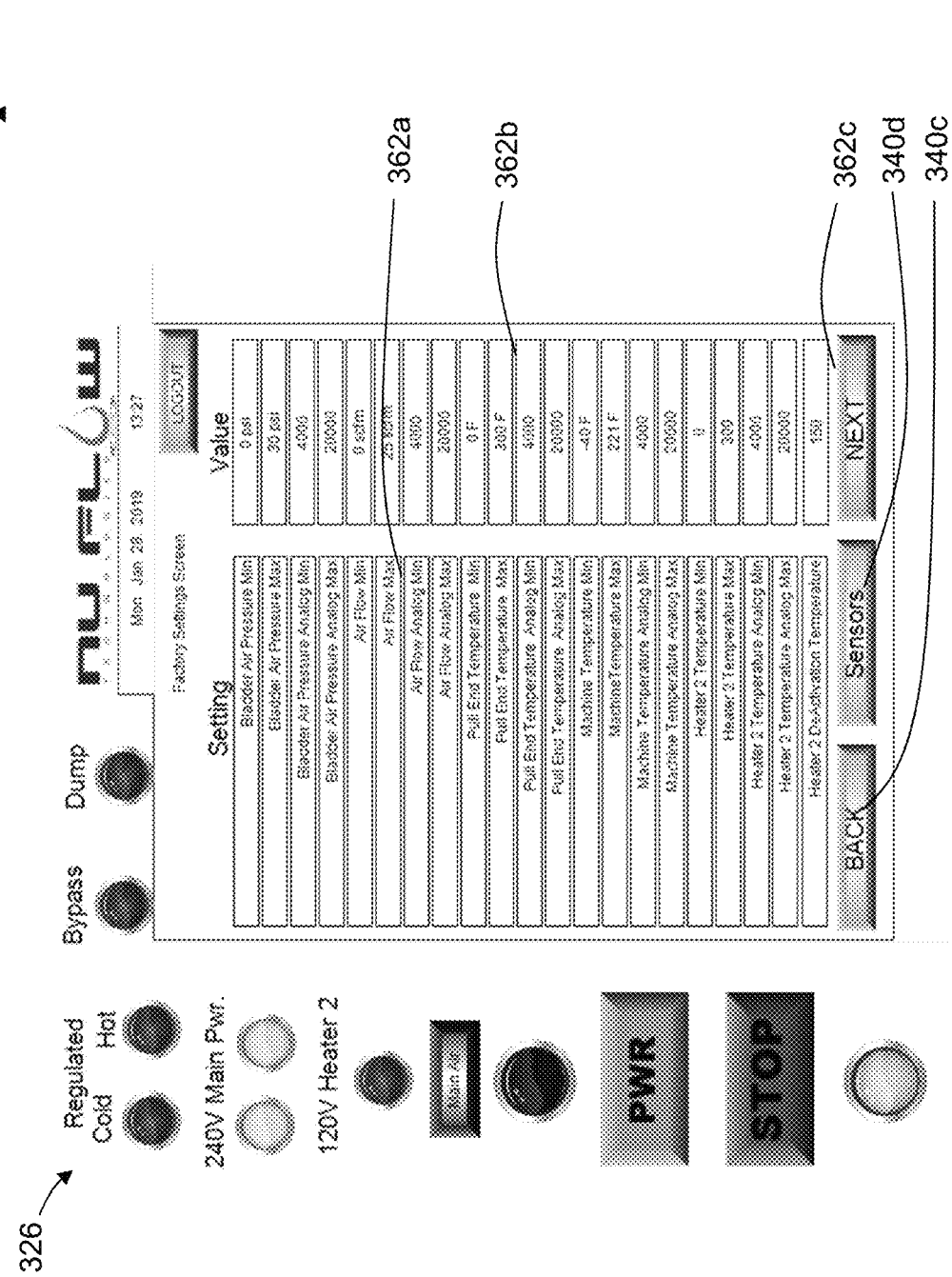
Figure 11G:
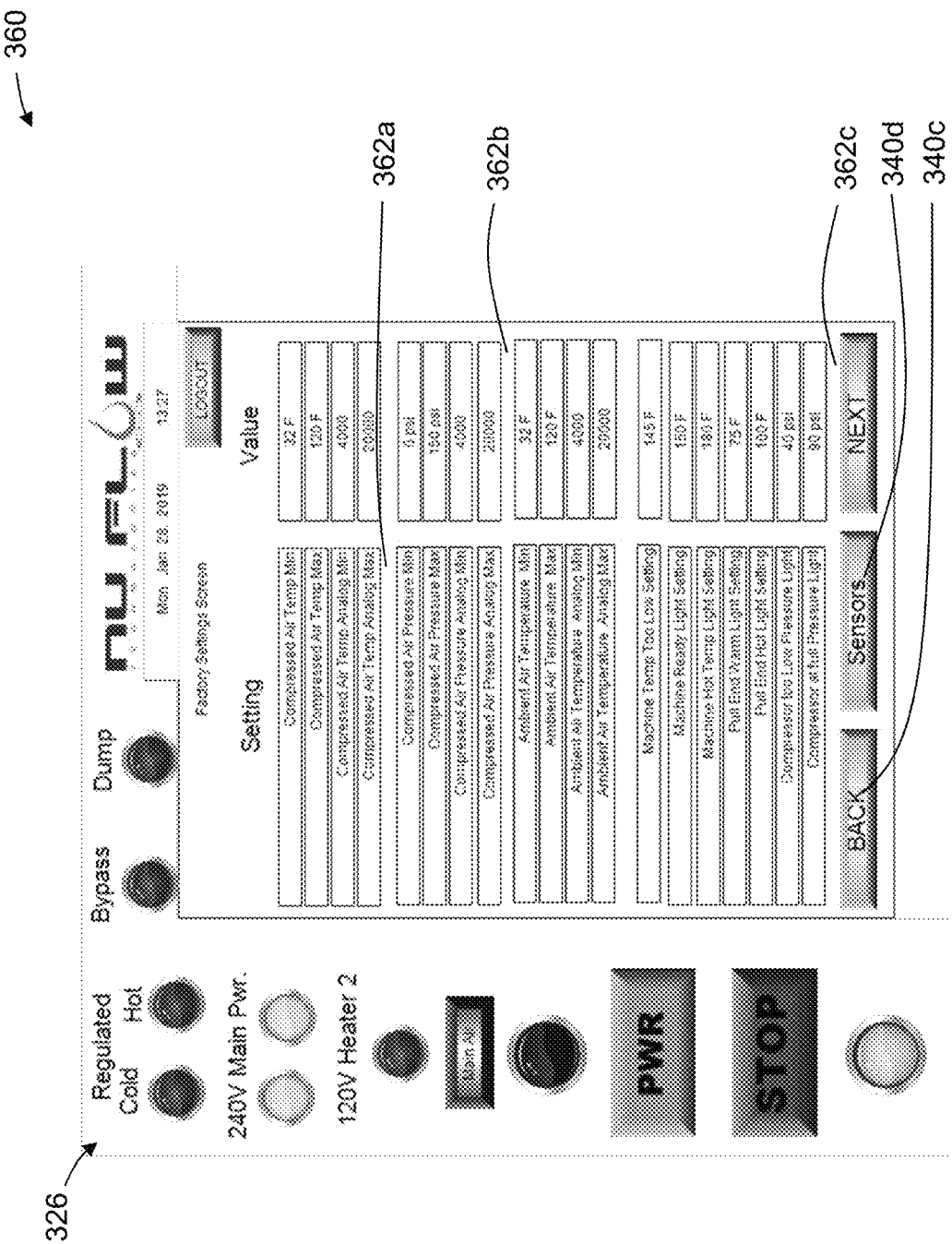
Figure 11H:
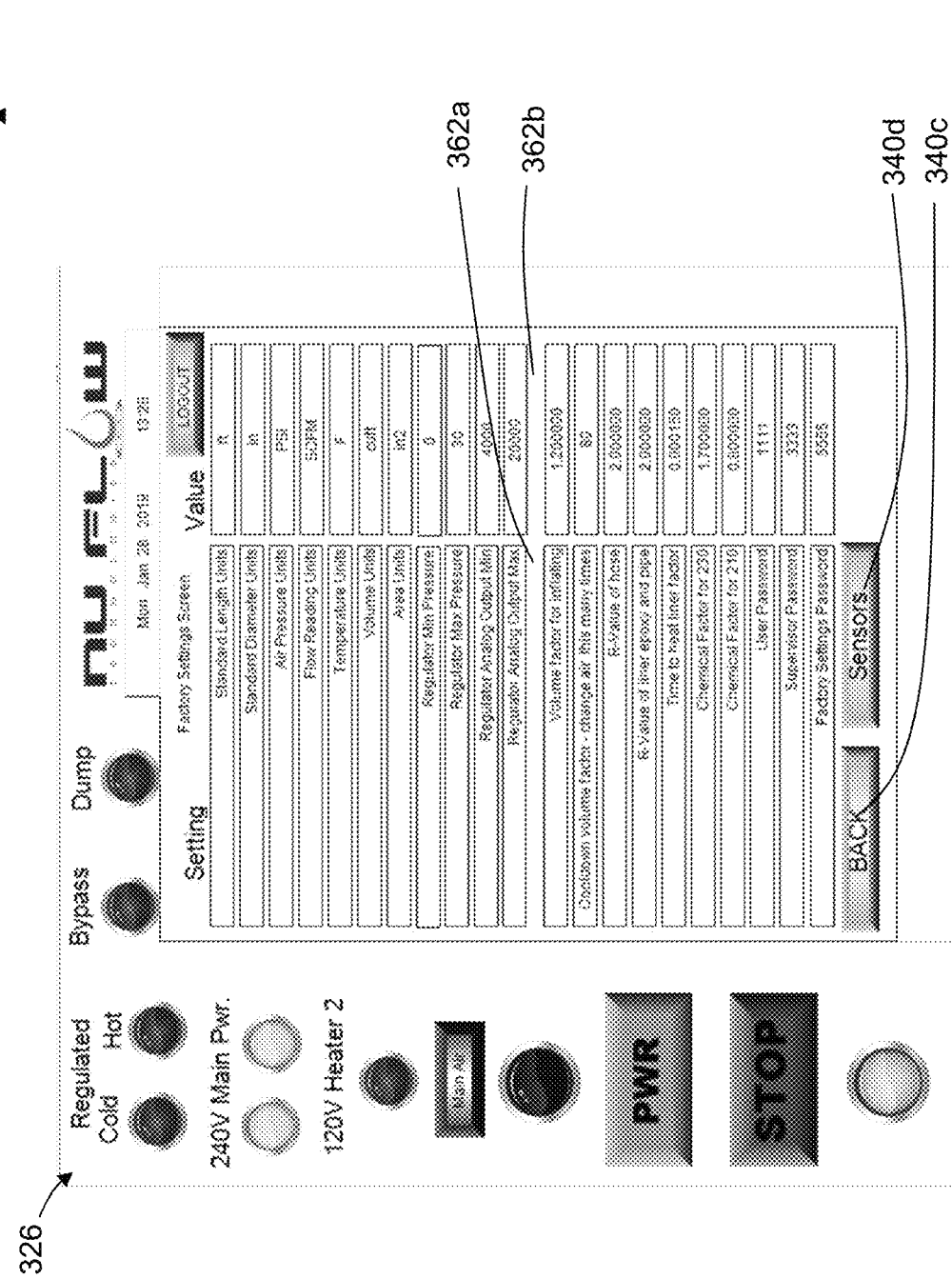

FIGS. 11f to 11h show the factory settings pages, which are generally indicated by reference numeral 360. Factory settings page 360 displays a plurality of settings 362a and the values 362b associated with each of the settings 362a. If the permission status of the username that is currently logged in is "factory", then each of the values 362b may be selected to open a text entry field (not shown) into which a value can be entered by a user. Otherwise, if the permission status of the username that is currently logged in is "authorized user" or "authorized supervisor", the values 362b cannot be changed. The factory settings pages 360 comprise the back button 340c and a next button 362c, which may be selected to navigate between factory settings pages 360, and between the factory settings pages 360 and the diagnostics page 354. The factory settings pages 360 also comprise the sensors button 340d.

Figure 11I:
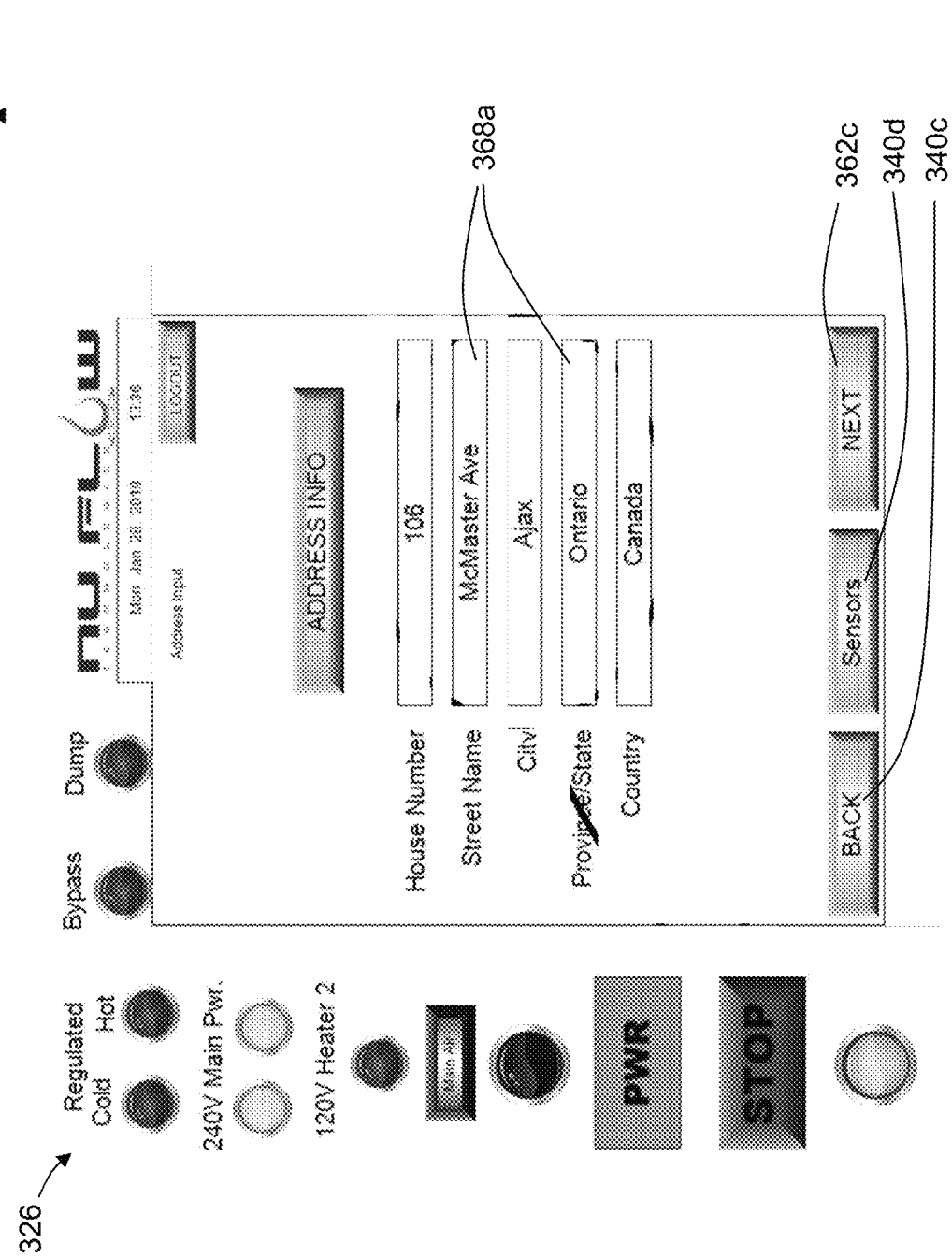

Turning again to FIG. 11c, selection of the start button 346a causes the automation application to display an address entry page, which is shown in FIG. 11i and is generally indicated by reference numeral 366. Address entry page 366 comprises a plurality of address fields 368a, each of which may be selected to open a text entry field (not shown) into which address information associated with the job site may be entered by the user. The address entry page 366 also comprises the back button 340c and the sensors button 340d, and further comprises the next button 362c which, when selected, causes the automation application to display a job information page.

Figure 11J:
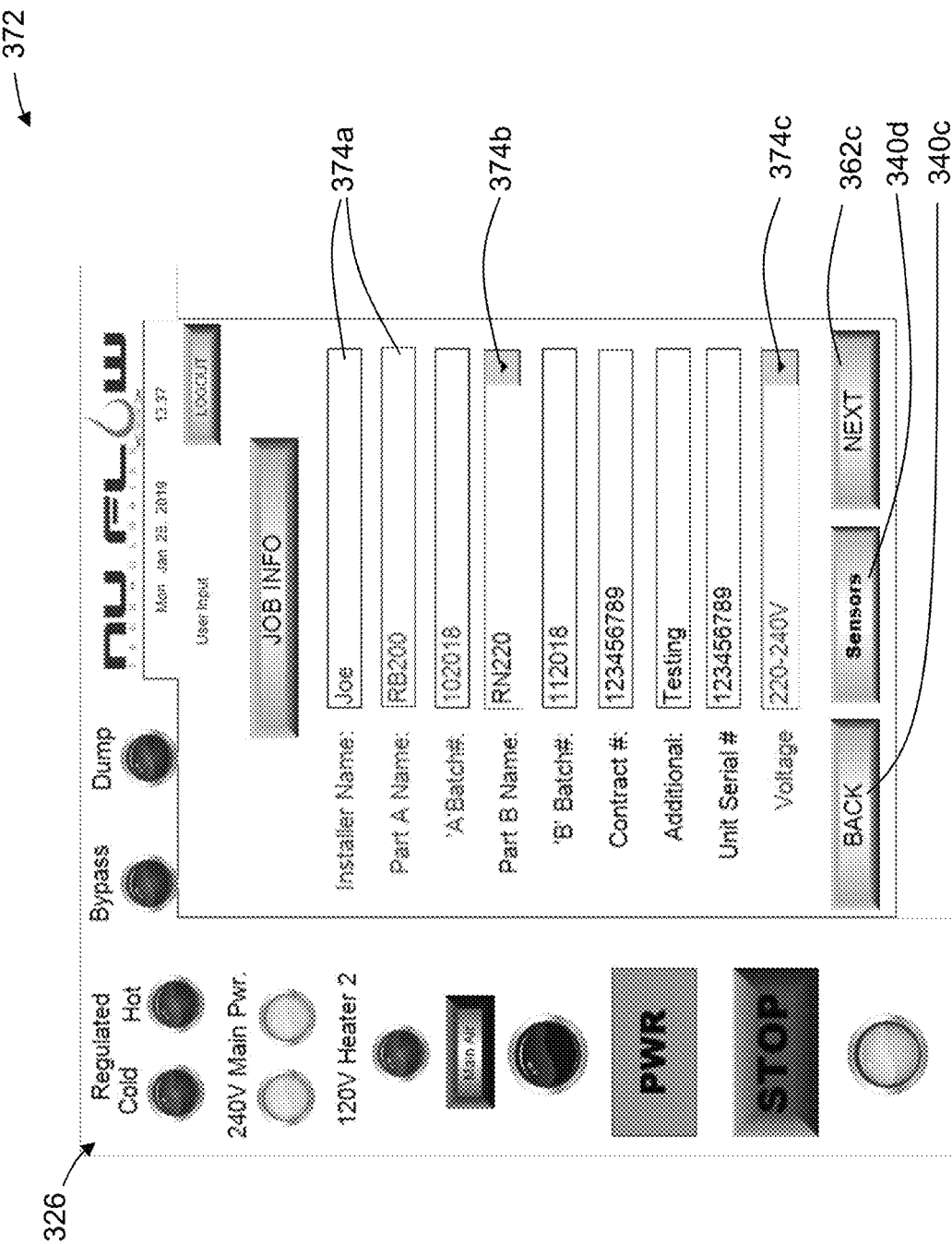

FIG. 11j shows the job information page, which is generally indicated by reference numeral 372. Job information page 372 comprises a plurality of fields 374a, each of which may be selected to open a text entry field (not shown) into which job information associated with the job may entered by the user. The job information page 372 also comprises a curing agent pull-down menu button 374b which may be selected to allow the user to select a second epoxy component from a list of possible second epoxy components, and a voltage pull-down menu button 374c, which may be selected to allow the user to select a voltage from a list of possible voltages. The user input page 372 also comprises the back button 340c and the sensors button 340d, and further comprises the next button 362c which, when selected, causes the automation application to display a pipe information input page.

Figure 11K:
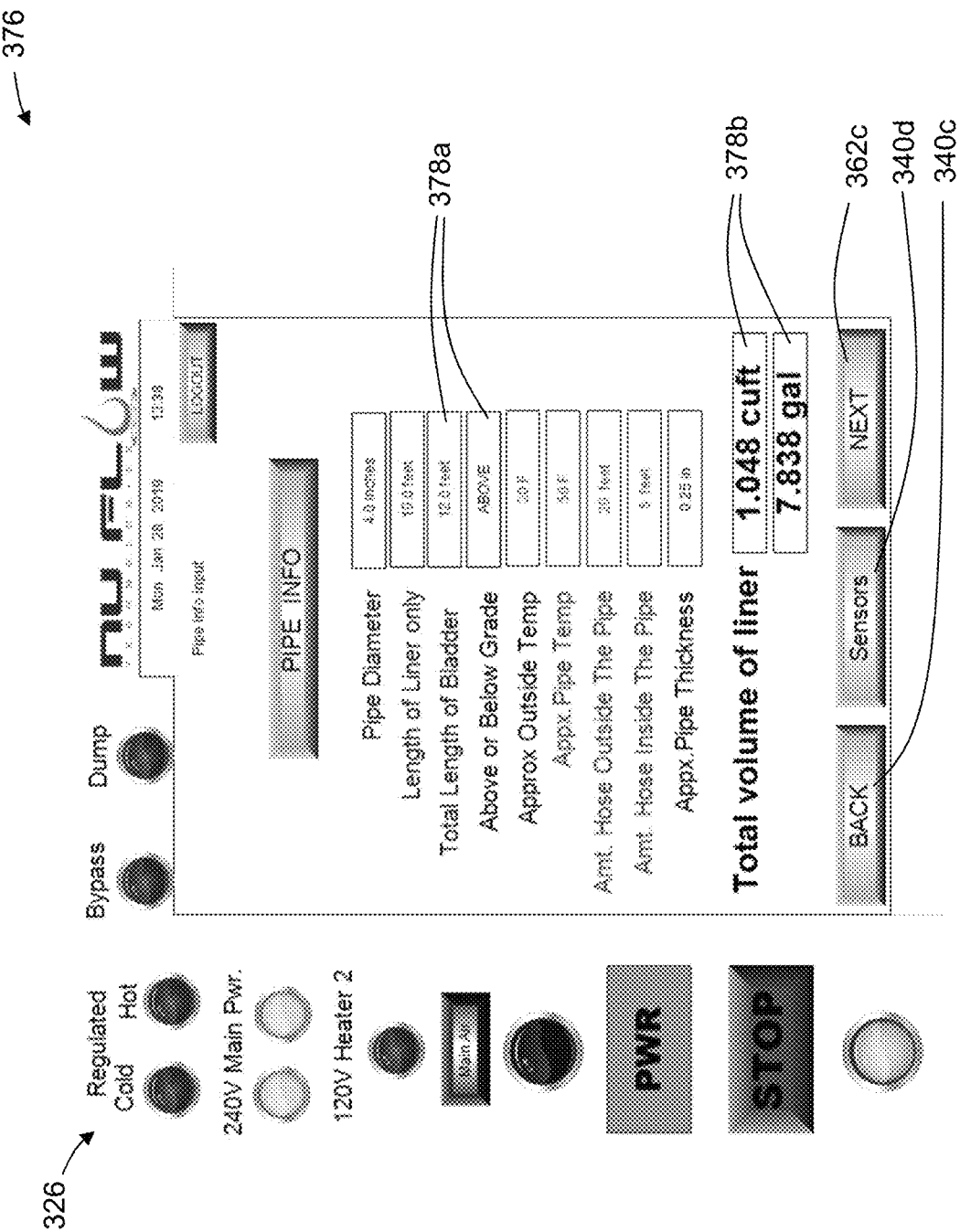
Figure 11I:
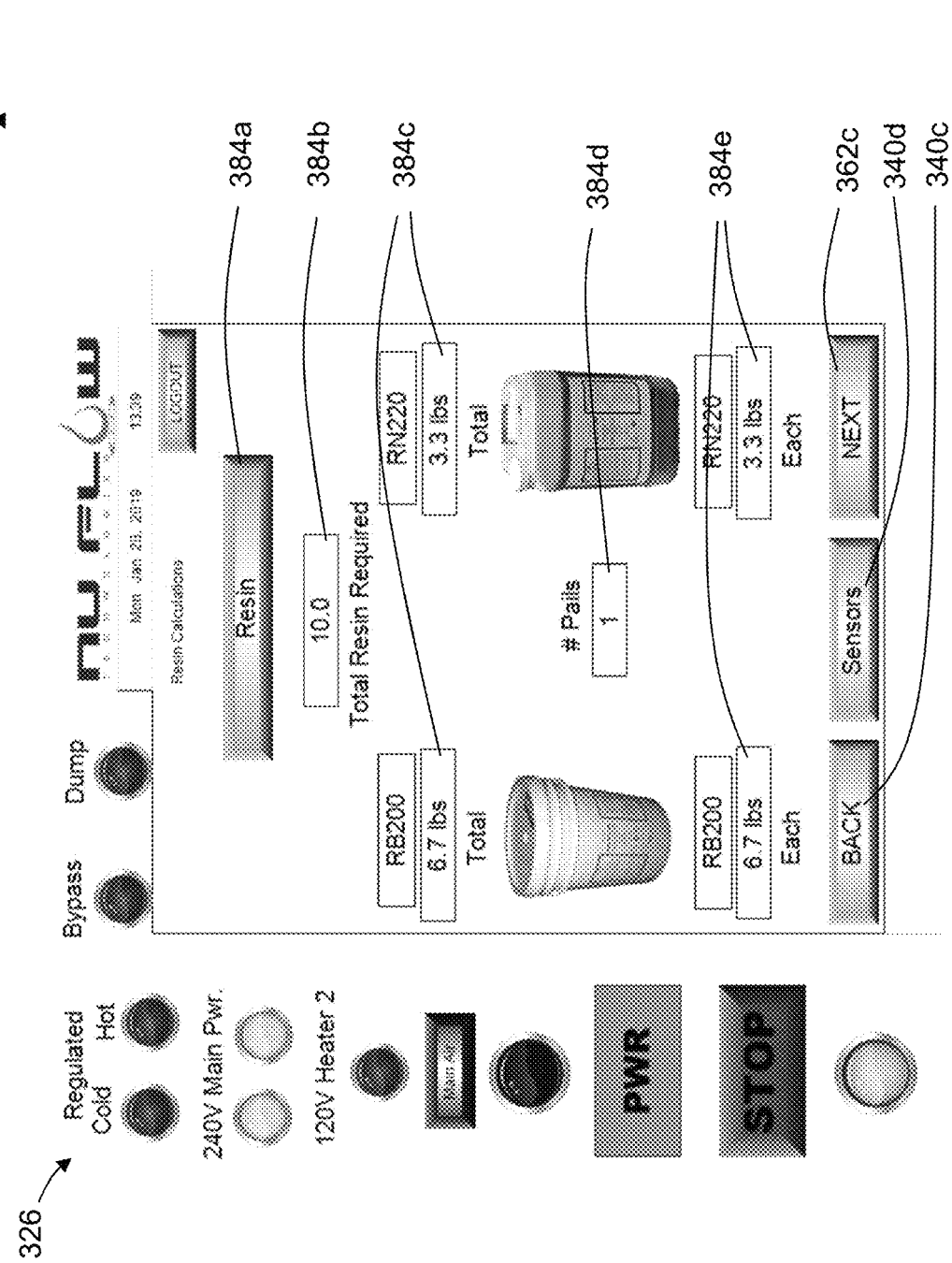

FIG. 11k shows the pipe information input page, which is generally indicated by reference numeral 376. Pipe information input page 376 comprises a plurality of fields 378a, each of which may be selected to open a text entry field (not shown) into which dimensional information associated with the physical dimensions of the pipe P, the liner 42 and the inflatable malleable bladder 44 may entered by the user. The pipe information input page 376 also comprises a plurality of fields 378b in which a calculated volume of the inflatable malleable bladder 44 is displayed. The calculated volume of the inflatable malleable bladder 44 is calculated by the automation application using the dimensional information of the inflatable malleable bladder 44 (namely, "pipe diameter" and "length of bladder") entered into the fields 378a. The pipe information input page 376 also comprises the back button 340c and the sensors button 340d, and further comprises the next button 362c which, when selected, causes the automation application to display a resin calculation page.

FIG. 11l shows the resin calculation page, which is generally indicated by reference numeral 382. Resin information page 382 comprises a resin calculation button 384a, which may be selected to calculate amounts of first epoxy component, namely unreacted epoxy resin, and second epoxy component, namely epoxy curative, to be combined and applied as "resin" to the liner at the job site, based on dimensional information of the liner 42 (namely, "pipe diameter" and "length of liner") entered into the fields 378a. The resin information page 382 also comprises: a total epoxy amount field 384b, in which a calculated total amount of epoxy components is displayed, based on the dimensional information of the liner 42 entered into the fields 378a of the pipe information input page 376; total component amount fields 384c, in which calculated total amounts of the first epoxy component and the second epoxy component are displayed, based on the second epoxy component selected using the curing agent pull-down menu button 374b on the job information page 372; a pail number field 384d, in which a calculated number of pails needed for mixing the calculated total amount of epoxy components is displayed; and pail component amount fields 384e, in which calculated amounts of the first epoxy component and the second epoxy component needed per pail are displayed. The resin information page 382 also comprises the back button 340c and the sensors button 340d, and further comprises the next button 362c which, when selected, causes the automation application to display a bladder test page.

Figure 11M:
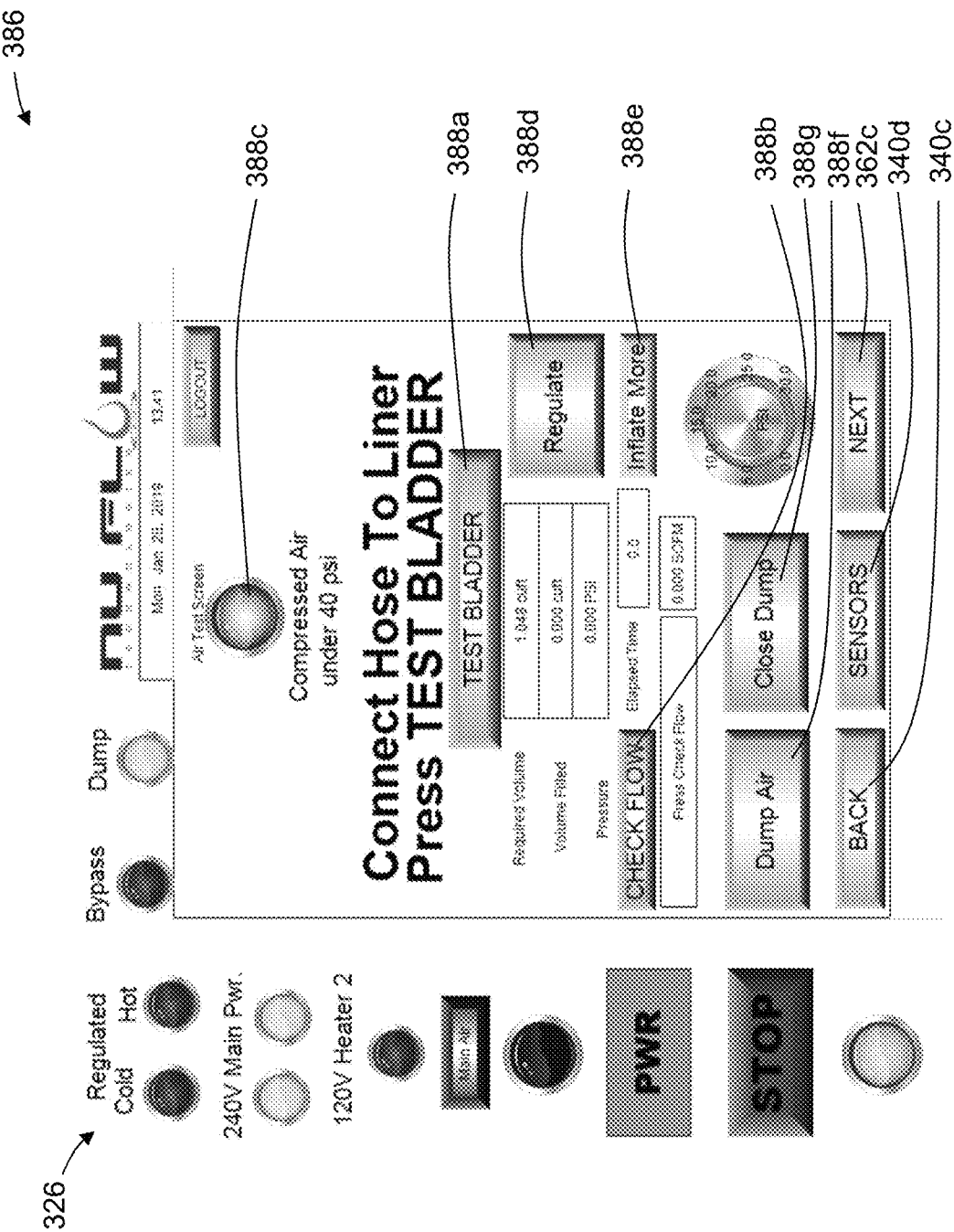

FIG. 11m shows the bladder test page, which is generally indicated by reference numeral 386. The bladder test page 386 comprises a bladder test button 388a, which when selected causes the automation application to run a bladder inflation sequence for test purposes. During the bladder inflation sequence, the automation application causes the automated steam generator 222 to open the bypass solenoid valve 272 to fill the inflatable malleable bladder 44 with a volume of air corresponding to the calculated volume of the inflatable malleable bladder 44, as measured by the air flow meter 268 over an elapsed time. Once the inflatable malleable bladder 44 has been filled, the automation application closes the bypass solenoid valve 272 and opens the cold regulated air solenoid valve 280, which passes, unheated regulated air into the inflatable malleable bladder 44. At this time, the user can generally check for leaks and inspect the integrity of inflated liner assembly 20. The bladder test page 386 also comprises a check flow button 388b, which when selected displays the flow rate through the inflated liner assembly 20. At this time, the user can adjust the release pressure setting of the pressure relief valve 30 at a certain regulated pressure such that the measured flow rate is within a desired range, such as between about 6 and about 8 scfm. The bladder test page 386 also comprises a forty (40) psi compressed air indicator 388c; a regulate button 388d, which when selected allows the user to adjust the pressure setting of the digital air regulator 276; an additional inflation button 388*e*, which may be selected to increase the inflation pressure of the inflatable malleable bladder 44 by a predefined amount; an air dump button 388*f*, which when selected causes the automation application to close the incoming air solenoid valve 266 and open the dump solenoid valve 302 to release air pressure from the inflatable malleable bladder 44; and a close dump button 388*g*, which when selected causes the automation application to close the dump solenoid valve 302. The bladder test page 386 also comprises the next button 362*c* which, when selected, causes the automation application to display a lining page.

Figure 11N:
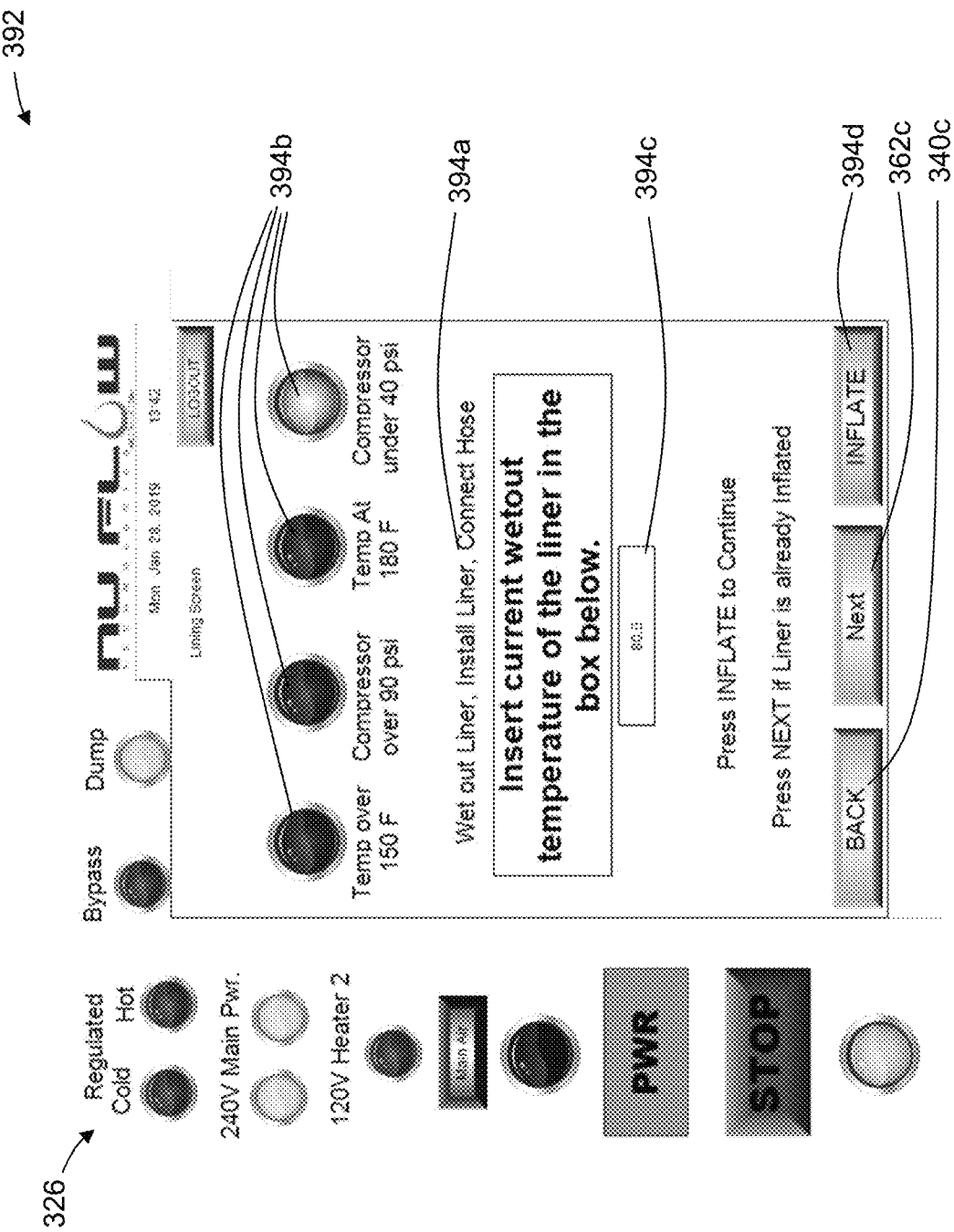

FIG. 11*n* shows the lining page, which is generally indicated by reference numeral 392. Lining page 392 comprises an instructions banner 394*a*, in which a sequence of instructions to be followed by the user is displayed. In the example shown, the sequence of instructions includes "wet out liner", "install liner" and "connect hose". The lining page 392 also comprises a plurality of indicators 394*b*, which in the example shown are a temperature over one-hundred fifty (150) F indicator, a compressor over ninety (90) psi indicator, a temperature at one-hundred eighty (180) F indicator, and the compressor under forty (40) psi indicator. The lining page 392 also comprises an ambient temperature entry field 394*c*, which when selected opens a text entry keyboard (not shown) for allowing a user to enter a temperature of the liner 42 generally at the time of wetting with epoxy. The temperature of the wetted liner 42 may be measured by a handheld pyrometer (not shown) operated by the user, for example. The lining page 392 comprises the back button 340*c*, and also comprises the next button 362*c* which, when selected, causes the automation application to display the cure selection page. The lining page 392 further comprises an inflate button 394*d* which, when selected, causes the automation application to run the bladder inflation sequence and to display an inflation page.

Figure 11O:
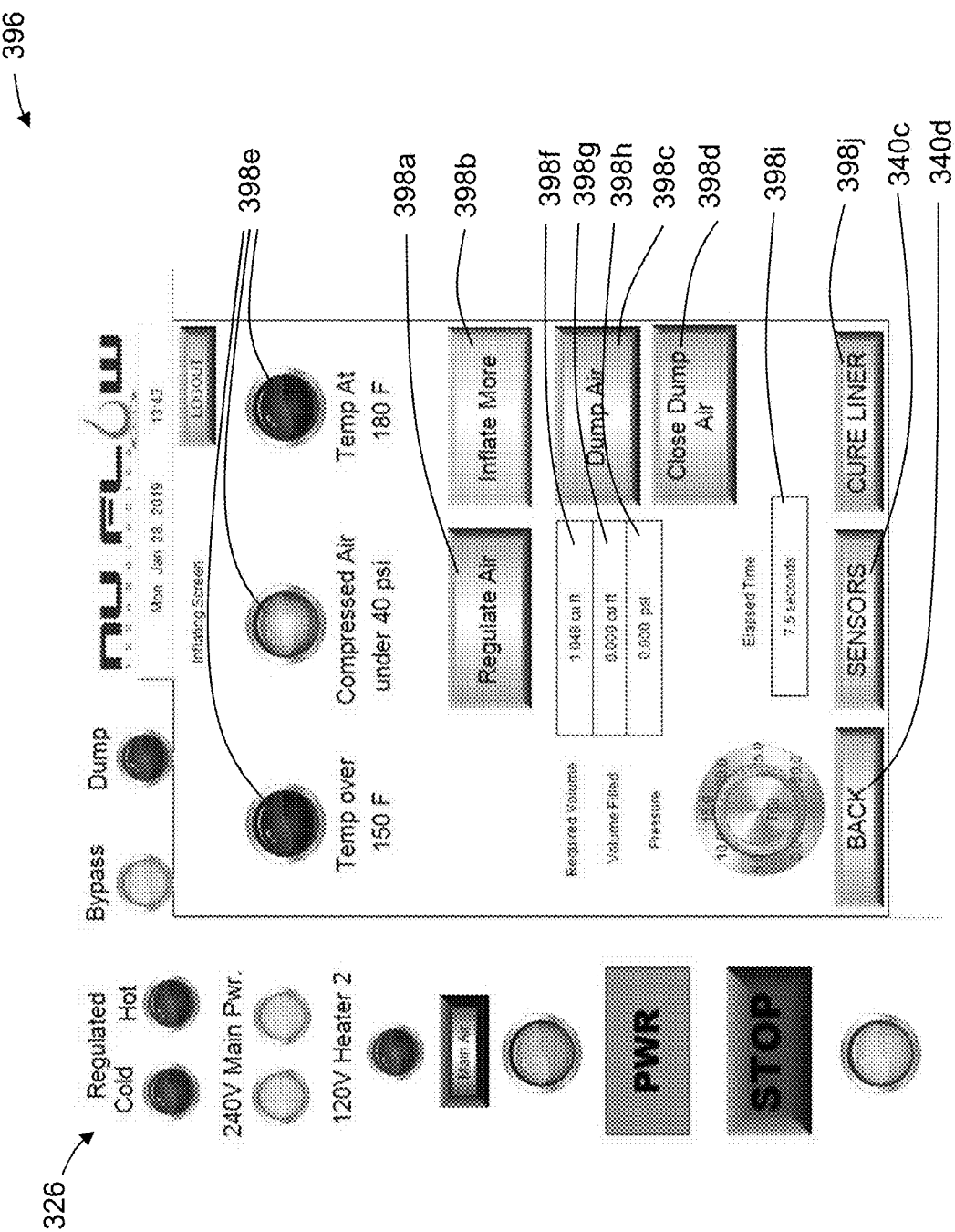

FIG. 11*o* shows the inflation page, which is generally indicated by reference numeral 396. The inflation page 396 comprises: a regulate button 398*a*, which when selected allows the user to adjust the pressure setting of the digital air regulator 276; an additional inflation button 398*b*, which may be selected to increase the inflation pressure of the malleable inflatable bladder, an air dump button 398*c*, which when selected causes the automation application to control the automated steam generator 222 to close the incoming air solenoid valve 266 and open the dump solenoid valve 302 to release air pressure from the inflatable malleable bladder 44; and a close dump button 398*d*, which when selected causes the automation application to close the dump solenoid valve 302. The inflation page 396 also comprises a plurality of indicators 398*e*, which in the example shown are the temperature over one-hundred fifty (150) F indicator, a compressed air under forty (40) psi indicator, and the temperature at one-hundred eighty (180) F indicator. The inflation page 396 also comprises: a required volume display field 398*f*, which displays the calculated volume of the inflatable malleable bladder 44; a volume filled display field 398*g*, as calculated by the automation application using the output of the air flow meter 268 over an amount of time elapsed since the beginning of the inflation sequence; a pressure display field 398*h*, which displays the measured pressure in the inflatable malleable bladder 44 as measured by the outgoing pressure sensor 288; and an elapsed time field 398*i*, which displays the amount of time elapsed since the beginning of the inflation sequence. The inflation page 396 also comprises the back button 340*c* and the sensors button 340*d*, and further comprises a cure liner button 398*j*, which when selected causes the automation application to display the cure selection page.

Figure 11P:
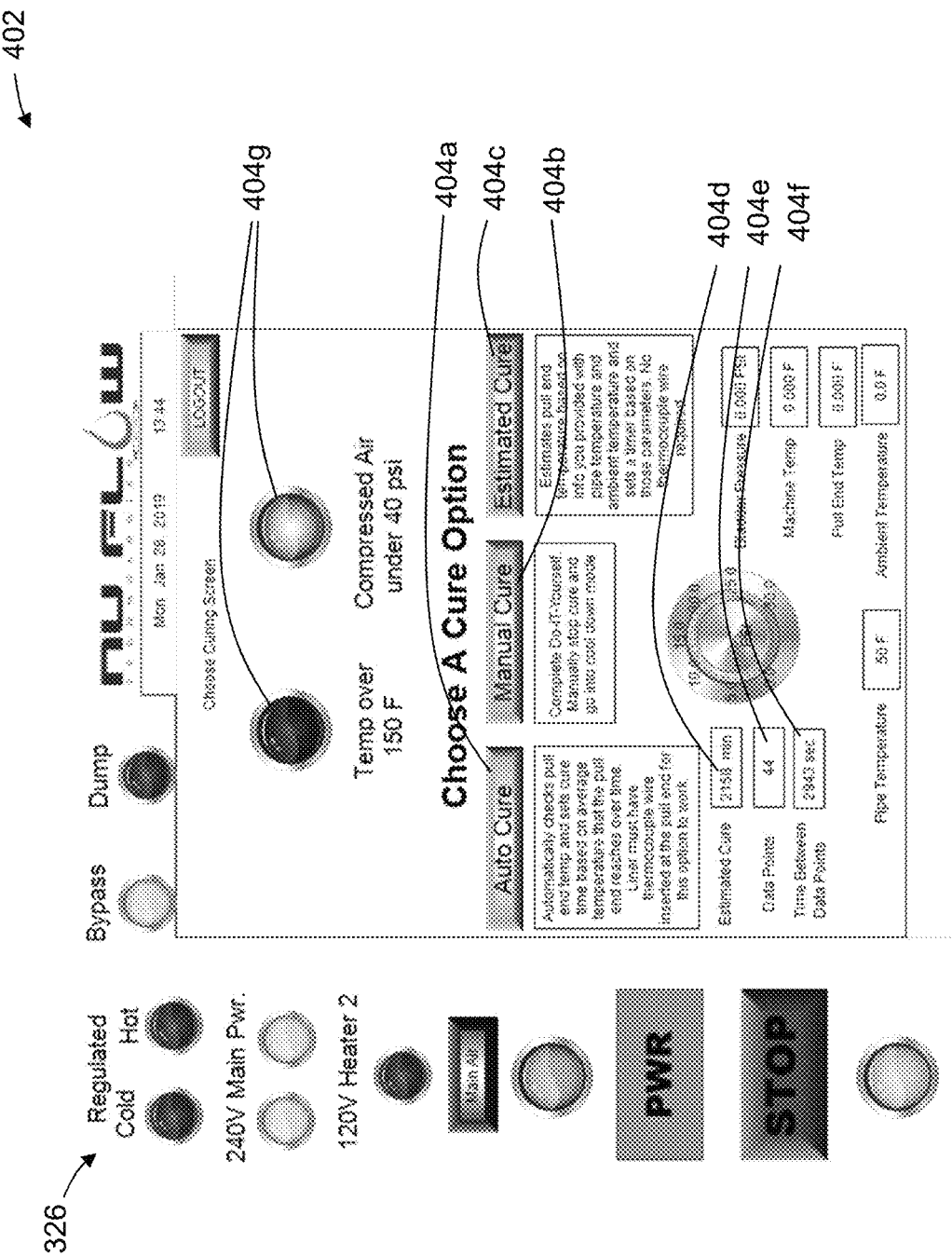
Figure 11G:
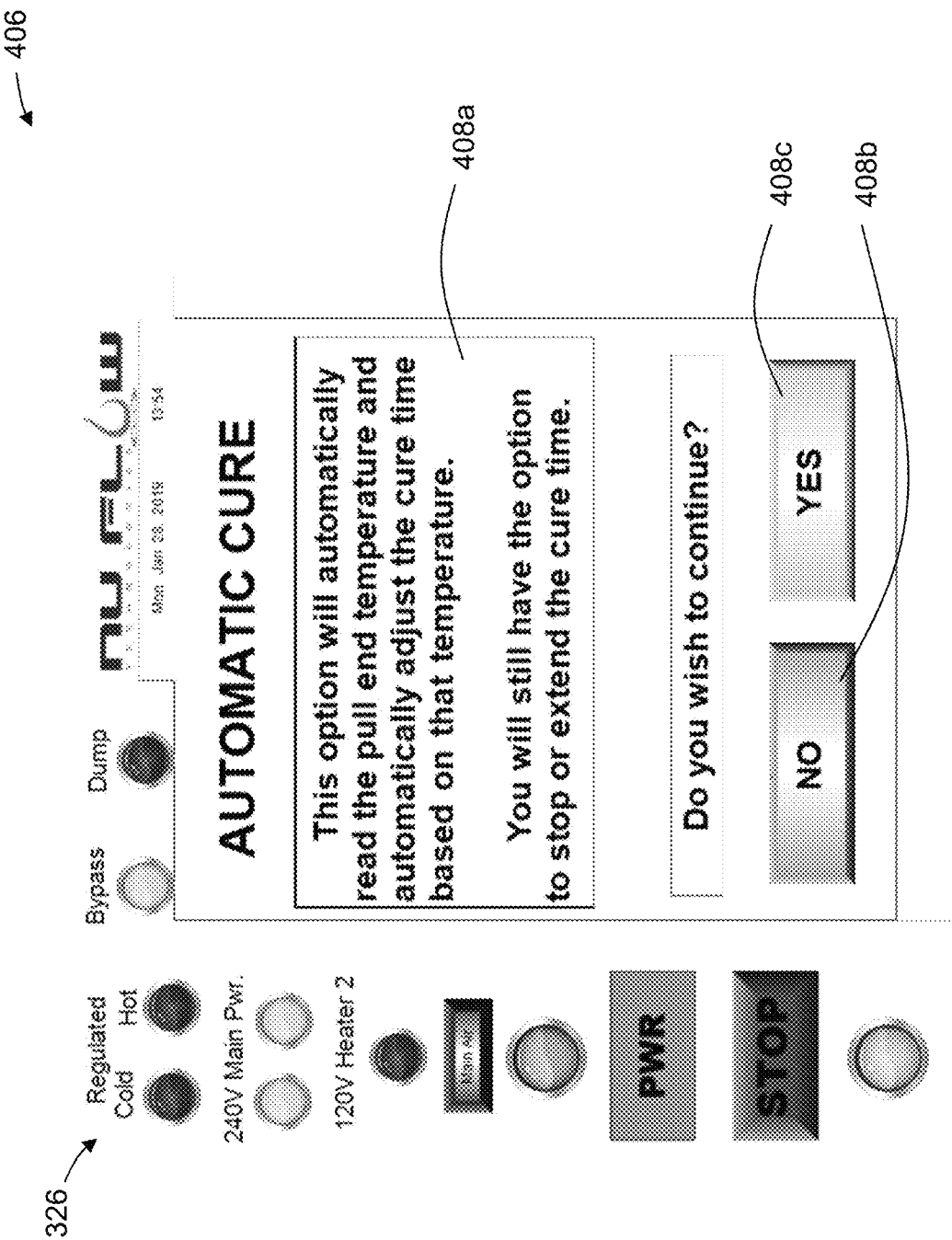

FIG. 11*p* shows the cure selection page, which is generally indicated by reference numeral 402. Cure selection page 402 comprises a plurality of buttons that prompt the user to select a curing format, with each curing format having a different amount of automation controlled by the automation application. In the example shown, the cure selection page 402 comprises: an auto cure button 404*a*, which when selected causes the automation application to display an automated cure confirmation page; a manual cure button 404*b*, which when selected causes the automation application to display a manual cure confirmation page; and an estimated cure button 404*c*, which when selected causes the automation application to display an estimated cure confirmation page. The automation application displays the auto cure button 404*a* and the manual cure button 404*b* for all permission statuses, but displays the estimated cure button 404*c* only for "authorized supervisor" and "factory" permission statuses. The cure selection page 402 also comprises an estimated curing time display field 404*d*, in which an estimated curing time of the liner 42 as calculated by the automation application is displayed. The estimated curing time of the liner 42 is calculated by the automation application using at least: i) a calculated amount of total heat required for curing, based on information entered by the user into the pipe information input page 376, and at least including dimensional information of the liner 42, and ambient temperature; ii) the flow rate and flow temperature, as measured by the air flow meter 268 and the outgoing temperature sensor 286; iii) a calculated amount of heat loss through the inflation line 88 and the malleable inflatable bladder 44, as indicated by the temperature difference measured by the outgoing temperature sensor 286 and the distal end temperature sensor 298; and iv) the epoxy type, based on information entered by the user into the job information input page 372, and based on known thermal property data and/or standardized cure rate data stored in memory by the automation application for the first and second epoxy components. The cure selection page 402 also comprises a data point number display field 404*e*, which displays the number of data points to be used during the estimated curing time, and data point separation field 404*f*, which displays the time between data points. The cure selection page 402 also comprises a plurality of indicators 404*g*, which in the example shown are the temperature over one-hundred fifty (150) F indicator and the compressed air under forty (40) psi indicator.

FIG. 11*q* shows the automated cure confirmation page, which is generally indicated by reference numeral 406. Automated cure confirmation page 406 comprises a message banner 408*a* containing a message prompting the user to confirm that he or she wishes to run the automated cure sequence. The automated cure confirmation page 406 also comprises a "no" button 408*b*, which when selected causes the automation application to redisplay the cure selection page 402, and a "yes" button 408*c*, which when selected causes the automation application to control the automated steam generator 222 to run an automated cure sequence, in which the automation application generally utilizes output provided by the outgoing temperature sensor 286 to continuously adjust the remaining cure time, and to display an automated cure page.

Figure 11R:
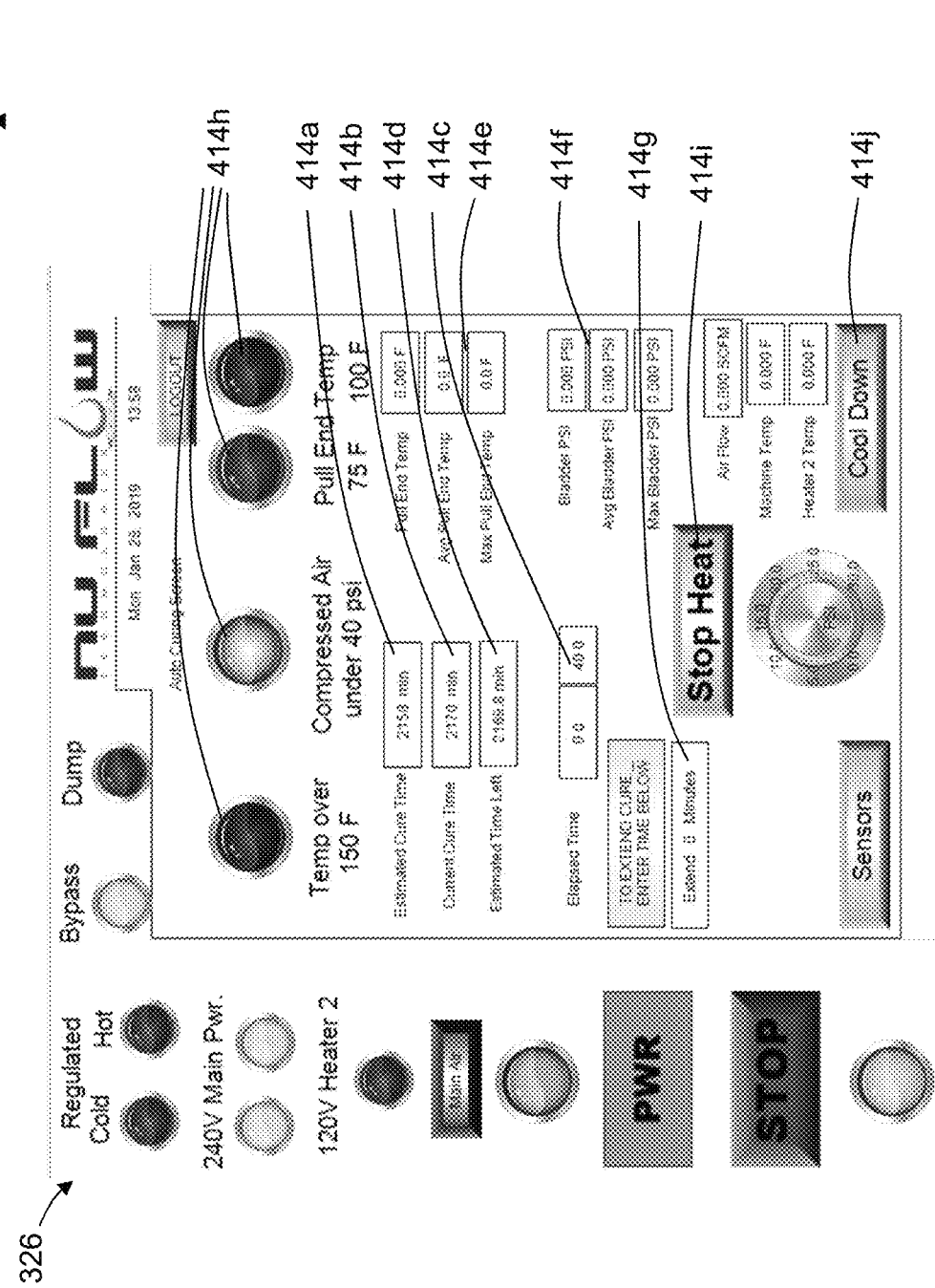

FIG. 11*r* shows the automated cure page, which is generally indicated by reference numeral 412. Automated cure page 412 comprises a plurality of display fields, which display information about the automated cure sequence being controlled by the automation application. In the example shown, the display fields comprise an estimated cure time display field 414*a*, which displays the estimated curing time originally displayed on the cure selection page 402; a current cure time display field 414*b*, in which an adjusted estimated curing time calculated by the automation application is displayed. The adjusted estimated curing time of the liner 42 is calculated by the automation application using at least: i) the calculated amount of total heat required for curing, based on information entered by the user into the pipe information input page 376; ii) an average flow rate and average flow temperature, as measured by the air flow meter 268 and the outgoing temperature sensor 286 during the elapsed portion of the automated cure sequence; iii) an average calculated amount of heat loss through the inflation line 88 and the malleable inflatable bladder 44, as measured by the outgoing temperature sensor 286 and the distal end temperature sensor 298 during the elapsed portion of the automated cure sequence; and iv) the epoxy type, based on information entered by the user into the job information input page 372; an elapsed time display field 414*c*, which displays the amount of time of the elapsed portion of the automated cure sequence; and an estimated time left display field 414*d*, which displays the difference between the adjusted estimated curing time and the elapsed time.

The automated cure page 412 also comprises pull end temperature display fields 414*e*, which display current, average and maximum temperatures measured by the distal end temperature sensor 298 during the elapsed portion of the automated cure sequence; and bladder pressure display fields 414*f*, which display current, average and maximum pressures measured by the outgoing pressure sensor 288 during the elapsed portion of the automated cure sequence. The automated cure page 412 also comprises a time extension field 414*g*, which may be selected by the user to enter an amount of additional time by which to extend the automated curing sequence. The automated cure page 412 also comprises a plurality of indicators 414*h*, which in the example shown are the temperature over one-hundred fifty (150) F indicator, the compressed air under forty (40) psi indicator, a pull end temperature over seventy-five (75) F indicator, and a pull end temperature over one-hundred (100) F indicator. The automated cure page 412 further comprises a stop heat button 414*i*, which when selected by the user causes the automation application to control the automated steam generator 222 to turn off power to the air heater 282 and to the heating elements 98 in the tank 94.

When the calculated time remaining during the automated curing sequence reaches zero, the automation program displays a cool down button 414*j* on the automated cure page 412. Selection of the cool down button 414*j* by the user causes the automation application to control the automated steam generator 222 to initiate a cooldown sequence, in which i) the hot regulated air solenoid valve 278 is closed and the cold regulated air solenoid valve 280 is opened such that regulated air bypasses the heaters and is diverted to the output conduit and through the connector 274, and ii) power to the air heater 282 and to the heating elements 98 in the tank 94 is turned off. Selection of the cool down button 414*j* by the user also causes the automation application to display a cooldown page.

Figure 11S:
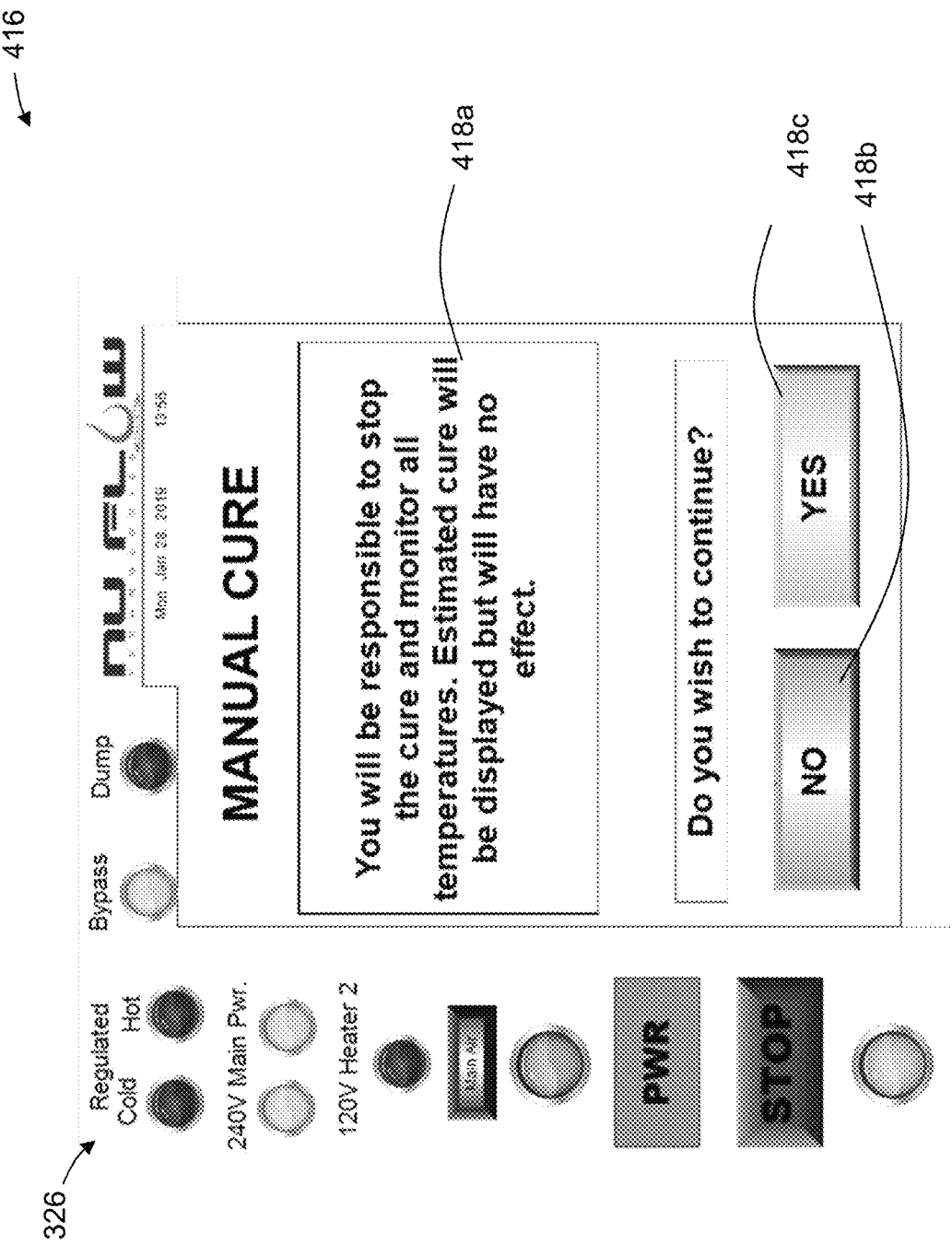

FIG. 11*s* shows the manual cure confirmation page, which is generally indicated by reference numeral 416. Manual cure confirmation page 416 comprises a message banner 418*a* containing a message prompting the user to confirm that he or she wishes to run the manual cure sequence. The manual cure confirmation page 416 also comprises a "no" button 418*b*, which when selected causes the automation application to redisplay the cure selection page 402, and a "yes" button 418*c*, which when selected causes the automation application to control the automated steam generator 222 to run a manual cure sequence and to display an automated cure page.

Figure 11T:
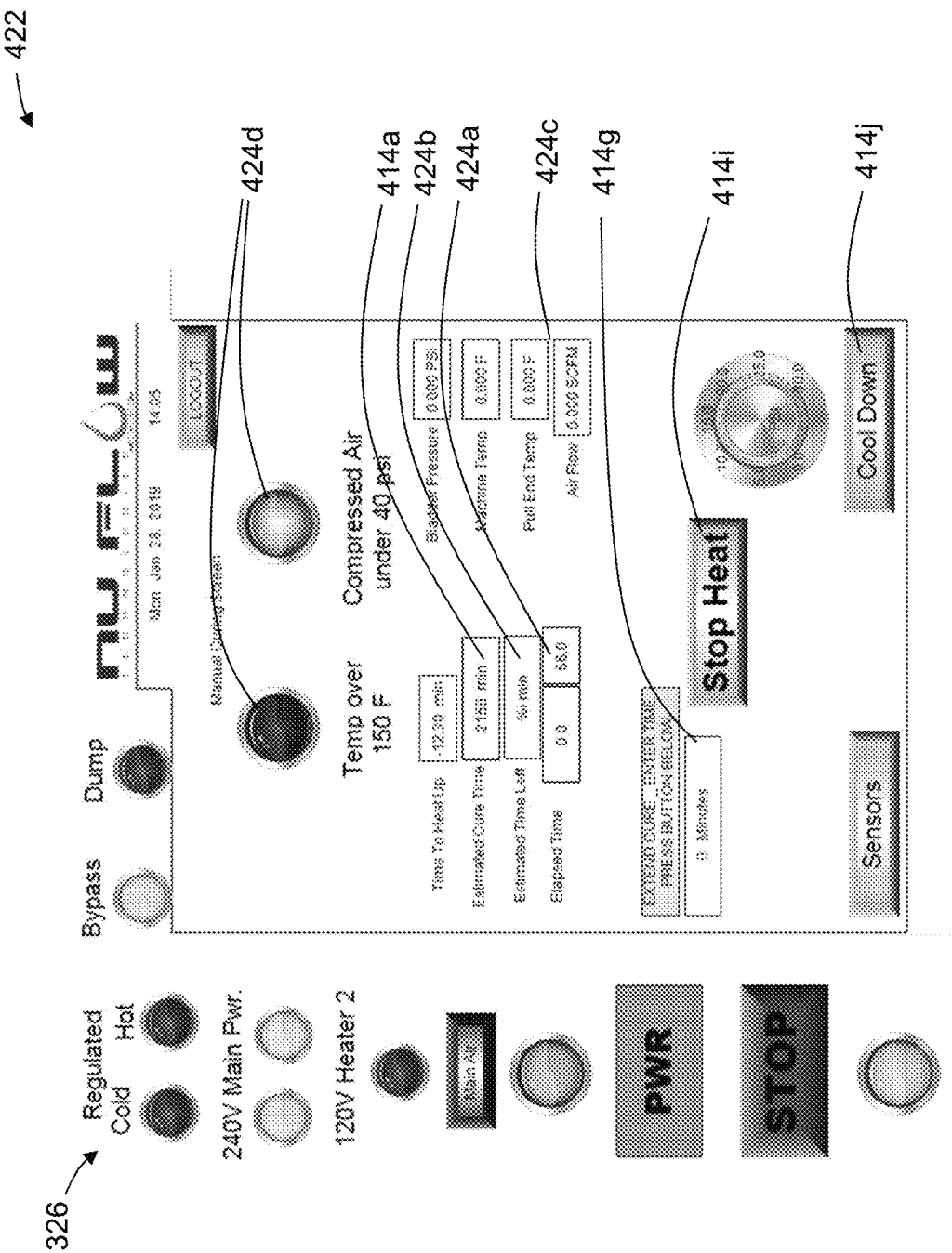

FIG. 11*t* shows the manual cure page, which is generally indicated by reference numeral 422. Manual cure page 422 comprises the estimated cure time display field 414*a*, which displays the estimated curing time originally displayed on the cure selection page 402; an elapsed time display field 424*a*, which displays the amount of time of the elapsed portion of the manual cure sequence; and an estimated time left display field 424*b*, which displays the difference between the estimated curing time and the elapsed time. The manual cure page 422 also comprises a plurality of display fields 424*c* which display the current bladder pressure as measured by outgoing pressure sensor 288; the current outgoing temperature as measured by the outgoing temperature sensor 286; the current distal end temperature as measured by the distal end temperature sensor 298 (if used); and the current flow rate as measured by the air flow meter 268. The manual cure page 422 also comprises the time extension field 414*g*, which may be selected by the user to enter an amount of additional time by which to extend the manual curing sequence. The manual cure page 422 also comprises a plurality of indicators 424*h*, which in the example shown are the temperature over one-hundred fifty (150) F indicator and the compressed air under forty (40) psi indicator. The manual cure page 422 also comprises the stop heat button 414*i* and the cool down button 414*j*.

Figure 11U:
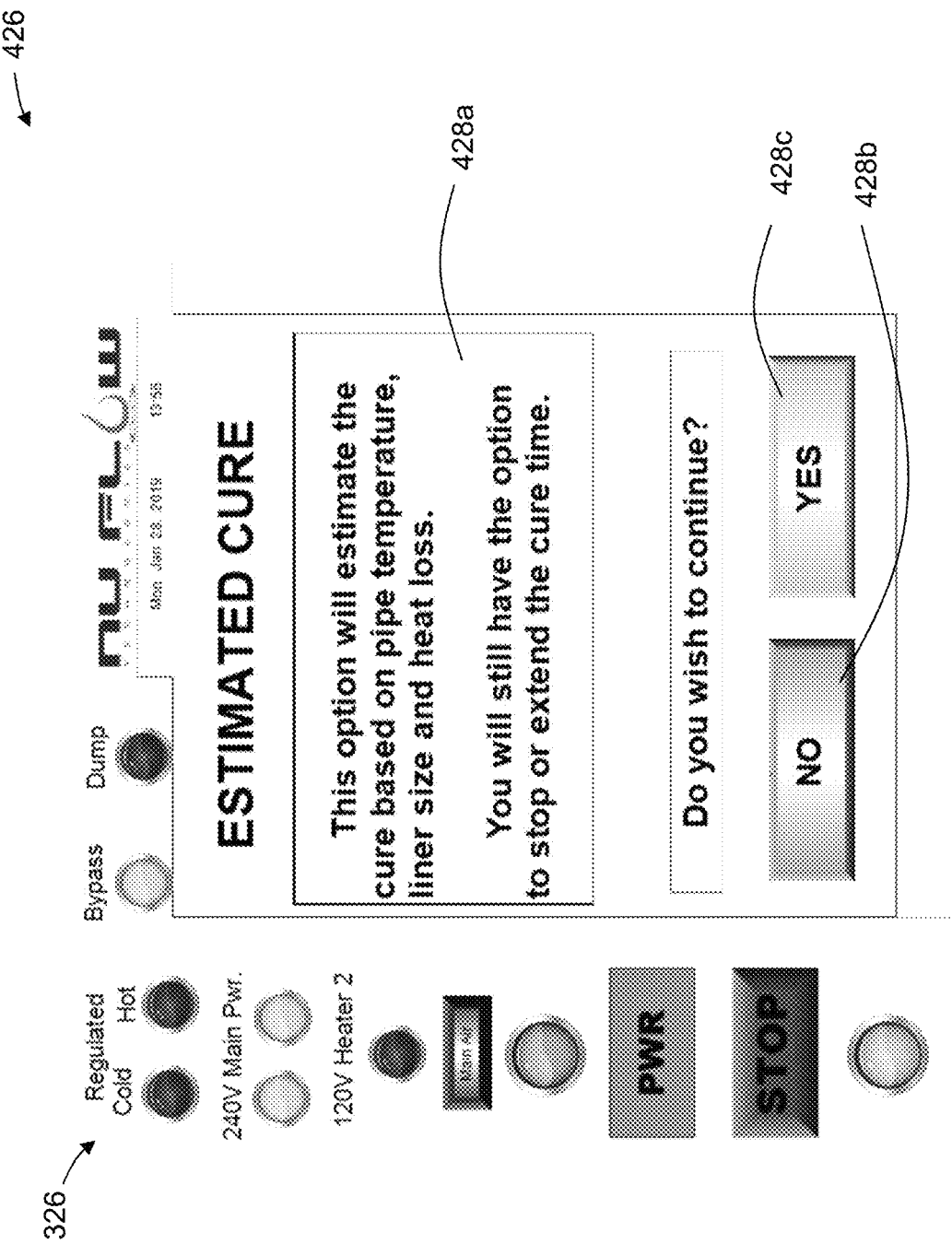

FIG. 11*u* shows the estimated cure confirmation page, which is generally indicated by reference numeral 426. Estimated cure confirmation page 426 comprises a message banner 428*a* containing a message prompting the user to confirm that he or she wishes to run the estimated cure sequence. The estimated cure confirmation page 426 also comprises a "no" button 428*b*, which when selected causes the automation application to redisplay the cure selection page 402, and a "yes" button 428*c*, which when selected causes the automation application to control the automated steam generator 222 to run an estimated cure sequence and to display an estimated cure page.

Figure 11V:
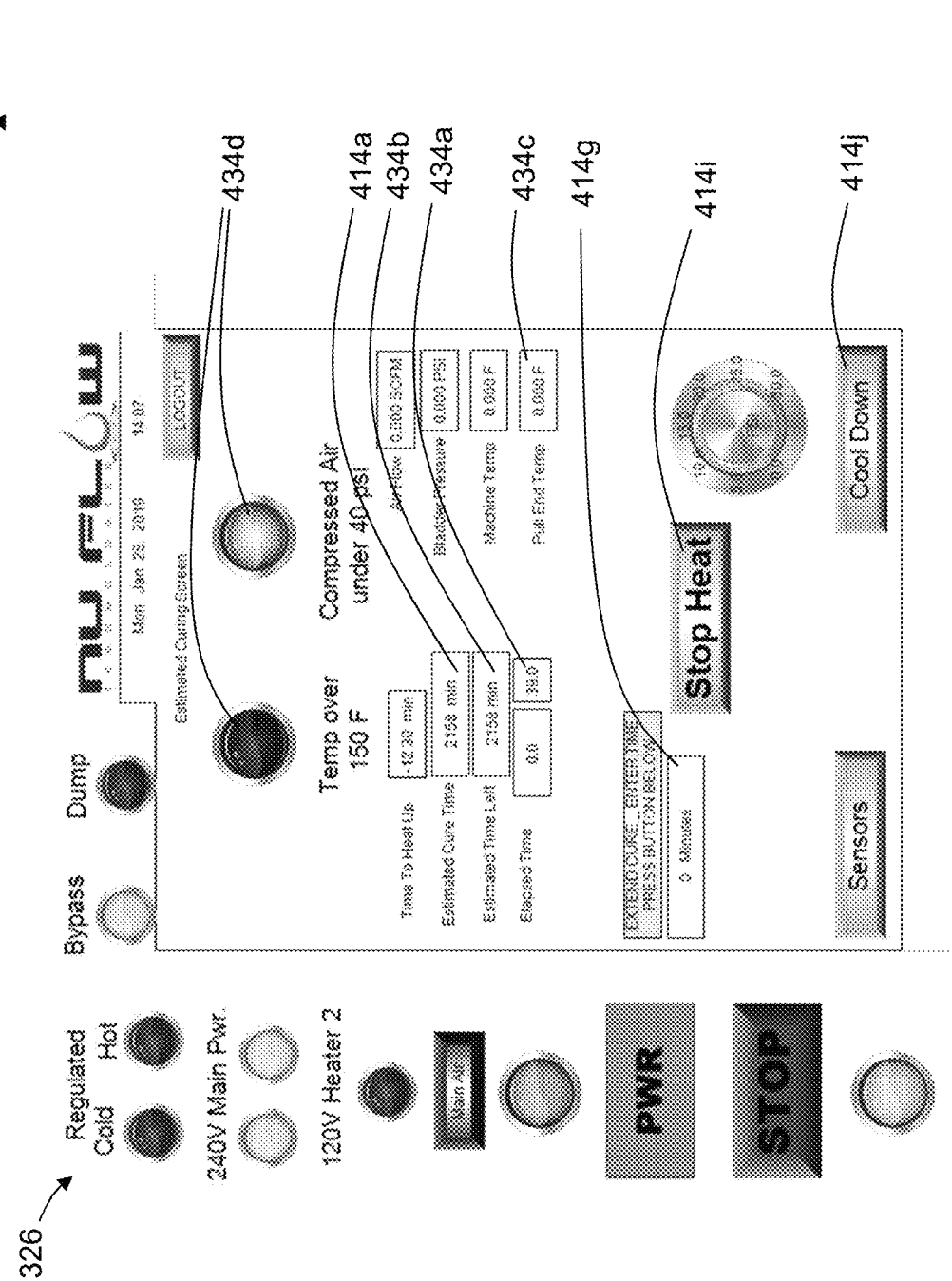

FIG. 11*v* shows the estimated cure page, which is generally indicated by reference numeral 432. Estimated cure page 432 comprises the estimated cure time display field 414*a*, which displays the estimated curing time originally displayed on the cure selection page 402; an elapsed time display field 434*a*, which displays the amount of time of the elapsed portion of the estimated cure sequence; and an estimated time left display field 434*b*, which displays the difference between the estimated curing time and the elapsed time. The estimated cure page 432 also comprises a plurality of display fields 434*c* which display the current bladder pressure as measured by outgoing pressure sensor 288; the current outgoing temperature as measured by the outgoing temperature sensor 286; the current distal end temperature as measured by the distal end temperature sensor 298 (if used); and the current flow rate as measured by the air flow meter 268. The estimated cure page 432 also comprises the time extension field 414*g*, and a plurality of indicators 434*d*, which in the example shown are the temperature over one-hundred fifty (150) F indicator and the compressed air under forty (40) psi indicator. The estimated cure page 432 also comprises the stop heat button 414*i* and the cool down button 414*j*.

Figure 11W:
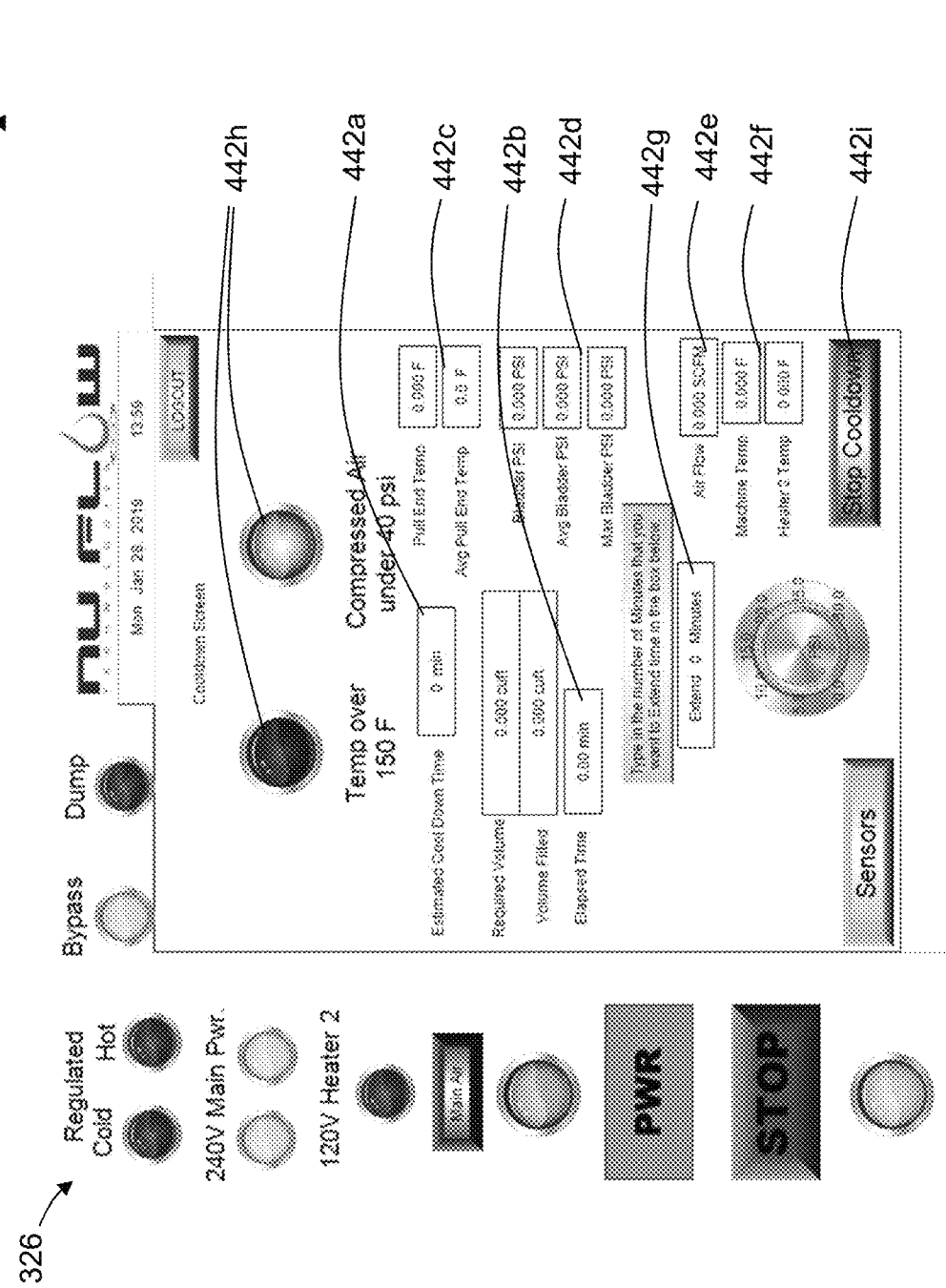

FIG. 11w shows the cooldown page, which is generally indicated by reference numeral 438. Cooldown page 438 comprises an estimated cooldown time display field 442a, which displays an estimated cooldown time of the liner 42 as calculated by the automation application. The estimated cooldown time of the liner 42 is calculated by the automation application using one or more of: i) a calculated amount of total heat in the liner at the beginning of the cooldown sequence, based on information entered by the user into the pipe information input page 376; ii) the calculated amount of heat loss through the inflation line 88 and the malleable inflatable bladder 44; and iii) the flow rate and flow temperature, as measured by the air flow meter 268 and the outgoing temperature sensor 286. The cooldown page 438 also comprises: an elapsed time display field 442b, which displays the amount of time of the elapsed portion of the cooldown sequence.

The cooldown page 438 also comprises display fields 442c which display the current and average pull end temperatures measured by the distal end temperature sensor 298 during the elapsed portion of the cooldown sequence; display fields 442d which display the current, average and maximum pressures measured by the outgoing pressure sensor 288 during the elapsed portion of the cooldown sequence; a display field 442e which measures the current flow rate measured by the air flow meter 268; and display fields 442f which display the current outgoing and distal end temperatures as measured by the outgoing temperature sensor 286 and the distal end temperature sensor 298. The cooldown page 438 also comprises a time extension field 442g, which may be selected by the user to enter an amount of additional time by which to extend the cooldown sequence. The cooldown page 438 also comprises a plurality of indicators 442h, which in the example shown are the temperature over one-hundred fifty (150) F indicator and the compressed air under forty (40) psi indicator. The cooldown page 438 also comprises a stop cooldown button 442i, which when selected by the user causes the automation application to control the automated steam generator 222 to end the cooldown sequence by closing the incoming air solenoid valve 266 and opening the dump solenoid valve 302 to release air pressure from the inflatable malleable bladder 44, and to display data report pages.

When the amount of time of the elapsed portion of the cooldown sequence equals the estimated cooldown time of the liner 42, the automation application controls the automated steam generator 222 to end the cooldown sequence, and updates the cooldown page 438 to a display a "finish" button (not shown) at the position where the stop cooldown button 442i was previously located. The finish button may be selected by the user to display the data report pages.

Figure 11X:
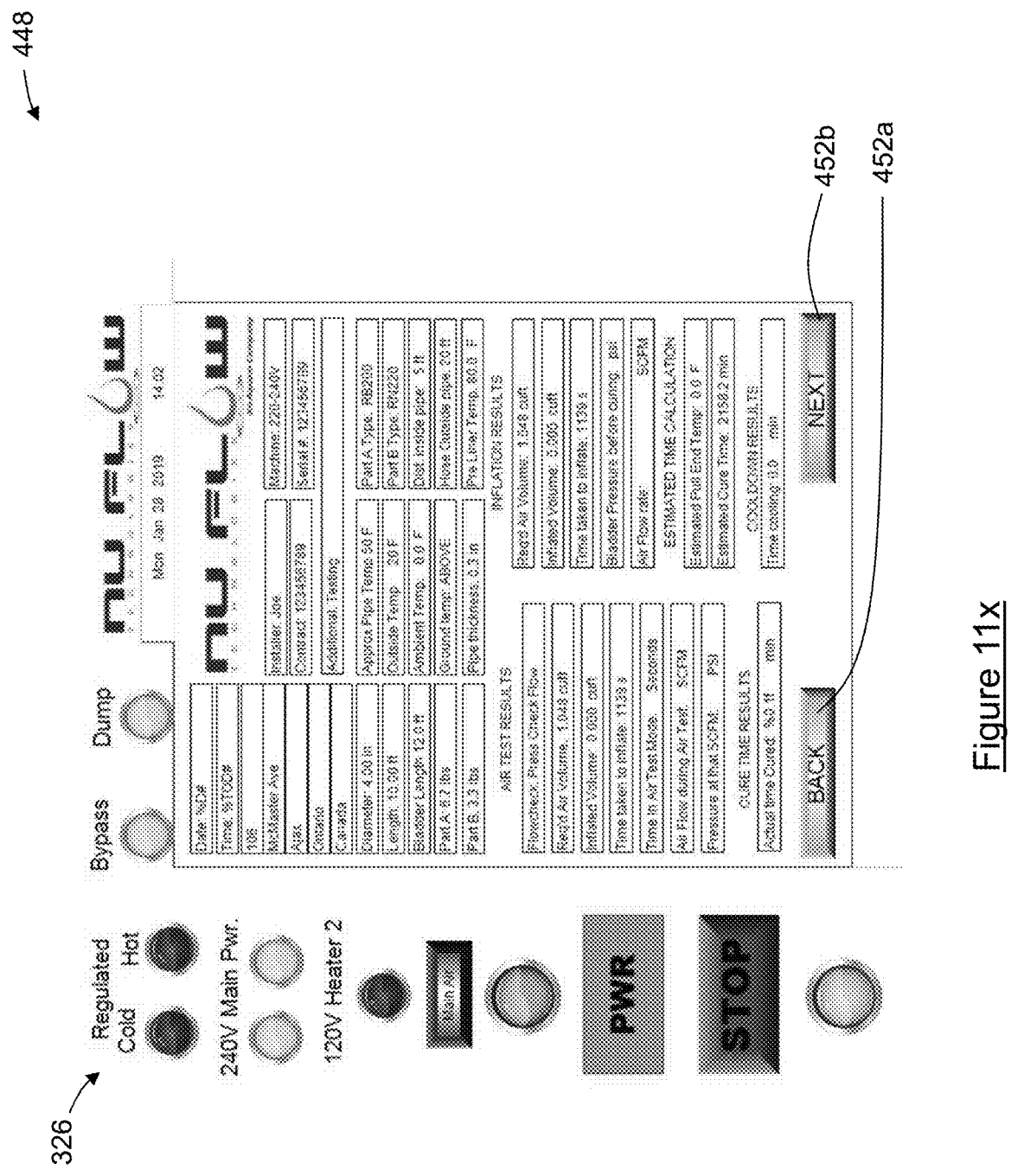
Figure 11Y:
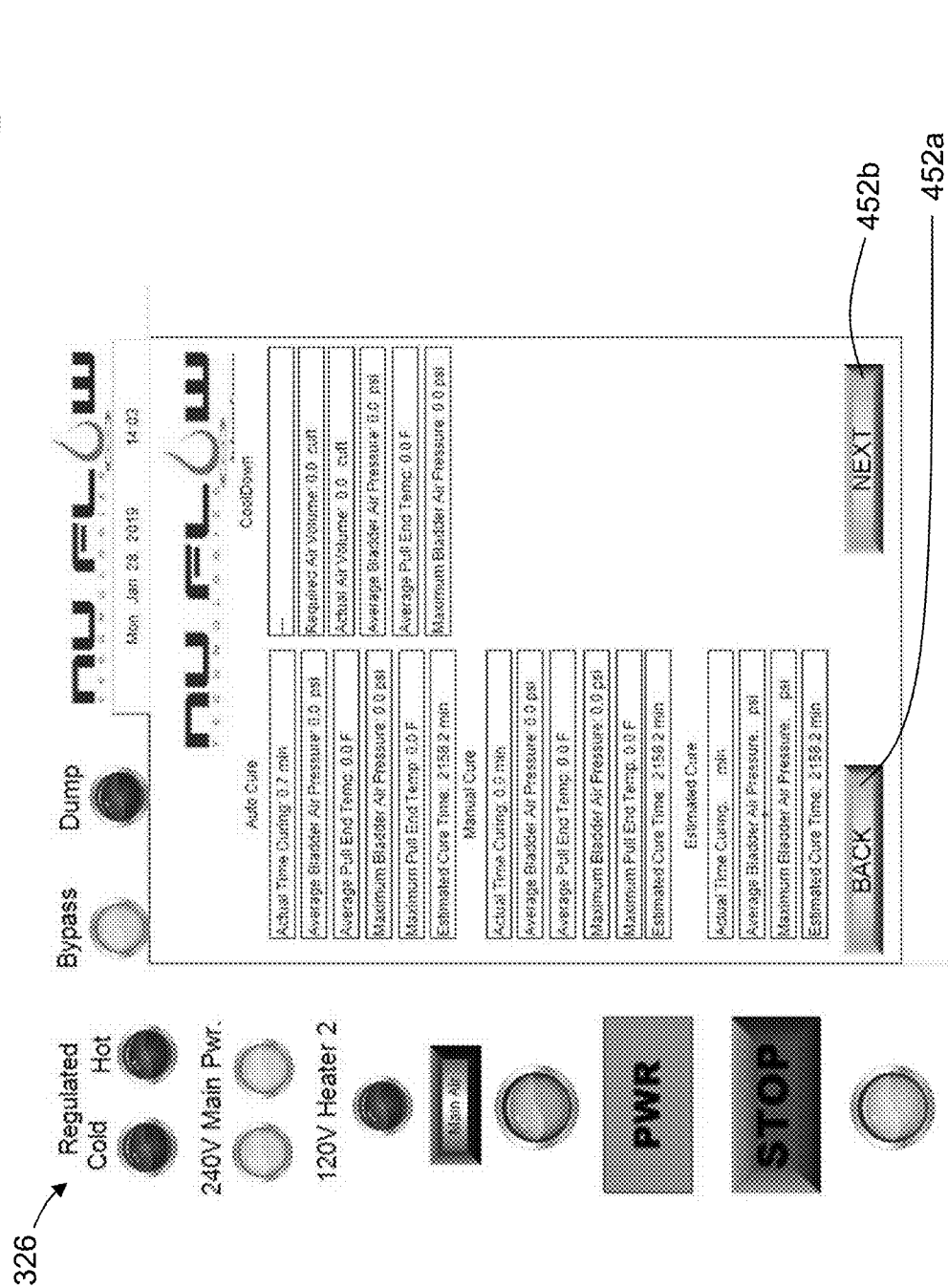
Figure 11Z:
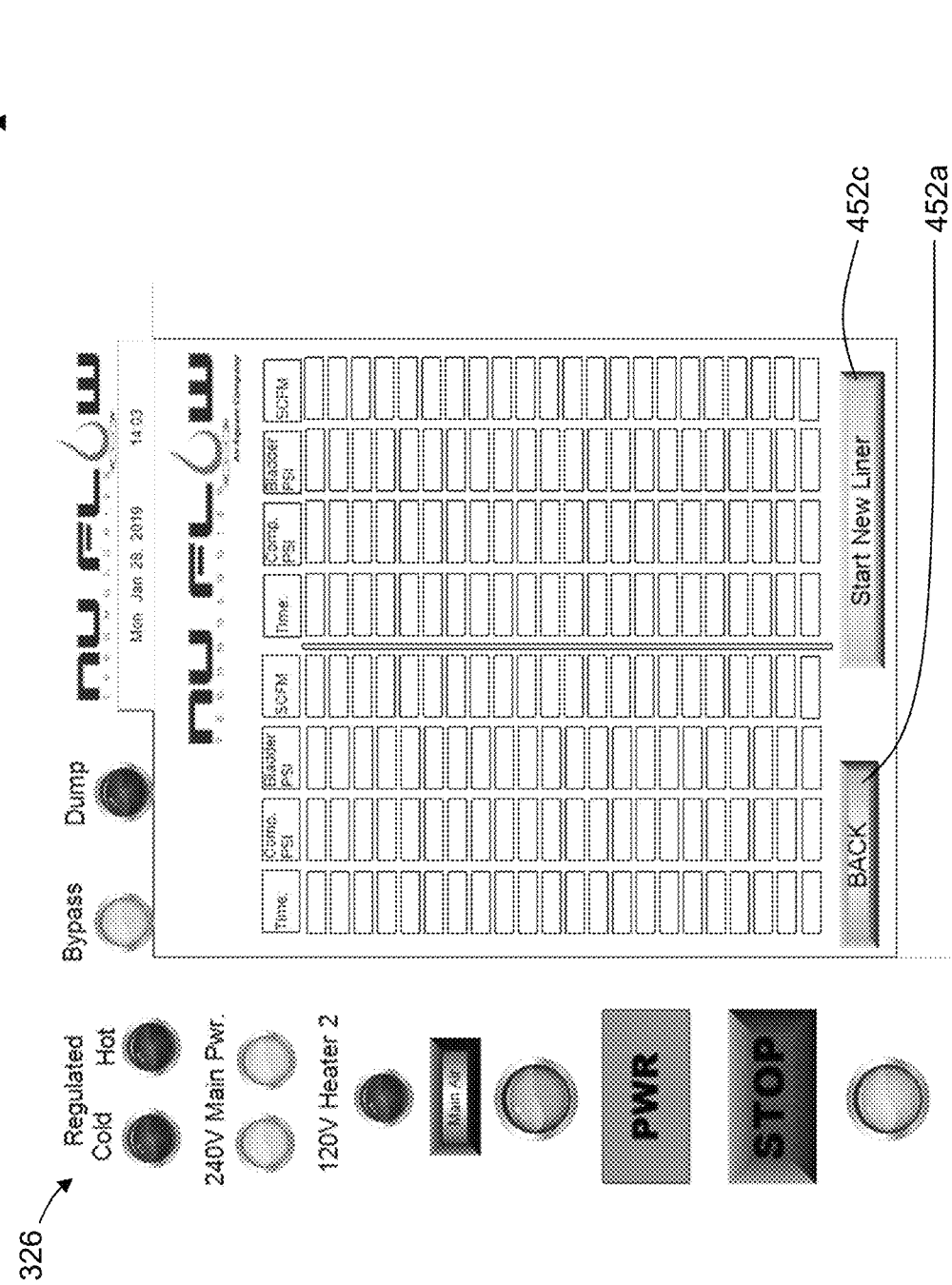

FIGS. 11x to 11z show the data report pages, which are generally indicated by reference numeral 448. Data report pages 448 comprises a plurality of display fields in which information entered by the user, and acquired sensor data, are displayed. The contents of the data report pages 448 can be provided as a job summary printout to the customer as proof that the liner 44 was correctly and successfully installed. The data report pages 448 comprise a back button 452a and a next button 452b, which may be selected to navigate between data report pages 448. The data report pages 448 also comprises a start new liner button 452c, which when selected causes the application to display the authorized login page 344.

As will be appreciated, the automation application, in conjunction with the automated steam generator 222, allows the cure time, the amount of epoxy, the amount of each epoxy component, and the amount of cooldown time to be automatically calculated. This advantageously reduces the amount of labor and effort required by the worker, and advantageously removes the likelihood of human error. Additionally, the automatic calculation of the cure time, the amount of epoxy, the amount of each epoxy component, and the amount of cooldown time, advantageously provides consistency and standardization in curing conditions i) among different liner installations; ii) among different job sites; iii) among different workers; and iv) among different worker organizations and/or licensees.

As will be appreciated, logging of data by the automation application throughout pre-installation testing and installation of the liner advantageously allows worker performance to be later reviewed to ensure that workers are installing liners correctly. Additionally, and as will be appreciated, the logging of data by the automation application throughout pre-installation testing and installation of the liner advantageously allows the job summary report to be provided to the client as a printed report as evidence that the liner was properly installed, such as for quality assurance purposes.

As will be appreciated, the pages presented by the automation application are user-friendly and intuitive, and can serve as a visual aid in training new workers about the installation process.

As will be appreciated, and as discussed above for steam generator 90, the continuous flow of the steam-air mixture through the internal reservoir 142 allows the tubular liner 42 to be maintained at an elevated temperature during curing, which advantageously increases the curing rate of the epoxy impregnating the tubular liner 42. As will be understood, increasing the curing rate reduces the time needed for the tubular liner 42 to cure, which in turn allows a greater number of liners to be installed in a single day by a single worker or crew, thereby increasing throughput and worker efficiency.

Additionally, as will be appreciated, and as discussed above for steam generator 90, the continuous flow of the steam-air mixture through the internal reservoir 142 and the pressure relief valve 30 advantageously prevents condensation from accumulating inside of the bladder 44, which would otherwise impede heat transfer from the flowing steam-air mixture to the tubular liner 42.

As will be appreciated, and as discussed above for steam generator 90, the use of the pressure relief valve 30 allows the steam-air mixture to be discharged directly into the pipeline P. As will be understood, this advantageously eliminates the need to recirculate steam within the liner assembly during curing, which would otherwise require bulky pull blocks and/or bulky inflation blocks to accommodate the necessary additional tubing needed for recirculation. As will be understood, such bulky pull blocks and/or bulky inflation blocks would otherwise create difficulty during pulling of the liner assembly into the pipeline, and during withdrawal of the liner assembly from the pipeline.

As will be appreciated, and as discussed above for steam generator 90, the steam-air mixture used to cure the tubular liner 44 is relatively light in weight, which advantageously allows the liner assembly 20 to be used to repair or reinforce vertically-oriented sections of pipeline. In contrast, prior art liner assemblies that use hot water to cure prior art tubular liners are not suitable for use in vertically-oriented sections of pipeline, due to the weight of the column of hot water.

As will be appreciated, the air heater 282 of the steam generator 90 allows the air temperature to be controlled prior to combining with steam. As will be understood, this feature advantageously provides improved temperature control of the resulting steam-air mixture, as compared to prior art systems that use only steam to cure epoxy.

As will be appreciated, the air heater 282 of the automated steam generator 222 enables the steam-air mixture to be generated using less energy to heat the water to generate steam. As will be understood, this feature advantageously allows the size of the water heater 94 (and in turn the size of the automated steam generator 222) to be reduced, as compared to prior art steam generators that do not have an air heater for pre-heating air.

As will be appreciated, the small size of the automated steam generator 222 enables it to be electrically powered by plugging into AC mains. As will be understood, this advantageously allows the automated steam generator 222 to be operated indoors, in contrast with prior art gas- or diesel-powered steam generators for use with prior art pipeline repair systems.

As will be appreciated, the portability of the automated steam generator 222 allows the steam-air mixture to be generated near to the location of the pipeline to be repaired or reinforced, which advantageously eliminates the need for steam to otherwise be generated remotely and/or be conveyed to the location of the pipeline via separate tubing. As will be understood, the use of separate tubing for conveying such remotely-generated steam would otherwise be tedious, and would otherwise create a safety hazard for workers at the location of the pipeline.

Although in the embodiment described above, a distal end temperature sensor is positioned at the distal end of the liner assembly 20 adjacent the relief valve 30, in other embodiments, there may alternatively be no distal end temperature sensor used. In one such embodiment, the estimated curing time of the liner 42 may be calculated by the automation application using at least: i) a calculated amount of total heat required for curing, based on information entered by the user into the pipe information input page 376; ii) the flow rate and flow temperature, as measured by the air flow meter 268 and the outgoing temperature sensor 286; and iii) the epoxy type, based on information entered by the user into the job information input page 372.

In other embodiments, regardless of whether a distal end temperature sensor is used, the estimated curing time of the liner 42 may alternatively be calculated by the automation application using at least: i) a calculated amount of total heat required for curing, based on information entered by the user into the pipe information input page 376; and ii) the flow rate and flow temperature, as measured by the air flow meter 268 and the outgoing temperature sensor 286.

The following example illustrates an application of above-described embodiments.

Example 1

Flow rate testing was carried out by connecting a flow meter to the outlet of the pressure relief valve of a liner assembly positioned in an exemplary four (4) inch diameter pipeline. The inflation block of the liner assembly was connected to a steam generator by an inflation line. The release pressure setting of the pressure relief valve was set to near zero (0) psi by rotating the rotatable nut of the pressure relief valve to the end of the threaded travel. In this manner, the pressure relief valve opened at all applied pressures. The pressure inside the bladder was controlled by adjusting the regulator valve of the steam generator.

Table 1 shows the flow rate of the steam-air mixture through the bladder measured at different pressure values.

TABLE 1

| Pressure (psi) | Measured Flow Rate (cfm, @ 4 in dia.) |
| --- | --- |
| 5 | 3.1 |
| 10 | 4.7 |
| 15 | 5.9 |
| 20 | 7.2 |
| 25 | 8.4 |

Figure 12:
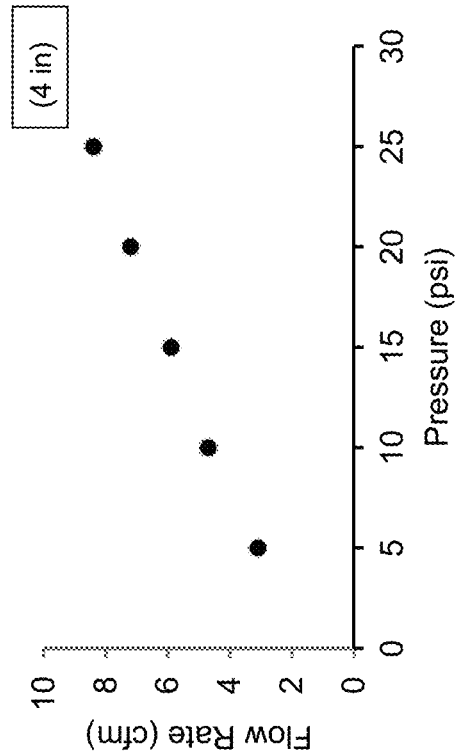
FIG. 12 is a graphical plot of flow rate as a function of pressure measured for an exemplary liner assembly in an exemplary pipeline.

The results are shown graphically in FIG. 12. As can be seen, the relationship between flow rate and pressure was generally linear over the pressure range used.

Example 2

Flow rate testing was carried out by connecting a flow meter to the outlet of the pressure relief valve of a liner assembly positioned in exemplary three (3), four (4) and six (6) inch diameter pipelines. The inflation block of the liner assembly was connected to the steam generator by an inflation line. The release pressure setting of the pressure relief valve was set to near zero (0) psi by rotating the rotatable nut of the pressure relief valve to the end of the threaded travel. In this manner, the pressure relief valve opened at all applied pressures. The pressure inside the bladder was controlled by setting the regulator valve of the steam generator to a value of 17 psi.

Table 2 shows the flow rate of the steam-air mixture through the bladder measured for different pipeline diameters.

TABLE 2

| Diameter (in) | Measured Flow Rate (cfm, @ 17 psi) |
| --- | --- |
| 3 | 6.0 |
| 4 | 6.0 |
| 6 | 6.1 |

Figure 13:
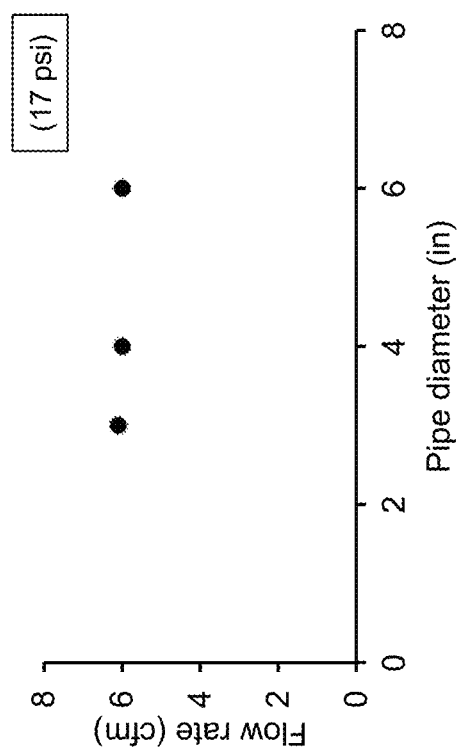
FIG. 13 is a graphical plot of flow rate as a function of pipeline diameter measured for an exemplary liner assembly in exemplary pipelines.

The results are shown graphically in FIG. 13. As can be seen, at a set pressure of 17 psi, the flow rate through the bladder was generally constant for the pipeline diameters tested.

Although embodiments have been described above with reference to the accompanying drawings, those of skill in the art will appreciate that variations and modifications may be made without departing from the scope thereof as defined by the appended claims.

What is claimed is:

1. A method of installing a liner assembly for pipeline repair or reinforcement, the method comprising:
    pulling a prepared liner assembly into position in the pipeline, the liner assembly including an outer tubular liner and an inner inflatable bladder positioned longitudinally within the tubular liner, the inner inflatable bladder being cinched onto a pressure relief valve, the tubular liner being wetted with a curable compound;
    introducing fluid into the inflatable bladder so that the inflatable bladder expands to bring the tubular liner into firm contact with an interior surface of the pipeline;
    flowing the fluid continuously through the bladder and discharging the fluid through the pressure relief valve into the pipeline, while maintaining the liner assembly in an inflated condition for a time period sufficient for the tubular liner to cure; and
    deflating the inflatable bladder and retrieving at least a portion of the liner assembly from the pipeline.

2. The method of claim 1, wherein the fluid comprises a mixture of steam and air.

3. The method of claim 2, further comprising heating the air prior to combining the air with the steam.

4. The method of claim 1, further comprising increasing a temperature of the inflatable bladder and the tubular liner by increasing a flow rate of fluid through the liner assembly in the inflated condition.

5. The method of claim 4, wherein increasing the flow rate comprises one or both of:
increasing pressure of the fluid introduced into the inflatable bladder; and
increasing a discharge rate of the fluid into the pipeline.

6. The method of claim 5, wherein increasing the discharge rate of the fluid into the pipeline comprises reducing a release pressure setting of the pressure relief valve connected to an end of the inflatable bladder.

7. The method of claim 1, wherein the time period comprises:
a first time period during which a first fluid is flowed through the bladder, the first fluid being a steam-air mixture, and
a second time period during which a second fluid is flowed through the bladder.

8. The method of claim 7, wherein the second fluid is air at ambient temperature.

9. The method of claim 7, wherein the second fluid comprises no steam or less steam than the first fluid.

10. The method of claim 7, wherein the hardness of the tubular liner increases during the second time period.

11. The method of claim 7, wherein the temperatures of the inflatable bladder and the tubular liner decrease during the second time period.

12. A method of installing a liner assembly for pipeline repair or reinforcement, the method comprising:
pulling a prepared liner assembly into position in the pipeline, the liner assembly including an outer tubular liner, an inner inflatable bladder positioned longitudinally within the tubular liner, and a pressure relief valve, the tubular liner being wetted with a curable compound;
introducing fluid into the inflatable bladder so that the inflatable bladder expands to bring the tubular liner into firm contact with an interior surface of the pipeline;
flowing the fluid continuously through the bladder and discharging the fluid through the pressure relief valve into the pipeline, while maintaining the liner assembly in an inflated condition for a time period sufficient for the tubular liner to cure; and
deflating the inflatable bladder and retrieving at least a portion of the liner assembly from the pipeline,
wherein the pulling comprises pulling the prepared liner assembly by a cable attached to the pressure relief valve.

\* \* \* \* \*